United States Patent
Wang et al.

(10) Patent No.: US 11,624,864 B2
(45) Date of Patent: Apr. 11, 2023

(54) OPTICAL DEVICE INCLUDING OPTICALLY ANISOTROPIC MOLECULES HAVING INTERMEDIATE PRETILT ANGLES

(71) Applicant: Meta Platforms Technologies, LLC, Menlo Park, CA (US)

(72) Inventors: Junren Wang, Mercer Island, WA (US); Lu Lu, Kirkland, WA (US); Hyunmin Song, Menlo Park, CA (US); Yun-Han Lee, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/209,205

(22) Filed: Mar. 22, 2021

(65) Prior Publication Data
US 2021/0325588 A1 Oct. 21, 2021

Related U.S. Application Data

(60) Provisional application No. 63/010,117, filed on Apr. 15, 2020.

(51) Int. Cl.
*G02F 1/1337* (2006.01)
*G02F 1/1335* (2006.01)
(Continued)

(52) U.S. Cl.
CPC ......... *G02B 5/3016* (2013.01); *G02B 5/0257* (2013.01); *G02F 1/133761* (2021.01);
(Continued)

(58) Field of Classification Search
CPC ............. G02F 1/1335; G02F 1/133528; G02F 1/133536; G02F 1/133543; G02F 1/1337;
(Continued)

(56) References Cited

U.S. PATENT DOCUMENTS

| | | | | |
|---|---|---|---|---|
| 5,677,747 A | * | 10/1997 | Ishikawa | G02F 1/13471 349/120 |
| 8,599,339 B2 | * | 12/2013 | Lee | G02F 1/133632 349/136 |
| 2002/0089623 A1 | * | 7/2002 | Moon | G02F 1/133536 349/98 |
| 2004/0031672 A1 | * | 2/2004 | Wen | G02F 1/31 200/512 |

(Continued)

FOREIGN PATENT DOCUMENTS

| WO | 96/10770 A1 | 4/1996 |
|---|---|---|
| WO | 2019/189586 A1 | 10/2019 |

OTHER PUBLICATIONS

Annex to Form PCT/ISA/206 Communication Relating to the Results of the Partial International Search, dated Jul. 28, 2021, in International Application No. PCT/US2021/026758, filed on Apr. 11, 2021 (6 pages).

(Continued)

*Primary Examiner* — Thoi V Duong
(74) *Attorney, Agent, or Firm* — Millburn IP PLLC

(57) ABSTRACT

An optical element is provided. The optical element includes an optical film including a birefringent material having a chirality. Optically anisotropic molecules of the birefringent material disposed adjacent a first surface of the optical film are configured with a first pretilt angle in a range of greater than 10° and less than 80°, or in a range of greater than −80° and less than −10°. Optically anisotropic molecules of the birefringent material disposed adjacent a second surface of the optical film opposing the first surface are configured with a second pretilt angle in the range of greater than 10° and less than 80°, or in the range of greater than −80° and less than −10°.

18 Claims, 24 Drawing Sheets

(51) Int. Cl.
*G02B 5/30* (2006.01)
*G02B 5/02* (2006.01)

(52) U.S. Cl.
CPC ...... *G02F 1/1337* (2013.01); *G02F 1/133543* (2021.01); *G02F 1/133746* (2021.01)

(58) Field of Classification Search
CPC ......... G02F 1/133711; G02F 1/133723; G02F 1/133746; G02F 1/133749; G02F 1/1343; G02F 1/141; G02F 1/13718; G02F 1/13306; G02F 2203/055; G02F 2203/09; G02F 2203/62; G02B 5/3016; G02B 5/0257; G02B 5/0289
See application file for complete search history.

(56) References Cited

U.S. PATENT DOCUMENTS

| | | | |
|---|---|---|---|
| 2016/0033806 A1* | 2/2016 | Lavrentovich | C09K 19/586 349/33 |
| 2016/0187730 A1* | 6/2016 | Du | G02F 1/133711 349/127 |
| 2018/0164627 A1* | 6/2018 | Oh | G02F 1/011 |
| 2021/0026049 A1 | 1/2021 | Saitoh et al. | |
| 2022/0066264 A1* | 3/2022 | Saitoh | G02F 1/133543 |
| 2022/0229342 A1* | 7/2022 | Rosen | G02F 1/294 |

OTHER PUBLICATIONS

White, T., et al., "Polymer stabilization of cholesteric liquid crystals in the oblique helicoidal state," Soft Matter, Nov. 28, 2018, vol. 14, No. 44, pp. 8883-8894 (12 pages).

Ahn, D., et al., "Control of liquid crystal pretilt angles by using organic/inorganic hybrid interpenetrating networks," Optics Express, vol. 17, No. 19, Sep. 14, 2009, pp. 16603-16612 (10 pages).

Wu, W-Y., et al., "Controlling pre-tilt angles of liquid crystal using mixed polyimide alignment layer," Optics Express, vol. 16, No. 21, Oct. 13, 2008, pp. 17131-17137 (7 pages).

Fan F., et al., "Low voltage tunable liquid crystal lens," Optics Letters, vol. 38, No. 20, Oct. 15, 2013, pp. 4116-4119 (4 pages).

Kim, K-H., et al., "Pretilt angle control and multidomain alignment of liquid crystals by using polyimide mixed with liquid crystalline prepolymer," Applied Physics Letters, 96, May 2010, 213507-1 to 213507-3 (3 pages).

Yuan C-L, et al., "Stimulated transformation of soft helix among helicoidal, heliconical, and their inverse helices," Science Advances, 2019, 5, Oct. 4, 2019 (9 pages).

Yeung F.S., et al., "Variable liquid crystal pretilt angles by nanostructured surfaces," Applied Physics Letters, 88, Jan. 2006, pp. 051910-1 to 051910-3 (3 pages).

Ho J.Y., et al., "Variable liquid crystal pretilt angles generated by photoalignment of a mixed polyimide alignment layer," Applied Physics Letters, 90, Jun. 2007, pp. 243506-1 to 243506-3 (3 pages).

Escuti M.J., et al., "Expanded viewing-angle reflection from diffuse holographic-polymer dispersed liquid crystal films," Applied Physics Letters, vol. 77, No. 26, Dec. 25, 2000, pp. 4262-4264 (3 pages).

International Search Report and Written Opinion dated Sep. 22, 2021, in International Application No. PCT/US2021/026758, filed on Apr. 11, 2021 (13 pages).

International Preliminary report on Patentability for International Application No. PCT/US2021/026758, dated Oct. 27, 2022, 10 pages.

* cited by examiner

OPTICAL DEVICE INCLUDING OPTICALLY ANISOTROPIC MOLECULES HAVING INTERMEDIATE PRETILT ANGLES

CROSS-REFERENCE TO RELATED APPLICATION

This application claims the benefit of priority to U.S. Provisional Patent Application No. 63/010,117, filed on Apr. 15, 2020, the entire content of which is incorporated by reference.

TECHNICAL FIELD

The present disclosure relates generally to optical devices and, more specifically, to an optical device including optically anisotropic molecules having intermediate pretilt angles.

BACKGROUND

Birefringent materials having a chirality may be used in various optical elements or devices. As a type of birefringent materials having a chirality, cholesteric liquid crystals ("CLCs"), also known as chiral nematic liquid crystals, have been used in optical elements, to reflect or transmit a circularly polarized incident light depending on the handedness of the incident light. For example, CLCs may be configured to primarily or substantially reflect a polarized light having a same handedness as that of a helical twist structure of the CLCs, and primarily or substantially transmit a polarized light having a handedness opposite to that of the helical twist structure of the CLCs. Due to the handedness selectivity of the CLCs, a CLC layer (or a CLC film, a CLC plate, etc.) or a CLC-layer stack may function as a circular reflective polarizer. For example, a circular reflective polarizer including left-handed CLCs ("LHCLCs") may primarily or substantially reflect a left-handed circularly polarized ("LHCP") light and primarily or substantially transmit a right-handed circularly polarized ("RHCP") light, and a circular reflective polarizer including right-handed CLCs ("RHCLCs") may primarily or substantially reflect an RHCP light and primarily or substantially transmit an LHCP light. CLCs can be configured to function over a broad bandwidth (or spectrum), such that lights having different wavelengths within the spectrum can be substantially reflected or transmitted. Reflective polarizers based on CLCs may be used as multifunctional optical components in a large variety of applications, such as polarization management components, brightness enhancement components, optical path-folding components, etc.

SUMMARY OF THE DISCLOSURE

An aspect of the present disclosure provides an optical element. The optical element includes an optical film including a birefringent material having a chirality. Optically anisotropic molecules of the birefringent material disposed adjacent a first surface of the optical film are configured with a first pretilt angle in a range of greater than 10° and less than 80°, or in a range of greater than −80° and less than −10°. Optically anisotropic molecules of the birefringent material disposed adjacent a second surface of the optical film opposing the first surface are configured with a second pretilt angle in the range of greater than 10° and less than 80°, or in the range of greater than −80° and less than −10°.

Another aspect of the present disclosure provides an optical element. The optical element includes an optical film including a birefringent material having a chirality. Optically anisotropic molecules of the birefringent material disposed adjacent a surface of the optical film are configured with a pretilt angle in a range of greater than 10° and less than or equal to 80°, or in a range of greater than or equal to −80° and less than −10°.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
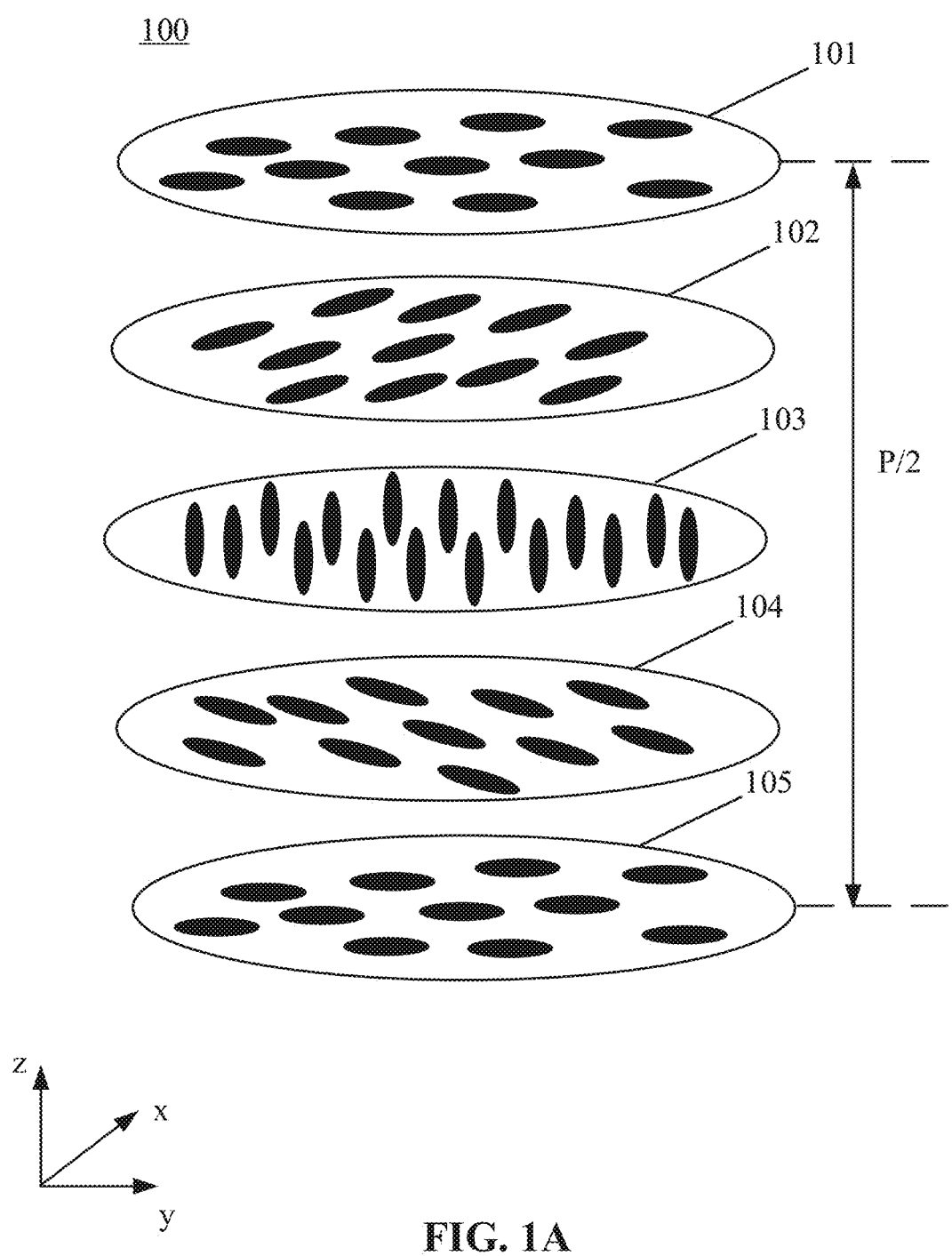
FIG. 1A illustrates a schematic diagram of a director configuration in cholesteric liquid crystals ("CLCs")

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements.

A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or exemplary configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" or "out-of-plane orientation" indicates a direction or an orientation that is non-parallel to the plane of the film or layer (e.g., perpendicular to the surface plane of the film or layer, e.g., perpendicular to a plane parallel to the surface plane). For example, when an "in-plane" direction or orientation refers to a direction or an orientation within a surface plane, an "out-of-plane" direction or orientation may refer to a thickness direction or orientation perpendicular to the surface plane, or a direction or orientation that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights with orthogonal polarizations or two orthogonally polarized lights may be two linearly polarized lights with polarizations in two orthogonal directions (e.g., an x-axis direction and a y-axis direction in a Cartesian coordinate system) or two circularly polarized lights with opposite handednesses (e.g., a left-handed circularly polarized light and a right-handed circularly polarized light).

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared ("IR") wavelength range, or a combination thereof.

The present disclosure provides an optical element (or device, system) including an optical film having a helical twist structure. The optical film may include a birefringent material with a chirality. The birefringent material may include optically anisotropic molecules. The optically anisotropic molecules disposed adjacent a first surface (e.g., molecules at the first surface or molecules at a region substantially close to the first surface) of the optical film may be arranged (e.g., aligned) in a first pretilt angle with respect to the first surface. Optically anisotropic molecules disposed adjacent a second surface of the optical film may be arranged (e.g., aligned) in a second pretilt angle. A pretilt angle of the optically anisotropic molecules at rest may refer to an angle of inclination with respect to a surface of the optical film. For example, the first pretilt angle and the second pretilt angle of the optically anisotropic molecules at rest may refer to an angle of inclination with respect to the first surface and the second surface of the optical film, respectively. The first pretilt angle and the second pretilt angle may be acute angles with the same sign. In some embodiments, at least one of the first pretilt angle or the second pretilt angle may be in a range of greater than 10° and less than 80°, or in a range of greater than −80° and less than −10°. For example, in some embodiments, both of the first pretilt angle and the second pretilt angle may be in a range of greater than 10° and less than 80°, or in a range of greater than −80° and less than −10°. In some embodiments, the first pretilt angle and the second pretilt angle may be in a range of greater than or equal to about 30° and less than or equal to about 40° (or in a range of greater than or equal to about −40° and less than or equal to about −30°). In some embodiments, the first pretilt angle and the second pretilt angle may be in a range of greater than or equal to about 25° and less than or equal to about 50° (or in a range of greater than or equal to about −50° and less than or equal to about −25°). In some embodiments, the first pretilt angle and the second pretilt angle may be acute angles with different signs (e.g., one being positive, the other being negative). The absolute values of the first pretilt angle and the second pretilt angle may be the same or may be different.

In some embodiments, the chirality of the birefringent material may be introduced by chiral dopants doped into a host birefringent material, e.g., a nematic LC host. In some embodiments, the chirality of the birefringent material may be a property of the birefringent material itself, such as an intrinsic molecular chirality. For example, the birefringent material may include chiral crystal molecules, or the birefringent material may include molecules having one or more chiral functional groups. In some embodiments, the birefringent material with a chirality may include twist-bend nematic liquid crystals ("LCs") (or LCs in twist-bend nematic phase), in which the LC directors may exhibit periodic twist and bend deformations forming a conical helix with doubly degenerate domains having opposite handedness. The LC directors of twist-bend nematic LCs may be tilted with respect to a helical axis and, thus, twist-bend nematic phase may be considered as the generalized case of the conventional nematic phase in which the LC directors are orthogonal with respect to the helical axis.

In some embodiments, the helical axis of the optical film may be substantially perpendicular to a surface (e.g., a first surface or a second surface) of the optical element. In some embodiments, a helical twist structure (or a helical superstructure) of the optical film may be a heliconical structure, in which the LC molecules may rotate around the helical axis, and the LC directors of the LC molecules may have oblique angles (e.g., oblique acute angels) with respect to the helical axis. Alternatively, the pretilt angle may also be defined with respect to the helical axis. For illustrative purposes, the pretilt angle is defined with respect to the first surface or the second surface of the optical element.

In some embodiment, the optical element may also include an alignment structure coupled to the optical film. The alignment structure may be configured to at least partially align the optically anisotropic molecules included in the optical film to have at least one of the first pretilt angle or the second pretilt angle with respect to a first surface or a second surface of the optical film. In some embodiments, the alignment structure may include a nanostructure, a polyimide layer including a mixture of planar and vertical alignment polyimides, a photoalignment layer including a mixture of planar and vertical alignment polyimides, a hybrid alignment network, an alignment layer including a polyimide mixed with a liquid crystalline prepolymer, or any combination thereof. In some embodiments, the optically anisotropic molecules disposed adjacent at least one of the first surface or the second surface of the optical film may be exposed to air. The pretilt angles of the optically anisotropic molecules exposed to air may be controlled or configured via surfactants or other additive molecules (e.g., small weight molecules) added to the birefringent material rather than by an alignment structure disposed at the first surface and/or the second surface.

In some embodiments, the optical film may function as a polarizing film, and the optical element may function as a reflective polarizer configured to selectively reflect or transmit a circularly or an elliptically polarized incident light, depending on a handedness of the circularly or elliptically polarized incident light and a handedness of the helical twist structure of the optical film. In some embodiments, the reflective polarizer may be configured to filter circularly polarized components (e.g., LHCP and RHCP components) of an unpolarized incident light, where one circularly polarized component may be substantially reflected and another circularly polarized component with an opposite handedness may be substantially transmitted. In some embodiments, the reflective polarizer may be a tunable reflective polarizer with a controllable reflection band, e.g., an electrically controllable reflection band. For example, when the reflective polarizer is subject to an electrical field, the reflection band may be red shifted. When the electrical field is switched between an on-state and an off-state, the reflective polarizer may be tuned between two reflection bands. In some embodiments, the reflective polarizer may be a non-tunable reflective polarizer with a substantially constant reflection band. Due to the configured range of the first pretilt angle and/or the second pretilt angle of the optically anisotropic molecules, the light leakage of the optical film functioning as a polarizing film may be significantly suppressed for both on-axis and off-axis incident lights. Accordingly, an extinction ratio of the reflective polarizer may be significantly improved, and the optical performance of an optical device or system including the reflective polarizer may be significantly enhanced.

In some embodiments, the optical film may function as a diffusely reflective polarizing film, and the optical element may function as an optical diffuser. In some embodiments, the optical diffuser may be configured to provide a directional scattering, rather than a random scattering, to an incident light. For example, the optical diffuser may be configured to primarily or substantially backward scatter a circularly polarized incident light having the same handedness as that of the helical twist structure of the optical film. The optical diffuser may be configured to primarily or substantially forward scatter a circularly polarized incident light having a handedness opposite to that of the helical twist structure of the optical film. In addition, a desirable direction of the scattering provided by the optical film may be obtained through controlling the pretilt angles of the LC molecules. Due to the configured range of the first pretilt angle and/or the second pretilt angle of the optically anisotropic molecules, the optical diffuser may improve uniformity of lights illuminating an object, or improve visibility of an image created by an optical system based on lights having a wider range of angles.

In the following descriptions, for illustrative purposes, CLCs are used as an example of the birefringent material with a chirality. Optical elements (e.g., reflective polarizers, diffusers) based on CLCs are used as examples of the optical elements based on the birefringent material with a chirality. Nematic LC molecules are used as an example of the optically anisotropic molecules included in the birefringent material with a chirality. In some embodiments, optical elements (e.g., reflective polarizers, optical diffusers) may also be configured based on other suitable birefringent material with a chirality, following the same design principles for the optical elements based on CLCs described below.

CLCs, which are liquid crystals having a helical twist structure and, thus, exhibit chirality, i.e., handedness, are a type of birefringent material with a chirality. CLCs are also known as chiral nematic liquid crystals. For an incidence wavelength within a reflection band of the CLCs, a circularly polarized light (or an elliptically polarized light) with a handedness that is the same as the handedness of the helical twist structure of the CLCs may be primarily or substantially reflected, and a circularly polarized light (or an elliptically polarized light) with a handedness that is different from (e.g., opposite to) the handedness of the helical twist structure of the CLCs may be primarily or substantially transmitted. Due to the handedness selectivity of the CLCs, a CLC layer (or a CLC film, a CLC plate, etc.), or a CLC-layers stack may function as a reflective polarizer, e.g., a circular reflective polarizer, or an elliptical reflective polarizer. In some embodiment, polarization and spectral distortions may occur at large incidence angles of an incident light (and may also vary at different viewing angles) due to the waveplate effect of the CLCs. These distortions may reduce the polarizing efficiency and produce color shifts. For example, the polarization distortions (also referred to as depolarization) of the reflected light and/or transmitted light may result in a light leakage of the CLC layer and, accordingly, reduce the extinction ratio of the CLC reflective polarizer. The light leakage of the CLC layer may increase as the incidence angle increases. In addition, when a plurality of single-pitch CLC layers are stacked to realize a broad reflection band, the polarization distortions of the transmitted light caused by a CLC layer may result in a lower reflectivity of a subsequent CLC layer for the transmitted light that is incident onto the subsequent CLC layer.

In view of this, the present disclosure provides a CLC optical element including LC molecules aligned in intermediate pretilt angles. The CLC optical element may include a CLC layer having a helical twist structure. LC molecules disposed adjacent a first surface (e.g., at the first surface or in a region substantially close to the first surface) of the CLC layer may be arranged (e.g., aligned) in a first pretilt angle, and LC molecules disposed adjacent a second surface (e.g., at the second surface or in a region substantially close to the second surface) of the CLC layer may be arranged (e.g., aligned) in a second pretilt angle. The first pretilt angle and the second pretilt angle may be acute angles with the same sign. In some embodiments, both of the first pretilt angle and the second pretilt angle may be in a range of greater than 10° and less than 80°, or in a range of greater than −80° and less than −10°. In some embodiments, the first pretilt angle and the second pretilt angle may be in a range of greater than or equal to about 30° and less than or equal to about 40° (or in a range of greater than or equal to about −40° and less than or equal to about −30°). In some embodiments, the first pretilt angle and the second pretilt angle may be in a range of greater than or equal to about 25° and less than or equal to about 50° (or in a range of greater than or equal to about −50° and less than or equal to about −25°. In some embodiments, the first pretilt angle and the second pretilt angle may be acute angles with different signs (e.g., one being positive, the other being negative). The absolute values of the first pretilt angle and the second pretilt angle may be the same or may be different.

In some embodiments, the CLC optical element may function as a CLC reflective polarizer. Compared to a conventional CLC reflective polarizer where LC molecules are aligned in relatively small pretilt angles (e.g., about 0° to about 10° or about −10° to about 0°), the light leakage of the disclosed CLC reflective polarizer where LC molecules are aligned in intermediate pretilt angles (e.g., greater than 10° and less than 80°, or greater than −80° and less than −10°) may be significantly suppressed for both on-axis and off-axis incident lights. Accordingly, the extinction ratio of the disclosed CLC reflective polarizer may be significantly improved for both on-axis and off-axis incident lights. That is, the angular performance of the disclosed CLC reflective polarizer may be significantly improved, and the optical performance of an optical device or system including the disclosed CLC reflective polarizer may be significantly enhanced. A disclosed CLC reflective including a single-pitch CLC layer may be used for a narrow-band light source. A disclosed CLC reflective including a multi-stack and/or gradient-pitch CLC layer may be used for a broadband light source or a combination of multiple narrow-band light sources.

FIG. 1A illustrates a schematic diagram of a three-dimensional ("3D") director configuration 100 of CLCs. As shown in FIG. 1A, nematic LC molecules are represented by solid rods for illustrative purposes. CLCs may be organized in multiple layers 101, 102, 103, 104, 105 with no positional ordering within the layers. For illustrative purposes, in the schematic diagram shown in FIG. 1A, the layers are separated apart from one another to better illustrate the structure. Although five layers are shown, the number of layers is not limited to five, which may be any suitable number, such as 1, 2, 3, 4, 6, 7, etc. In the same layer, the nematic LC directors may be oriented in the same direction. Across different layers, the nematic LC directors (e.g., long axes of the nematic LC molecules) may rotate along an axial direction (e.g., z-direction shown in FIG. 1A) of the layers, due to the presence of chiral dopants. In some embodiments, the variation of the nematic LC directors along the axial direction may be periodic. The period of the variation of the nematic LC directors, i.e., an axial length over which the nematic LC directors rotate by 360°, is known as a helix pitch P. In some embodiments, the variation of the nematic LC directors may repeat at every half pitch (P/2), as the nematic LC directors at 0° and ±180° may be equivalent. The helix pitch P may determine a reflection band of the CLCs, i.e., a band of incidence wavelengths that may be reflected by the CLCs via Bragg Reflection. In some embodiments, the helix pitch P may be of the same order as wavelengths of visible lights. The reflection band of the CLCs may be centered at a wavelength $\lambda_0 = n*P$, where n may be an average refractive index of the CLCs that may be calculated as $n = (n_e + n_o)/2$. In these equations, $n_e$ and $n_o$ represent the extraordinary and ordinary reflective indices of the nematic LCs, respectively, and P represents the helix pitch of the CLCs. A reflection bandwidth $\Delta\lambda$ of the CLCs may be calculated as $\Delta\lambda = \Delta n*P$, which may be proportional to the birefringence $\Delta n$ of the nematic LCs, where $\Delta n = n_e - n_o$.

Figure 1B:
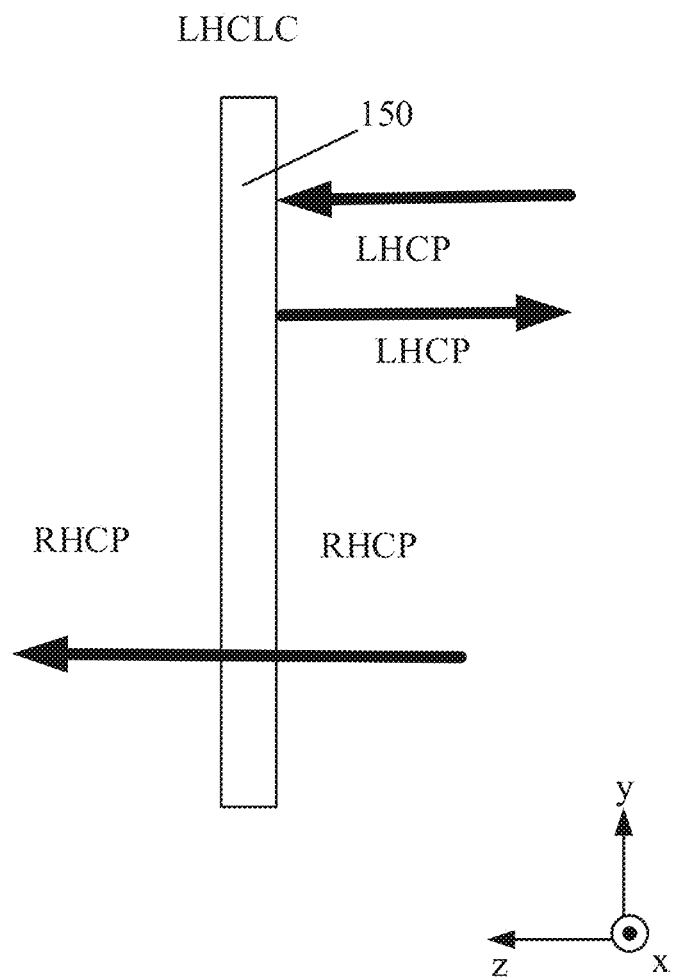
FIG. 1B illustrates polarization selective reflectivity of CLCs.

FIG. 1B illustrates polarization selective reflectivity of the CLCs shown in FIG. 1A. For an incidence wavelength within the reflection band of the CLCs, a circularly polarized light with a handedness that is the same as the handedness of the helical twist structure of the CLCs may be primarily or substantially reflected, and a circularly polarized light with a handedness that is different from (e.g., opposite to) the handedness of the helical twist structure of the CLCs may be primarily or substantially transmitted. For example, as shown in FIG. 1B, left-handed CLCs ("LHCLCs") 150 may exhibit a high reflection characteristic (e.g., a high reflectance) for a left-handed circularly polarized ("LHCP") incident light and a high transmission characteristic (e.g., a high transmittance) for a right-handed circularly polarized ("RHCP") incident light. That is, for a light having an incidence wavelength within the reflection band of the LHCLCs 150, when the light is an LHCP light (or includes an LHCP component), the LHCLCs 150 may primarily or substantially reflect the LHCP light (or the LHCP component). When the light is an RHCP light (or includes an RHCP component), the LHCLCs 150 may primarily or substantially transmit the RHCP light (or the RHCP component). An unpolarized light or a linearly polarized light can be decomposed into an RHCP light (or an RHCP component or portion) and an LHCP light (or an LHCP component or portion), where each component may be selectively reflected or transmitted depending on the handedness of the component and the handedness of the helical twist structure of the CLCs. Due to the handedness selectivity of the CLCs, a thin film of CLCs may function as a polarizing film, which may be used to realize a reflective polarizer (e.g., a circular reflective polarizer, an elliptical reflective polarizer). When the incidence wavelength is outside of the reflection band of the LHCLCs 150, a circularly polarized light may be transmitted by the LHCLCs 150 regardless of the handedness.

Figure 1C:
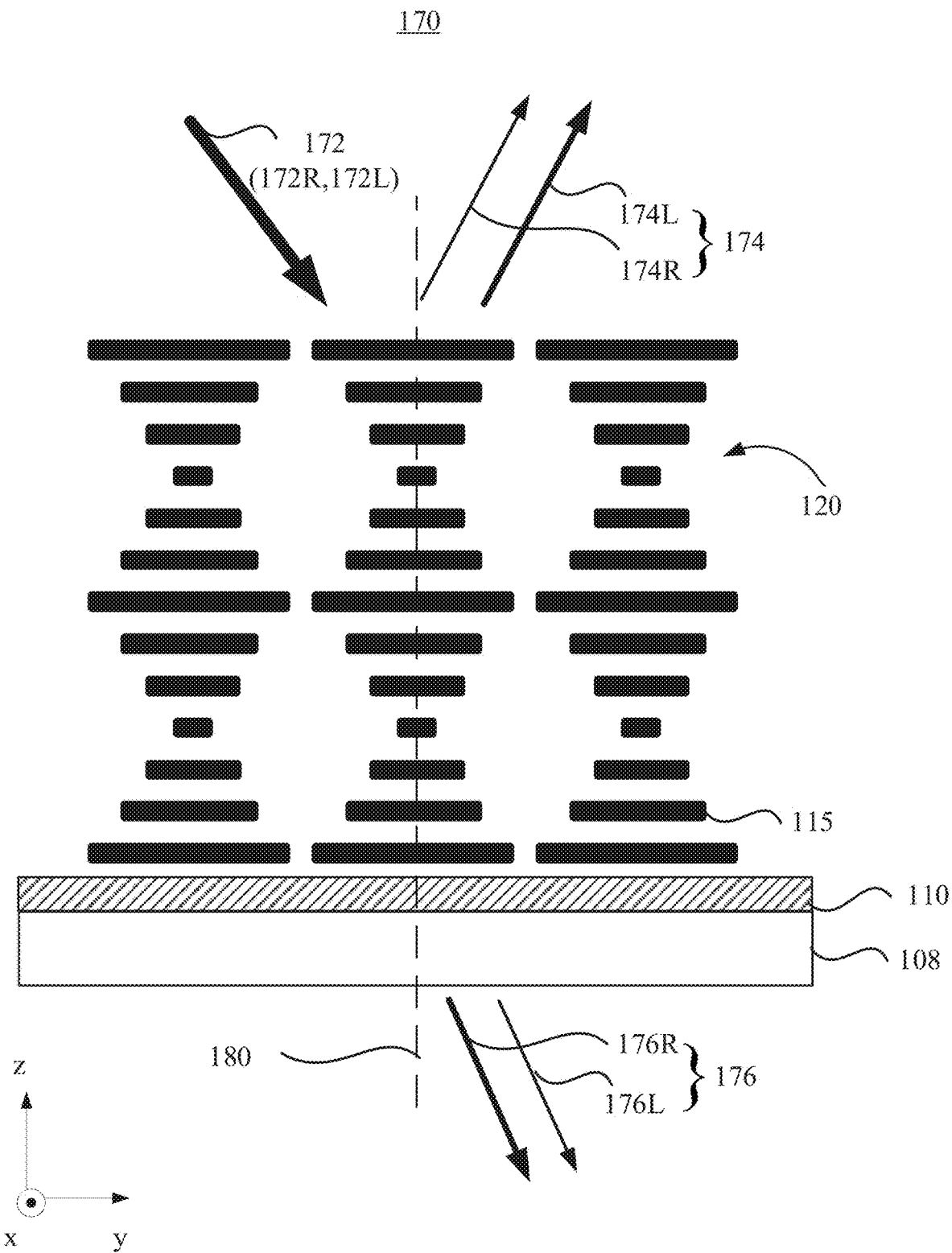
FIG. 1C illustrates a schematic diagram of a conventional cholesteric liquid crystal ("CLC") reflective polarizer.

FIG. 1C illustrates a z-y sectional of a conventional cholesteric liquid crystal ("CLC") reflective polarizer 170 where LC molecules 115 are aligned in relatively small pretilt angles (e.g., about 0° to about 10°, or about −10° to about 0°, or about −10° to about 10°). For simplicity of illustration, these relatively small pretilt angles are not shown in FIG. 1C. As show in FIG. 1C, the CLC reflective polarizer 170 may include a substrate 108, an alignment structure 110 disposed at the substrate 108, and a CLC layer 120 disposed at (e.g., on) the alignment structure 110. The alignment structure 110 (e.g., a polyimide alignment layer for planar alignment) may be configured to at least partially align the LC molecules 115 included in the CLC layer 120, such that the LC molecules 115 have small pretilt angles, for example, about 0° to about 10°, or about −10° to about 0°, or about −10° to about 10°. For example, the LC molecules 115 that are in direct contact with the alignment structure 110 may be aligned by the alignment structure 110, and the remaining LC molecules 115 of the CLC layer 120 may be aligned according to neighboring LC molecules 115 that have been aligned by the alignment structure 110. When the pretilt angles are small, the directors of the LC molecules 115 are regarded as substantially parallel to a surface of the substrate 108. When the helical twist structure (or a helical superstructure) of the CLC layer 120 is a helicoidal superstructure, in which the LC molecules 115 rotate around the helical axis 180 (e.g., in the z-axis), the directors (e.g., long axes) of the LC molecules 115 are substantially perpendicular to the helical axis 180, as shown in FIG. 1C.

The CLC reflective polarizer 170 may include one or more additional alignment structures and/or substrates. For example, the alignment structure 110 and the substrate 108 may be lower alignment structure and lower substrate, respectively, and the CLC reflective polarizer 170 may include an upper substrate and an alignment structure disposed at the top surface of the CLC layer 120. The CLC layer 120 may be disposed between the upper substrate and lower substrate (or between the upper alignment structure and the lower alignment structure).

Due to the waveplate effect of the CLC layer 120, a polarization distortion of at least one of the light reflected or the light transmitted by the CLC layer 120 may occur as the incidence angle of the light incident onto the CLC reflective polarizer 170 increases, resulting in a light leakage of the CLC layer 120. As a result, the extinction ratio of the CLC reflective polarizer 170 may be reduced. For example, when the CLC layer 120 includes LHCLCs 150 shown in FIG. 1B (in which case the CLC reflective polarizer 170 may be referred to as LHCLC reflective polarizer), an LHCP component 172L of an unpolarized incident light 172 may be primarily or substantially reflected as an LHCP light 174L with a small portion transmitted as an LHCP light 176L, and an RHCP component 172R of the unpolarized incident light may be primarily or substantially transmitted as an RHCP light 176R with a small portion reflected as an RHCP light 174R. That is, a reflected light 174 of the CLC layer 120 for the unpolarized incident light 172 may include an LHCP component (the LHCP light 174L) and an RHCP component (the RHCP light 174R), and a transmitted light 176 of the CLC layer 120 for the unpolarized incident light 172 may include an RHCP component (the RHCP light 176R) and an LHCP component (the LHCP light 176L). For the LHCLC reflective polarizer 170, the reflection extinction ratio may be defined as a ratio (e.g., of light intensity) between the LHCP component 174L and the RHCP component 174R of the reflected light 174, and the transmission extinction ratio may be defined as a ratio (e.g., of light intensity) between the RHCP component 176R and the LHCP component 176L of the transmitted light 176.

Similarly, for an RHCLC reflective polarizer, the reflection extinction ratio may be defined as a ratio (e.g., of light intensity) between the RHCP component and the LHCP component of the reflected light, and the transmission extinction ratio may be defined as a ratio (e.g., of light intensity) between the LHCP component and the RHCP component of the transmitted light. As the incidence angle increases, both of the reflection extinction ratio and transmission extinction ratio of the CLC reflective polarizer may decrease. For example, the reflection extinction ratio and the transmission extinction ratio may decrease significantly when the incidence angle (which is an internal incidence angle in the CLC layer 120) is greater than about 20 degrees (which corresponds to an incidence angle in the air of greater than about 30 degrees).

Figure 2A:
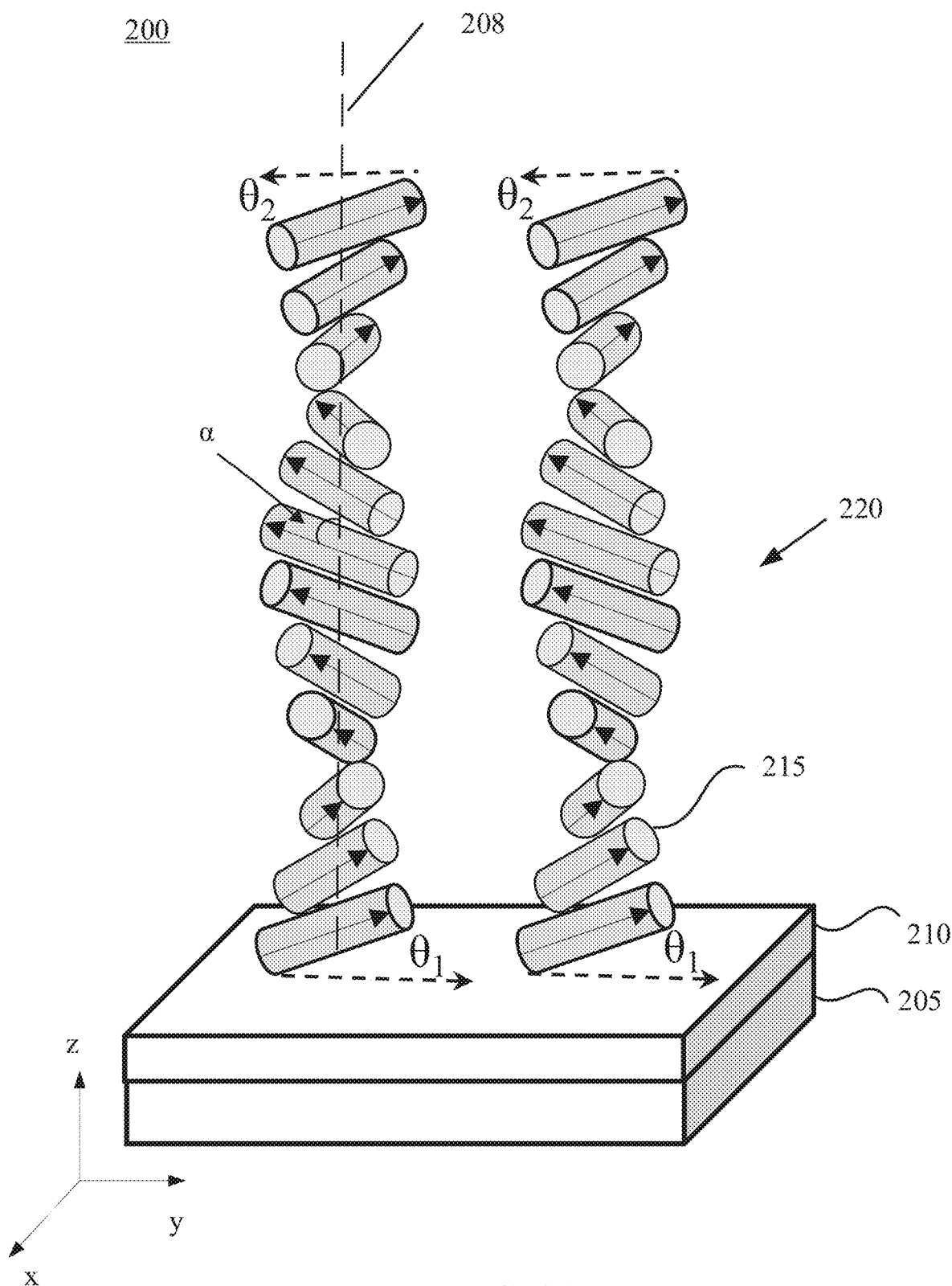
FIG. 2A illustrates a schematic diagram of a CLC optical element, according to an embodiment of the present disclosure.
Figure 2B:
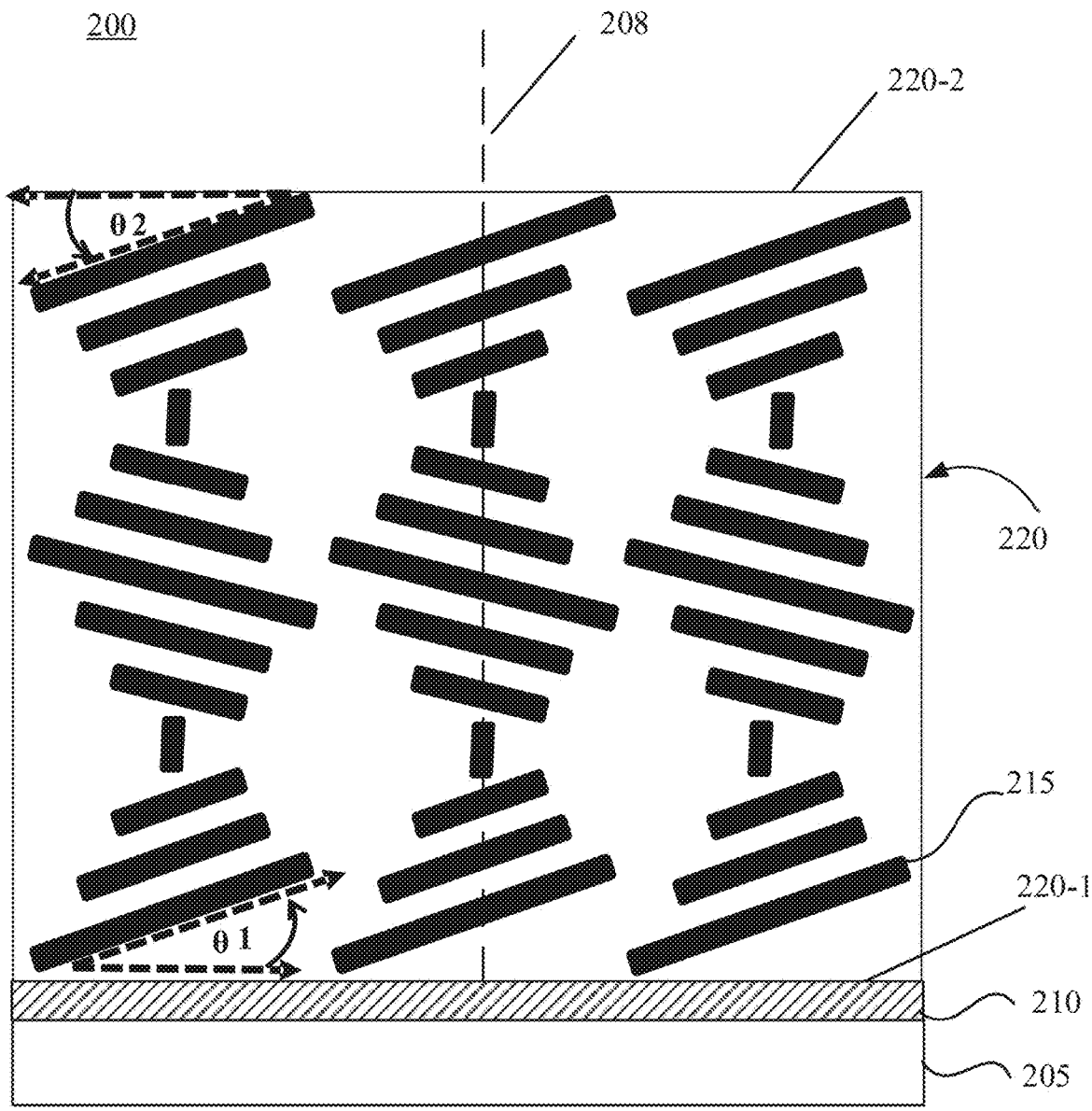
FIG. 2B illustrates a cross-sectional view of the CLC optical element shown in FIG. 2A, according to an embodiment of the present disclosure.

FIG. 2A illustrates a schematic diagram of a CLC optical element 200, according to an embodiment of the present disclosure, and FIG. 2B illustrates a cross-sectional view of the CLC optical element 200 shown in FIG. 2A, according to an embodiment of the present disclosure. As shown in FIGS. 2A and 2B, the CLC optical element 200 may include a substrate 205, an alignment structure 210 disposed at (e.g., on) the substrate 205, and an optical film 220 disposed at (e.g., on) the alignment structure 210. The optical film 220 may have a cholesteric order. For example, the optical film 220 may include LC molecules 215 arranged to have a helical twist structure of a constant helix pitch (e.g., repeat of a same, fixed helix pitch in the thickness or z-axis direction). The optical film 220 may also be referred to as a CLC layer 220. FIG. 2A illustrates a three-dimensional ("3D") representation of the helical structure of the LC molecules 215, and FIG. 2B illustrates a cross-sectional view of the 3D representation of the helical structure of the LC molecules 215. In some embodiments, after the LC molecules 215 are aligned in the pretilt angles by the alignment structure 210 and stabilized via suitable mechanisms (e.g., thermal-polymerization, photo-polymerization), the alignment structure 210 and the substrate 205 may be removed. For example, the optical film 220 may be separated from the alignment structure 210 and the substrate 205 through a peeling or non-peeling method. Thus, in a final product of the CLC optical element 200, the alignment structure 210 and the substrate 205 may not be included, and the optical film 220 may be a free-standing film. In some embodiments, the final product of the CLC optical element 200 may include the alignment structure 210 and the substrate 205.

In some embodiments, the CLC layer 220 may be a polarizing film, and the CLC optical element 200 may function as a CLC reflective polarizer 200. The substrate 205 may provide support and protection to various layers, films, and/or structures disposed thereon. In some embodiments, the substrate 205 may be at least partially transparent at least in the visible wavelength band (e.g., about 380 nm to about 700 nm). In some embodiments, the substrate 205 may also be at least partially transparent in at least a portion of the infrared ("IR") band (e.g., about 700 nm to about 1 mm). The substrate 205 may include a suitable material that is at least partially transparent to lights of the above-listed wavelength ranges, such as, a glass, a plastic, a sapphire, or any combination thereof, etc. The substrate 205 may be rigid, semi-rigid, flexible, or semi-flexible. In some embodiments, the substrate 205 may be a part of another optical element or device, or a part of another opto-electrical element or device. For example, the substrate 205 may be a solid optical lens or a part of a solid optical lens. In some embodiments, the substrate 205 may be a part of a functional device, such as a display screen. In some embodiments, the substrate 205 may be used to fabricate, store, or transport the CLC optical element 200. In some embodiments, the substrate 205 may be detachable or removable from the rest of the CLC optical element 200 after the rest of the CLC optical element 200 is fabricated or transported to another place or device. That is, the substrate 205 may be used in fabrication, transportation, and/or storage to support the optical film 220 provided on the substrate 205, and may be separated or removed from the optical film 220 of the CLC optical element 200 when the fabrication of the CLC optical element 200 is completed, or when the CLC optical element 200 is to be implemented in an optical device.

The CLC layer 220 may include a first surface 220-1 and a second, opposing surface 220-2. In some embodiments, a helical axis 208 of the helical twist structure may be substantially normal (e.g., perpendicular) to a surface (e.g., the first surface 220-1 and/or the second surface 220-2) of the CLC layer 220. The CLC layer 220 may be disposed at (e.g., on) the alignment structure 210, which may be configured to at least partially align LC molecules 215 of the CLC layer 220 in a predetermined intermediate pretilt angle θ1. For example, the LC molecules 215 in direct contact with the alignment structure 210 may be aligned by the alignment structure 210 to have the predetermined intermediate pretilt angle θ1, and the remaining LC molecules 215 may be aligned according to neighboring LC molecules 215 that have been aligned by the alignment structure 210. A pretilt angle may be defined as an angle between an LC director (e.g., long axis) of the LC molecules 215 and the surface (e.g., the first surface 220-1 and/or the second surface 220-2) of the CLC layer 220. In some embodiments, the pretilt angle may be defined as an angle between an LC director (e.g., long axis, denoted by arrows in the LC molecules 215 shown in FIG. 2A) of the LC molecules 215 and the surface of the substrate 205 or the alignment structure 210, which may be parallel with the surface of the CLC layer 220.

As shown in FIGS. 2A and 2B, LC molecules 215 disposed adjacent the first surface 220-1 (e.g., at the first surface 220-1 or at a first region substantially close to the first surface 220-1) of the CLC layer 220 may be arranged (e.g., aligned) in a first pretilt angle θ1, and LC molecules 215 disposed adjacent the second surface 220_2 (e.g., at the surface 220-2 or at a second region substantially close to the second surface 220-2) of the CLC layer 220 may be arranged (e.g., aligned) in a second pretilt angle θ2. In some embodiments, the first pretilt angle and the second pretilt angle may be defined in a same direction (e.g., a counter-clockwise direction) relative to the respective surfaces, as shown in FIGS. 2A and 2B. In some embodiments, the helical twist structure (or the helical superstructure) of the CLC layer 220 may be a heliconical structure, in which the LC molecules 215 may rotate around the helical axis 208, and the LC directors of the LC molecules 215 may form oblique angles α (e.g., acute oblique angles α) with respect to the helical axis 208. For each LC molecule 215, an oblique angle α is complementary to a pretilt angle θ of the LC molecule 215, i.e., α=90°−θ. Thus, the oblique angle α of the LC molecule 215 with respect to the helical axis 208 may vary as the pretilt angle θ of the LC molecule 215. That is, the LC molecules 215 within the bulk (e.g., volume) of the CLC layer 220 (e.g., in a space between the first surface 220-1 and the second surface 220-2) may rotate around the helical axis 208, and the LC directors of the LC molecules 215 may be tilted toward the helical axis 208 rather than being substantially perpendicular to the helical axis 208. The heliconical structure may also be referred to as an oblique helicoidal structure.

For illustrative purposes, FIG. 2B shows that the first surface 220-1 and the second surface 220-2 of the CLC layer 220 are a lower surface and an upper surface of the CLC layer 220, respectively. Accordingly, the first pretilt angle θ1 of the LC molecules 215 adjacent the first surface 220-1 may also be referred to as a floor pretilt angle θ1, and the second pretilt angle θ2 of the LC molecules 215 adjacent the second surface 220-2 may also be referred to as a ceiling pretilt angle θ2. In some embodiments, the first surface 220-1 of the CLC layer 220 may be an interface between the alignment structure 210 and the CLC layer 220. The second surface 220-2 of the CLC layer 220 may be an interface between the CLC layer 220 and another medium, e.g., air from an external environment, another alignment structure, or another substrate. In some embodiments, the surface interactions, surface geometry, and LC elastic properties may affect the surface alignment of the LC molecules 215 at the interface between the alignment structure 210 and the CLC layer 220 (e.g., at the first surface 220-1). Accordingly, the surface interactions, surface geometry, and LC elastic properties may affect the pretilt angles (e.g., the first pretilt angle θ1) of the LC molecules 215 at the interface between the alignment structure 210 and the CLC layer 220 (e.g., at the first surface 220-1). In some embodiments, the pretilt angles (e.g., the first pretilt angle θ1) of the LC molecules 215 at the interface between the alignment structure 210 and the CLC layer 220 (e.g., the first surface 220-1) may be determined by the surface characteristics of the alignment structure 210. In some embodiments, the inherent LC properties and the neighboring aligned LC molecules may determine the surface alignment of the LC molecules 215 exposed to air, e.g., the LC molecules 215 disposed at an interface between the CLC layer 220 and the air (e.g., at the second surface 220-2). Accordingly, the pretilt angles (e.g., the second pretilt angle θ2) of the LC molecules 215 exposed to the air may be determined by the inherent LC properties and the neighboring aligned LC molecules. In some embodiments, the pretilt angles (e.g., the second pretilt angle θ2) of the LC molecules 215 exposed to air may also be determined by additives or surfactant added to the LCs.

In some embodiments, the first pretilt angle θ1 and the second pretilt angle θ2 may be acute angles (e.g., 0°<θ1 (or θ2)<90°). In some embodiments, the first pretilt angle θ1 and the second pretilt angle θ2 may have the same sign, such as both being positive or negative. In some embodiments, the first pretilt angle θ1 and the second pretilt angle θ2 may have the same sign and the same absolute value or different absolute values. In some embodiments, the first pretilt θ1 and the second pretilt angle θ2 may have different signs and the same absolute value or different absolute values. In the present disclosure, whether an angle is a positive angle or a negative angle may be determined by a terminal side of the angle. Provided that the terminal side of the angle is the side where the LC director is located, a positive angle is the angle when the terminal side is rotated in a counterclockwise direction, and a negative angle is the angle when the terminal side is rotated in a clockwise direction.

Figure 2C:
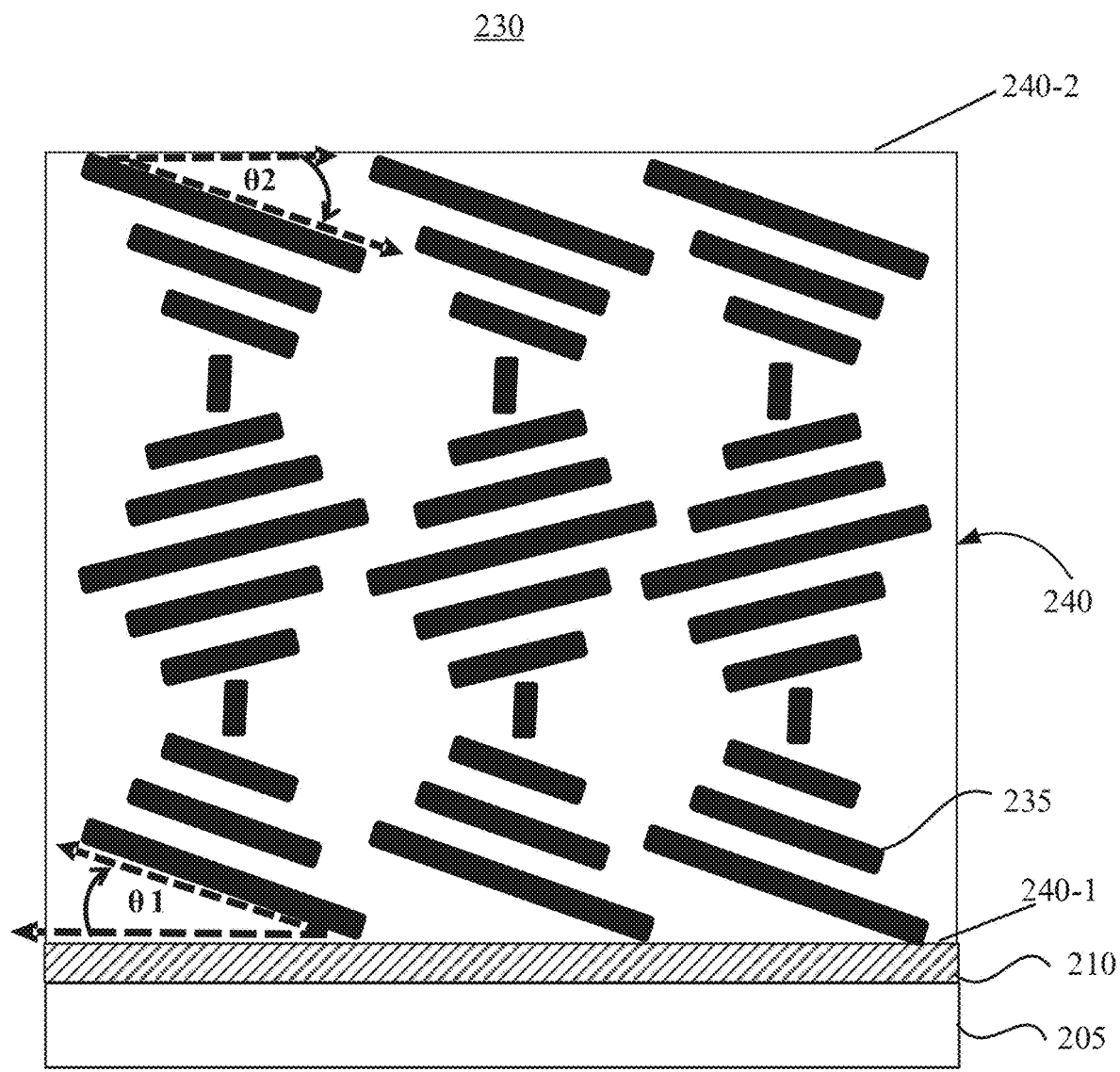
FIG. 2C illustrates a cross-sectional view of a CLC optical element, according to another embodiment of the present disclosure.
Figure 2C:
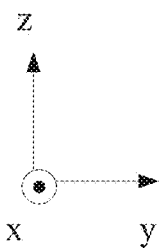

In some embodiments, as shown in FIGS. 2A and 2B, both of the first pretilt angle θ1 and the second pretilt angle θ2 of the LC molecules 215 may be positive angles. In some embodiments, both of the first pretilt angle θ1 and the second pretilt angle θ2 may be negative angles. FIG. 2C illustrates a cross-sectional view of a CLC optical element 230, according to an embodiment of the present disclosure. In some embodiments, the CLC optical element 230 may function as a CLC reflective polarizer 230. The CLC optical element 230 may include elements that are similar to or the same as those included in the CLC optical element 200 shown in FIGS. 2A and 2B. Descriptions of the same or similar elements can refer to the above corresponding descriptions rendered in connection with FIGS. 2A and 2B. The CLC optical element 230 may include the substrate 205, the alignment structure 210, and a CLC layer 240 (or optical film 240) that includes LC molecules 235. In some embodiments, the CLC layer 240 may function as a polarizing film. The LC molecules 235 at a first surface 240-1 (e.g., an interface between the alignment structure 210 and the CLC layer 240) may be configured with a negative, first pretilt angle θ1, and the LC molecules 235 at a second surface 240-1 (e.g., an interface between the CLC layer 240 and air) may be configured with a negative, second pretilt angle θ2. In this embodiment, the first pretilt angle θ1 and the second pretilt angle θ2 are acute angles relative to the first surface 240-1 and the second surface 240-2 of the CLC layer 240 in the clockwise direction.

In some embodiments, referring to FIGS. 2A and 2B, to suppress the light leakage and increase the extinction ratio of the CLC optical element 200, the first pretilt angle θ1 and the second pretilt angle θ2 may be acute angles having the same sign. In some embodiments, at least one the first pretilt angle θ1 or the second pretilt angle θ2 may be configured to be in a range of greater than 10° and less than 80°, or in a range of greater than −80° and less than −10°. For example, in some embodiments, both of the first pretilt angle θ1 and the second pretilt angle θ2 may be configured to be in the range of greater than 10° and less than 80°, or in the range of greater than −80° and less than −10°. In some embodiments, the first pretilt angle θ1 and the second pretilt angle θ2 may both be 30°, both be 35°, both be 40°, or both be 45°. In some embodiments, the first pretilt angle θ1 and the second pretilt angle θ2 may both be −30°, both be −35°, both be −40°, or both be −45°.

In some embodiments, at least one of the first pretilt angle θ1 or the second pretilt angle θ2 may be in a range of greater than or equal to about 25° and less than or equal to about 50° (or in a range of greater than or equal to about −50° and less than or equal to about −25°. For example, both of the first pretilt angle θ1 and the second pretilt angle θ2 may be in a range of greater than or equal to about 25° and less than or equal to about 50° (or in a range of greater than or equal to about −50° and less than or equal to about −25°.

In some embodiments, at least one of the first pretilt angle θ1 or the second pretilt angle θ2 may be configured to be in a range of greater than or equal to about 25° and less than or equal to about 40°, or in a range of greater than or equal to about −40° and less than or equal to about −25°. For example, in some embodiments, both of the first pretilt angle θ1 and the second pretilt angle θ2 may be configured to be in the range of greater than or equal to about 25° and less than or equal to about 40°, or in the range of greater than or equal to about −40° and less than or equal to about −25°.

In some embodiments, at least one of the first pretilt angle θ1 or the second pretilt angle θ2 may be configured to be in a range of greater than or equal to about 30° and less than or equal to about 40°, or in a range of greater than or equal to about −40° and less than or equal to about −30°. For example, in some embodiments, both of the first pretilt angle θ1 and the second pretilt angle θ2 may be configured to be in the range of greater than or equal to about 30° and less than or equal to about 40°, or in the range of greater than or equal to about −40° and less than or equal to about −30°.

In some embodiments, at least one of the first pretilt angle θ1 or the second pretilt angle θ2 may be configured to be in a range of greater than or equal to about 40° and less than or equal to about 50°, or in a range of greater than or equal to about −50° and less than or equal to about −40°. For example, in some embodiments, both of the first pretilt angle θ1 and the second pretilt angle θ2 may be configured to be in the range of greater than or equal to about 40° and less than or equal to about 50°, or in the range of greater than or equal to about −50° and less than or equal to about −40°.

In some embodiments, the first pretilt angle θ1 may be about 30° (e.g., 28°, 29°, 30°, 31°, 32°), and the second pretilt angle θ2 may be about 40° (e.g., 38°, 39°, 40°, 41°, 42°). As used herein, the phrase "about No" may encompass any value within a suitable small range (e.g., ±0.5°, ±1°, ±1.5°, ±2°, or ±2.5°) around No, including No. In some embodiments, the first pretilt angle θ1 may be about 30°, and the second pretilt angle θ2 may be about 30°. In some embodiments, the first pretilt angle θ1 may be about 40°, and the second pretilt angle θ2 may be about 30°. In some embodiments, the first pretilt angle θ1 may be about 40°, and the second pretilt angle θ2 may be about 40°. In some embodiments, the first pretilt angle θ1 may be about −30°, and the second pretilt angle θ2 may be about −40°. In some embodiments, the first pretilt angle θ1 may be about −30°, and the second pretilt angle θ2 may be about −30°. In some embodiments, the first pretilt angle θ1 may be about −40°, and the second pretilt angle θ2 may be about −30°.

The alignment structure 210 may be disposed at (e.g., on) a surface of the substrate 205. For example, as shown in FIGS. 2A and 2B, the alignment structure 210 may be disposed (e.g., coated, deposited, or affixed) at a top surface of the substrate 205 as a film, a layer, or a plate, etc. The alignment structure 210 may be a suitable alignment structure configured to at least partially align the LC molecules 215 included in the CLC layer 220 to have predetermined intermediate pretilt angles. For example, the LC molecules 215 in direct contact with the alignment structure 210 (e.g., the LC molecules 215 disposed in a first region adjacent the first surface 220-1 of the CLC layer 220) may be aligned by the alignment structure 210 in the first pretilt angle θ1, and the remaining LC molecules 215 of the CLC layer 220 may be aligned according to neighboring LC molecules 215 that have been aligned by the alignment structure 210. In some embodiments, the alignment structure 210 may include a nanostructure, a polyimide layer including a mixture of planar and vertical alignment polyimides, a photoalignment layer including a mixture of planar and vertical alignment polyimides, an alignment layer including a polyimide mixed with a liquid crystalline prepolymer, a hybrid alignment network, or any combination thereof. For example, the planar alignment polyimides may align the LC molecules 215 in a range of relatively small pretilt angles, while the vertical alignment polyimides may align the LC molecules 215 in a range of relatively large pretilt angles. By configuring the mixture of the planar alignment polyimides and the vertical alignment polyimides (e.g., the concentration and distribution), the mixture may cause the LC molecules 215 to align in a predetermined intermediate pretilt angle, which may be in a range of, e.g., great than 10° and less than 80°, greater than −80° and less than −10°, greater than or equal to 25° and less than or equal to 50°, greater than or equal to −50° and less than or equal to −25°, greater than or equal to 30° and less than or equal to 40°, or greater than or equal to −40° and less than or equal to −30°, etc.

In some embodiments, the alignment structure 210 may include a nanostructure alignment layer including a random distribution of planar (or horizontal) and vertical alignment polyimide ("PI") domains. For example, a planar alignment PI that may provide a pretilt angle of about 0°-10° and a vertical alignment PI that may provide a pretilt angle of about 85°-90° may be mixed according to a predetermined mixing ratio (e.g., a weight ratio or a volume ratio) in a solution and coated onto a substrate. Nanostructured planar and vertical alignment PI domains may be formed after the coating is dried. After applying a rubbing treatment to the dried coating, the nanostructure alignment layer may align LC molecules in controlled pretilt angles. Through controlling the mixing ratio (e.g., volume ratio and/or weight ratio) of the planar alignment PI and the vertical alignment PI to be mixed in the solution, the area ratio of planar and vertical alignment PI domains in the formed nanostructure alignment layer may be controlled. Accordingly, the nanostructure alignment layer may align LCs in the predetermined intermediate pretilt angle (e.g., which may be in a range of great than 10° and less than 80°, greater than −80° and less than −10°, greater than or equal to 25° and less than or equal to 50°, greater than or equal to −50° and less than or equal to −25°, greater than or equal to 30° and less than or equal to 40°, or greater than or equal to −40° and less than or equal to −30°, etc.).

In some embodiments, the alignment structure 210 may include a mixed PI alignment layer, which may include a mixture of a planar alignment PI and a vertical alignment PI. Through controlling the concentration ratio of the planar alignment PI to the vertical alignment PI, the baking temperature, and/or the rubbing strength of the mixed polyimide alignment layer, the mixed polyimide alignment layer may align LCs in the predetermined intermediate pretilt angle (e.g., which may be in a range of great than 10° and less than 80°, greater than −80° and less than −10°, greater than or equal to 25° and less than or equal to 50°, greater than or equal to −50° and less than or equal to −25°, greater than or equal to 30° and less than or equal to 40°, or greater than or equal to −40° and less than or equal to −30°, etc.).

In some embodiments, the alignment structure 210 may include a photoalignment layer configured to align LCs in the predetermined intermediate pretilt angle without a mechanical rubbing. In some embodiments, the photoalignment layer may include a photoalignment material configured to provide a broad range of pretilt angles (e.g., about 1° to) 89° depending on the irradiation dose (e.g., an ultraviolet ("UV") irradiation dose) applied to the photoalignment material. In some embodiments, the pretilt angle provided by the photoalignment material may increase as the irradiation dose increases. In some embodiments, the photoalignment material may include CPL024 from Dai-Nippon Ink and Chemicals ("DIC"). Through controlling the irradiation dose applied to the photoalignment material, the formed photoalignment layer may align LCs in the predetermined intermediate pretilt angle. In some embodiments, the photoalignment layer may include nanostructured domains of planar and vertical alignment PIs. Through controlling the concentrations of the planar and vertical alignment PIs, the formed photoalignment layer may align LCs in the predetermined intermediate pretilt angle (e.g., which may be in a range of great than 10° and less than or equal to 80°, greater than or equal to −80° and less than −10°, greater than or equal to 25° and less than or equal to 50°, greater than or equal to −50° and less than or equal to −25°, greater than or equal to 30° and less than or equal to 40°, or greater than or equal to −40° and less than or equal to −30°, etc.).

In some embodiments, the alignment structure 210 may include an alignment layer including PI (e.g., vertical alignment PI or planar alignment PI) mixed with liquid crystalline prepolymer. Through controlling the mixing ratio of the polyimide and liquid crystalline prepolymer, the formed alignment layer may align LCs in the predetermined intermediate pretilt angle (e.g., which may be in a range of great than 10° and less than 80°, greater than −80° and less than −10°, greater than or equal to 25° and less than or equal to 50°, greater than or equal to −50° and less than or equal to −25°, greater than or equal to 30° and less than or equal to 40°, or greater than or equal to −40° and less than or equal to −30°, etc.). In some embodiments, when the mixing ratio of the polyimide and liquid crystalline prepolymer is fixed, through controlling the UV exposure time, the formed alignment layer may align LCs in the predetermined intermediate pretilt angle (e.g., which may be in a range of great than 10° and less than 80°, greater than −80° and less than −10°, greater than or equal to 25° and less than or equal to 50°, greater than or equal to −50° and less than or equal to −25°, greater than or equal to 30° and less than or equal to 40°, or greater than or equal to −40° and less than or equal to −30°, etc.).

In some embodiments, the alignment structure 210 may include a hybrid alignment polymer network. In some embodiments, the hybrid alignment polymer network may be a hybrid interpenetrating polymer network including an organic alignment material, an inorganic alignment material, or both. In some embodiments, the hybrid interpenetrating polymer network may include a combination of poly(vinyl cinnamate) ("PVCi") used for a planar alignment of LCs and poly(dimethyl siloxane) ("PDMS") used for a vertical alignment of LCs. Through controlling the concentration of the PDMS in the combination, the hybrid alignment polymer network may align LCs in the predetermined intermediate pretilt angle (e.g., which may be in a range of great than 10° and less than 80°, greater than −80° and less than −10°, greater than or equal to 25° and less than or equal to 50°, greater than or equal to −50° and less than or equal to −25°, greater than or equal to 30° and less than or equal to 40°, or greater than or equal to −40° and less than or equal to −30°, etc.).

In some embodiments, the alignment structure 210 and/or the substrate 205 may be detachable or removable from the rest of the CLC optical element 200 after the rest of the CLC optical element 200 is fabricated or transported to another place or device. That is, the alignment structure 210 and/or the substrate 205 may be used in fabrication, transportation, and/or storage to support the CLC layer 220 provided on the substrate 205, and may be separated or removed from the CLC layer 220 of the CLC optical element 200 when the fabrication of the CLC optical element 200 is completed, or when the CLC optical element 200 is to be implemented in an optical device. Thus, the final product of the CLC optical element 200 may include the CLC layer 220 without the alignment structure 210 and/or the substrate 205.

For illustrative purposes, FIG. 2A shows that the CLC optical element 200 includes one substrate 205, one alignment structure 210 disposed at the substrate 205, and one CLC layer 220 disposed at the alignment structure 210. In other embodiments, the CLC optical element 200 may include one or more additional alignment structures 210, one or more additional substrates 205, and/or one or more additional CLC layers 220. For example, two or more CLC layers 220 may be stacked in the z-direction shown in FIGS. 2A and 2B. The stacked configuration may include one, two, or more than two alignment structures 210. The stacked configuration may include one, two, or more than two substrates 205. In some embodiments, in each CLC layer, the LC molecules 215 may be aligned in substantially the same intermediate pretilt angle. In some embodiments, in each CLC layer, the LC molecules 215 may be aligned in different intermediate pretilt angles. For example, a first portion of the LC molecules 215 in each CLC layer may be aligned in a first intermediate pretilt angle, and a second portion of the LC molecules 215 in the CLC layer may be aligned in a second intermediate pretilt angle that may be different from the first intermediate pretilt angle. In some embodiments, in each CLC layer, the floor pretilt angle and ceiling pretilt angle of the LC molecules 215 may be substantially the same. In some embodiments, in each CLC layer, the floor pretilt angle and the ceiling pretilt angle may be different from one another. When the CLC optical element 200 includes a plurality of CLC layers 220, the respective CLC layers may have the same thickness or different thicknesses. For example, when the CLC optical element 200 includes a plurality of CLC layers 220, at least two CLC layers may have different thicknesses. The respective CLC layers may include the same LC material or different LC materials. For example, at least two CLC layers may include different LC materials. In some embodiments, the positive pretilt angles for at least two CLC layers may be different. For example, a first CLC layer may have both of the floor pretilt angle and the ceiling pretilt angle being the same first value (e.g., 30°), and a second CLC layer may have both of the floor pretilt angle and the ceiling pretilt angle being the same second value different from the first value (e.g., 40°). In some embodiments, in the first CLC layer, the floor pretilt angle and the ceiling pretilt angle may be a pair of two different values, i.e., a first value (e.g., 30°) and a second value (e.g., 40°), respectively, and in the second CLC layer, the floor pretilt angle and the ceiling pretilt angle may be another pair of two different values, i.e., a third value (e.g., 40° or 35°) and a fourth value (e.g., 30° or 25°). Various other combinations of pretilt angles in different CLC layers are contemplated.

The descriptions based on the embodiment of FIGS. 2A-2B also apply to the embodiment of FIG. 2C, which are not repeated. For example, the structure shown in FIG. 2C may be at least partially repeated in the z-direction to form a stacked configuration, which may include two or more CLC layers, one or more alignment structures, and one or more substrates stacked together. The two or more CLC layers may both have negative pretilt angles.

In some embodiments, the embodiments shown in FIG. 2B and FIG. 2C may be combined to form a stacked configuration, in which two or more CLC layers having pretilt angles in different signs (e.g., positive and negative) may be arranged in the z-direction. The stacked configuration may include one, two, or more than two alignment structures, and one, two, or more than two substrates. In the stacked configuration, in some embodiments, the first CLC layer may include positive floor and ceiling pretilt angles (which may or may not be the same value), and the second CLC layer may be configured with negative floor and ceiling pretilt angles (which may or may not be the same value). For example, one CLC layer may be configured with a floor pretilt angle of 30° and a ceiling pretilt angle of 30° (or 40°), and another CLC layer may be configured with a floor pretilt angle of −30° and a ceiling pretilt angle of −30° (or −40°).

Figure 2D:
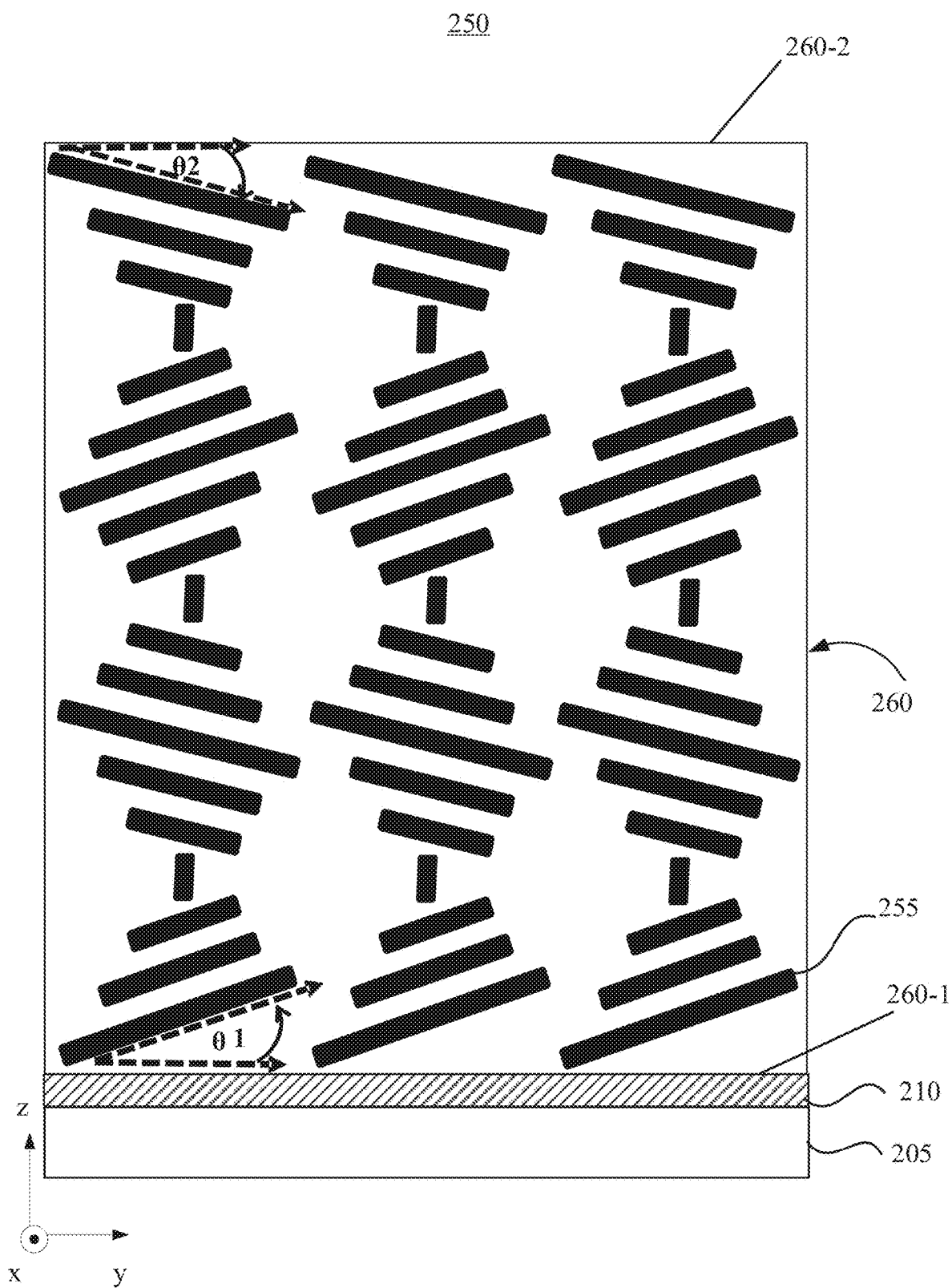
FIG. 2D illustrates a cross-sectional view of a CLC optical element, according to another embodiment of the present disclosure.

In some embodiments, the first pretilt angle $\theta1$ and the second pretilt angle $\theta2$ of an individual CLC layer may be acute angles with different signs. FIG. 2D illustrates a cross-sectional view of a CLC optical element 250, according to an embodiment of the present disclosure. In some embodiments, the CLC optical element 250 may function as a CLC reflective polarizer 250. As shown in FIG. 2D, the CLC optical element 250 may include elements that are similar to or the same as those included in the CLC optical element 200 shown in FIGS. 2A and 2B. Descriptions of the same or similar elements can refer to the above corresponding descriptions rendered in connection with FIGS. 2A and 2B. The CLC optical element 250 may include the substrate 205, the alignment structure 210, and a CLC layer 260 (or optical film 260) that includes LC molecules 255. In some embodiments, the CLC layer 260 may function as a polarizing film. The LC molecules 255 may be aligned to have a positive, first pretilt angle $\theta1$ and a negative, second pretilt angle $\theta2$. In this embodiment, the first pretilt angle $\theta1$ is an acute angle relative to the first surface 260-1 in the counterclockwise direction, and the second pretilt angle $\theta2$ is an acute angle relative to the second surface 260-2 in the clockwise direction. Although not shown, in some embodiments, the LC molecules 255 may be aligned to have a negative, first pretilt angle $\theta1$ and a positive, second pretilt angle $\theta2$.

When the first pretilt angle $\theta1$ and the second pretilt angle $\theta2$ have different signs, the absolute values of the first pretilt angle $\theta1$ and the second pretilt angle $\theta2$ may be the same or may be different. For example, one of the first pretilt angle $\theta1$ and the second pretilt angle $\theta2$ may be in a range of greater than 10° and less than 80°, and the other one of the first pretilt angle $\theta1$ and the second pretilt angle $\theta2$ may be in a range of greater than −80° and less than −10°. In some embodiments, one of the first pretilt angle $\theta1$ and the second pretilt angle $\theta2$ may be in a range of greater than or equal to about 25° and less than or equal to about 50°, and the other one of the first pretilt angle $\theta1$ and the second pretilt angle $\theta2$ may be in a range of greater than or equal to about −50° and less than or equal to about −25°. In some embodiments, one of the first pretilt angle $\theta1$ and the second pretilt angle $\theta2$ may be in a range of greater than or equal to about 25° and less than or equal to about 40°, and the other one of the first pretilt angle $\theta1$ and the second pretilt angle $\theta2$ may be in a range of greater than or equal to about −40° and less than or equal to about −25°. In some embodiments, one of the first pretilt angle $\theta1$ and the second pretilt angle $\theta2$ may be in a range of greater than or equal to about 30° and less than or equal to about 40°, and the other one of the first pretilt angle $\theta1$ and the second pretilt angle $\theta2$ may be in a range of greater than or equal to about −40° and less than or equal to about −30°. In some embodiments, one of the first pretilt angle $\theta1$ and the second pretilt angle $\theta2$ may be in a range of greater than or equal to about 40° and less than or equal to about 50°, and the other one of the first pretilt angle $\theta1$ and the second pretilt angle $\theta2$ may be in a range of greater than or equal to about −50° and less than or equal to about −40°. In some embodiments, one of the first pretilt angle $\theta1$ and the second pretilt angle $\theta2$ may be about 30° (e.g., 28°, 29°, 30°, 31°, 32°), and the other one of the first pretilt angle $\theta1$ and the second pretilt angle $\theta2$ may be about −40° (e.g., −38°, −39°, −40°, −41°, −42°). In some embodiments, one of the first pretilt angle $\theta1$ and the second pretilt angle $\theta2$ may be about 30°, and the other one of the first pretilt angle $\theta1$ and the second pretilt angle $\theta2$ may be about −30°. In some embodiments, one of the first pretilt angle $\theta1$ and the second pretilt angle $\theta2$ may be about 40° (or −40°), and the other one of the first pretilt angle $\theta1$ and the second pretilt angle $\theta2$ may be about −30° (or 30°). In some embodiments, one of the first pretilt angle $\theta1$ and the second pretilt angle $\theta2$ may be about 40°, and the other one of the first pretilt angle $\theta1$ and the second pretilt angle $\theta2$ may be about −40°.

Figure 2E:
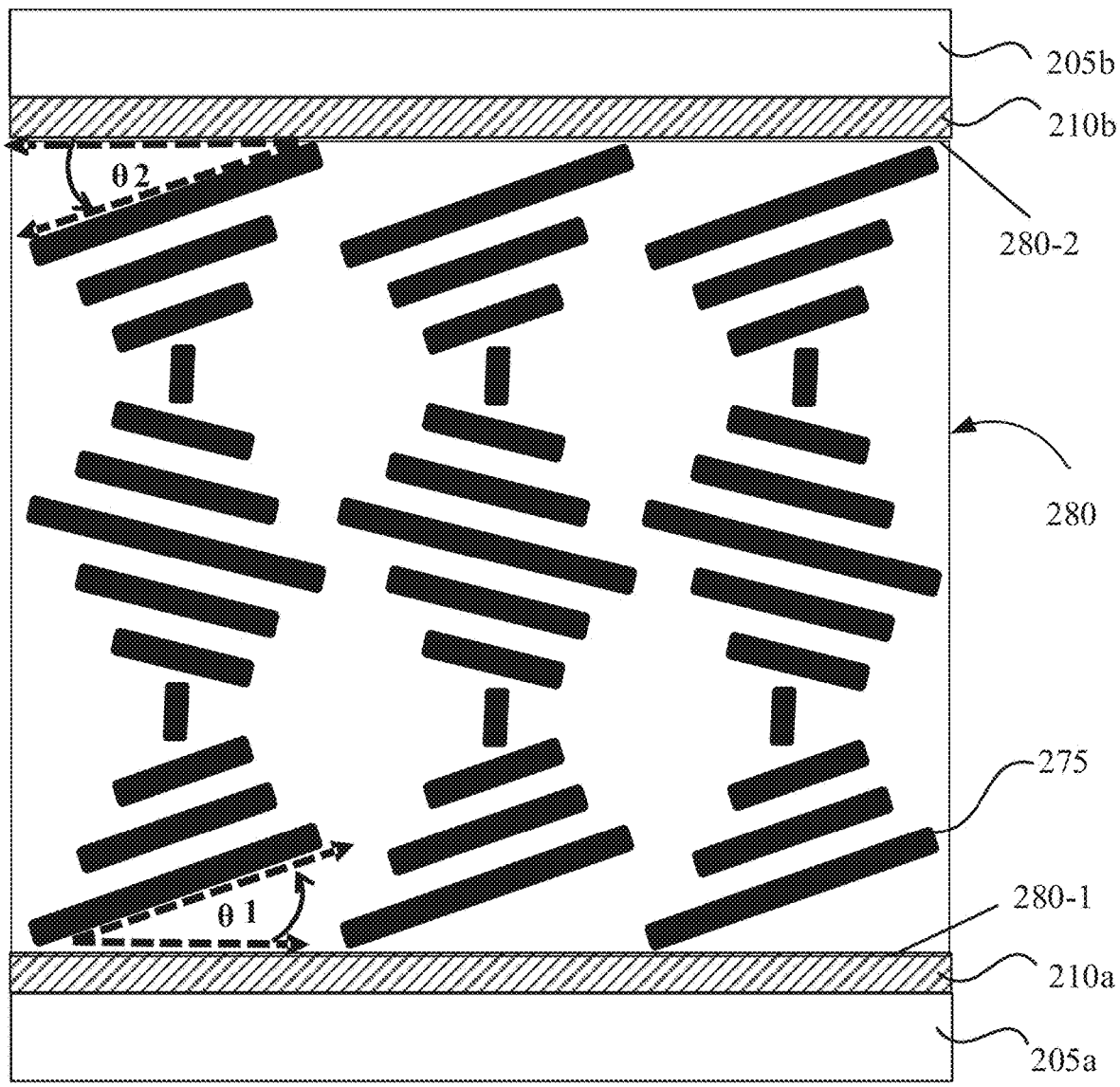
FIG. 2E illustrates a cross-sectional view of a CLC optical element, according to another embodiment of the present disclosure.

FIG. 2E illustrates a cross-sectional view of a CLC optical element 270, according to another embodiment of the present disclosure. In some embodiments, the CLC optical element 270 may function as a CLC reflective polarizer 270. As shown in FIG. 2E, the CLC optical element 270 may include elements that are similar to or the same as those included in the CLC optical element 200 shown in FIGS. 2A and 2B. Descriptions of the same or similar elements can refer to the above corresponding descriptions rendered in connection with FIGS. 2A and 2B. For example, the CLC optical element 270 may include a CLC layer 280 (or optical film 280), two substrates 205a and 205b sandwiching the CLC layer 280, and two alignment structures 210a and 210b. In some embodiments, the CLC layer 280 may function as a polarizing film. Each of the substrates 205a and 205b may be an embodiment of the substrate 205 shown in FIGS. 2A and 2B. Each of the alignment structures 210a and 210b may be an embodiment of the alignment structure 210 shown in FIGS. 2A and 2B. The CLC layer 280 may be similar to the CLC layer 220 shown in FIGS. 2A and 2B. The number of substrates is not limited to two. For example, at least one of the substrates 205a or 205b may be omitted. The number of alignment structures is not limited to two. For example, at least one of the alignment structures 210a or 210b may be omitted. Detailed descriptions of the similar elements may refer to the above descriptions rendered in connection with FIGS. 2A and 2B.

Although the CLC layer 280 similar to the CLC layer 220 shown in FIGS. 2A and 2B (where pretilt angles are positive) is used as an example for illustrating the embodiment having two alignment structures, in other embodiments, the two alignment structures configuration shown in FIG. 2E may be based on the CLC layer 240 shown in FIG. 2C (where pretilt angles are negative). In some embodiments, the two alignment structures configuration shown in FIG. 2E may be based on the CLC layer 260 shown in FIG. 2D (where floor pretilt angle and ceiling pretilt angle having different signs (i.e., positive angle and negative angle)).

As shown in FIG. 2E, the CLC layer 280 may be in contact with both of the alignment structures 210a and 210b at a first surface 280-1 and a second surface 280-2, respectively. In some embodiments, the alignment structures 210a and 210b may be disposed at opposing surfaces of the substrates 205a and 205b, respectively. For example, the alignment structure 210a may be in contact with a first surface 280-1 of the CLC layer 280. The alignment structure 210b may be in contact with a second surface 280-2 of the CLC layer 280. The alignment structures 210a and 210b may be configured to at least partially align LC molecules 275 included in the CLC layer 280 in predetermined intermediate pretilt angles. For example, the alignment structure 210a may be configured to align LC molecules 275 that are in contact with the alignment structure 210a in a first pretilt angle θ1, and the alignment structure 210b may be configured to align LC molecules 275 that are in contact with the alignment structure 210b in a second pretilt angle θ2. The remaining LC molecules 275 in the CLC layer 280 may be aligned according to the neighboring LC molecules that are in contact with and that have been aligned by the alignment structure 210a and/or the alignment structure 210b. The pretilt angles of the LC molecules 275 within the bulk of the CLC layer 280 (e.g., a region or space between the first surface 280-1 and the second surface 280-2) may gradually change from the first pretilt angle θ1 to the second pretilt angle θ2, when the first pretilt angle θ1 is different from the second pretilt angle θ2. When the first pretilt angle θ1 is substantially the same as the second pretilt angle θ2, the LC molecules 215 within the bulk of the CLC layer 280 may be substantially aligned in the same pretilt angle, e.g., the angle θ1.

In some embodiments, the alignment structures 210a and 210b may include the same alignment materials. In some embodiments, the alignment structures 210a and 210b may include different alignment materials. In some embodiments, the alignment structures 210a and 210b may include the same type of structure. For example, the alignment structures 210a and 210b may both include a same type of nanostructure, a same type of a polyimide layer including a mixture of planar and vertical alignment polyimides, a same type of photoalignment layer including a mixture of planar and vertical alignment polyimides, a same type of alignment layer including a polyimide mixed with a liquid crystalline prepolymer, a same type of hybrid alignment network, or a same type of combination thereof. In some embodiments, the alignment structures 210a and 210b may include different types of structures selected from a nanostructure, a polyimide layer including a mixture of planar and vertical alignment polyimides, a photoalignment layer including a mixture of planar and vertical alignment polyimides, an alignment layer including a polyimide mixed with a liquid crystalline prepolymer, a hybrid alignment network, or any combination thereof.

In some embodiments, the CLC layer (e.g., 220, 240, 260, 280) may include a liquid crystal polymer film. In some embodiments, the liquid crystal polymer film may include passive LCs, e.g., LC molecules that are not reorientable by an external field (e.g., an external electric field, magnetic field, or light field). Accordingly, the CLC optical element may function as a passive optical element. For example, the CLC optical element 200 shown in FIGS. 2A and 2B, the CLC optical element 230 shown in FIG. 2C, the CLC reflective polarizer 250 shown in FIG. 2D, or the CLC reflective polarizer 270 shown in FIG. 2E may function as a passive optical element. In some embodiments, the passive LCs may include polymerized CLCs, e.g., photopolymerized CLCs. For example, when fabricating the CLC layer, chiral reactive mesogens ("RMs") with a photopolymerizable methacrylate group may be mixed with achiral RMs (as nematic LC host) and photo-initiators. In some embodiments, the achiral RMs may include monoacrylate monomer ("mRMs") and diacrylate monomers ("dRMs"). The mixture may be coated as a film on an alignment structure (e.g., 210) or filled into a cell formed by two substrates (e.g., 205a and 205b), for example, each of which may have an alignment structure (e.g., 210a or 210b). Then the mixture may be irradiated with, e.g., a UV light, the chiral RMs may be polymerized to generate a helical twist structure, and the achiral RMs may be polymerized to stabilize the generated helical twist structure.

In some embodiments, the liquid crystal polymer layer (e.g., the CLC layer (e.g., 210, 240, 260, 280)) may include active LCs disposed in a polymer network, such as polymer stabilized CLCs, polymer dispersed CLCs, in which the active LCs are switchable by an external field. Accordingly, the liquid crystal polymer layer (e.g., the CLC layer (e.g., 210, 240, 260, 280)) may include a polymer stabilized cholesteric liquid crystal film, or a polymer dispersed cholesteric liquid crystal film. For example, when fabricating the polymer stabilized cholesteric liquid crystal film, nematic LCs may be mixed with at least one of mono-functional chiral monomers, multi-functional monomers, or photo-initiators. The mixture may be coated as a film on the substrate disposed with the alignment structure or filled into a cell formed by two substrates each having an alignment structure. Then the mixture may be irradiated with, e.g., a UV light, and the chiral monomers may be polymerized to generate a helical twist structure of the nematic LCs. The crosslinked multi-functional monomers after the polymerization may stabilize the generated helical twist structure of the nematic LCs. In some embodiments, although not shown, a CLC optical element may include both active LCs and passive LCs. For example, a portion of the LCs included in a CLC layer of the CLC reflective polarizer may be switchable by an external field, and another portion of the LCs may not be switchable by the external field.

Figure 3:
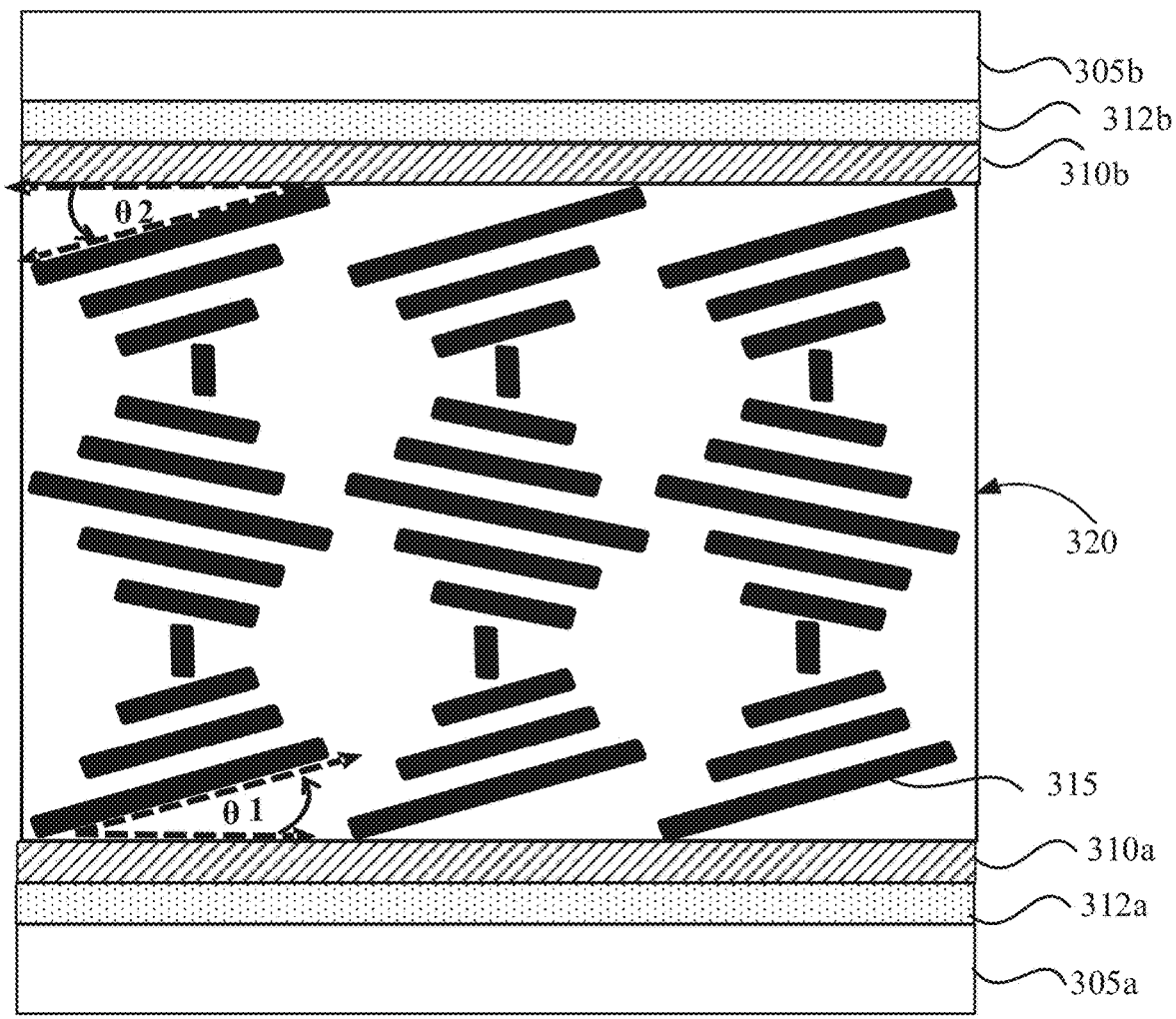
FIG. 3 illustrates a cross-sectional view of a CLC optical element, according to an embodiment of the present disclosure.

In some embodiments, the CLC layer (e.g., 220, 240, 260, 280) may include active LCs, e.g., LC molecules that are reorientable by an external field (e.g., an external electric field, magnetic field, or light field), and the CLC reflective polarizer may function as an active optical element. FIG. 3 illustrates a y-z sectional view of an active CLC optical element 300, according to another embodiment of the present disclosure. In some embodiments, the active CLC optical element 300 may function as a tunable CLC reflective polarizer 300, with an electrically controllable reflection band. The CLC optical element 300 shown in FIG. 3 may include elements that are the same as or similar to those included in the CLC optical element 200 shown in FIGS. 2A and 2B. For example, the CLC optical element 300 may include a CLC layer 320 (or optical film 320), two substrates 305a and 305b, and two alignment structures 310a and 310b. Each of the substrates 305a and 305b may be an embodiment of the substrate 205 shown in FIGS. 2A and 2B. Each of the alignment structures 310a and 310b may be an embodiment of the alignment structure 210 shown in FIGS. 2A and 2B. The CLC layer 320 may be similar to the CLC layer 220 shown in FIGS. 2A and 2B. In some embodiments, the CLC layer 320 may function as a polarizing film. The number of substrates is not limited to two. For example, at least one of the substrates 305a or 305b may be omitted. The number of alignment structures is not limited to two. For example, at least one of the alignment structures 310a or 310b may be omitted. Detailed descriptions of the similar elements may refer to the above descriptions rendered in connection with FIGS. 2A and 2B. Although the embodiment of the CLC layer 220 shown in FIGS. 2A and 2B (where pretilt angles are positive) is used as an example of the CLC layer 320 for illustrative purposes, the CLC layer 320 may adopt the embodiment of the CLC layer 240 shown in FIG. 2C (where pretilt angles are negative), or the embodiment of the CLC layer 260 shown in FIG. 2D (where pretilt angles have different signs).

As shown in FIG. 3, the CLC optical element 300 may also include electrode layers 312a and 312b configured to sandwich the CLC layer 320. The CLC layer 320 may include LC molecules 315 arranged in predetermined intermediate pretilt angles. When a voltage is applied to the electrode layers 312a and 312b, an electric field may be generated between the electrode layers 312a and 312b to switch orientations of the LC molecules 315 in the CLC layer 320. In some embodiments, the electrode layer 312a may be disposed between a substrate 305a and an alignment structure 310a, and the electrode layer 312b may be disposed between a substrate 305b and an alignment structure 310b. In some embodiments, the electrode layers 312a and 312b may include flexible transparent conductive layers, such as indium tin oxide ("ITO"). In some embodiments, the substrates 305a and 305b may include plastic films. In some embodiments, the plastic film may include polyethylene terephthalate ("PET"). In some embodiments, the plastic film may include cellulose triacetate ("TAC"), which is a type of flexible plastic with a substantially low birefringence.

In some embodiments, as shown in FIG. 3, the electrode layer 312a and electrode layer 312b may include planar electrodes and may be disposed at opposite substrates. When a voltage is applied to the electrode layer 312a and electrode layer 312b, a vertical electric field may be generated across the CLC layer 320. As the applied voltage gradually increases, the pitch of the helical twist structure of the CLC layer 320 may gradually increase and, accordingly, the reflection band of the CLC layer 320 may gradually shift to a longer wavelength. When the applied voltage is sufficiently high, the helical twist of the CLC layer 320 may be fully unwound, and the CLC optical element 300 may be switched to a transparent state from a reflective state.

Although not shown, in some embodiments, the electrode layer 312a and electrode layer 312b may be disposed at the same substrate. An electrical insulation layer may be disposed between the electrode layer 312a and electrode layer 312b. One of the electrode layer 312a and electrode layer 312b may include a continuous planar electrode, and the other may include patterned electrodes. When a voltage is applied to the electrode layer 312a and electrode layer 312b, a horizontal (or an in-plane) electric field may be generated across the CLC layer 320. As the applied voltage gradually increases, the pitch of the helical twist structure of the CLC layer 320 may gradually increase and, accordingly, the reflection band of the CLC layer 320 may gradually shift to a longer wavelength. When the applied voltage is sufficiently high, the helical twist of the CLC layer 320 may be fully unwound, and the CLC optical element 300 may be switched to a transparent state from a reflective state.

Figure 4A:
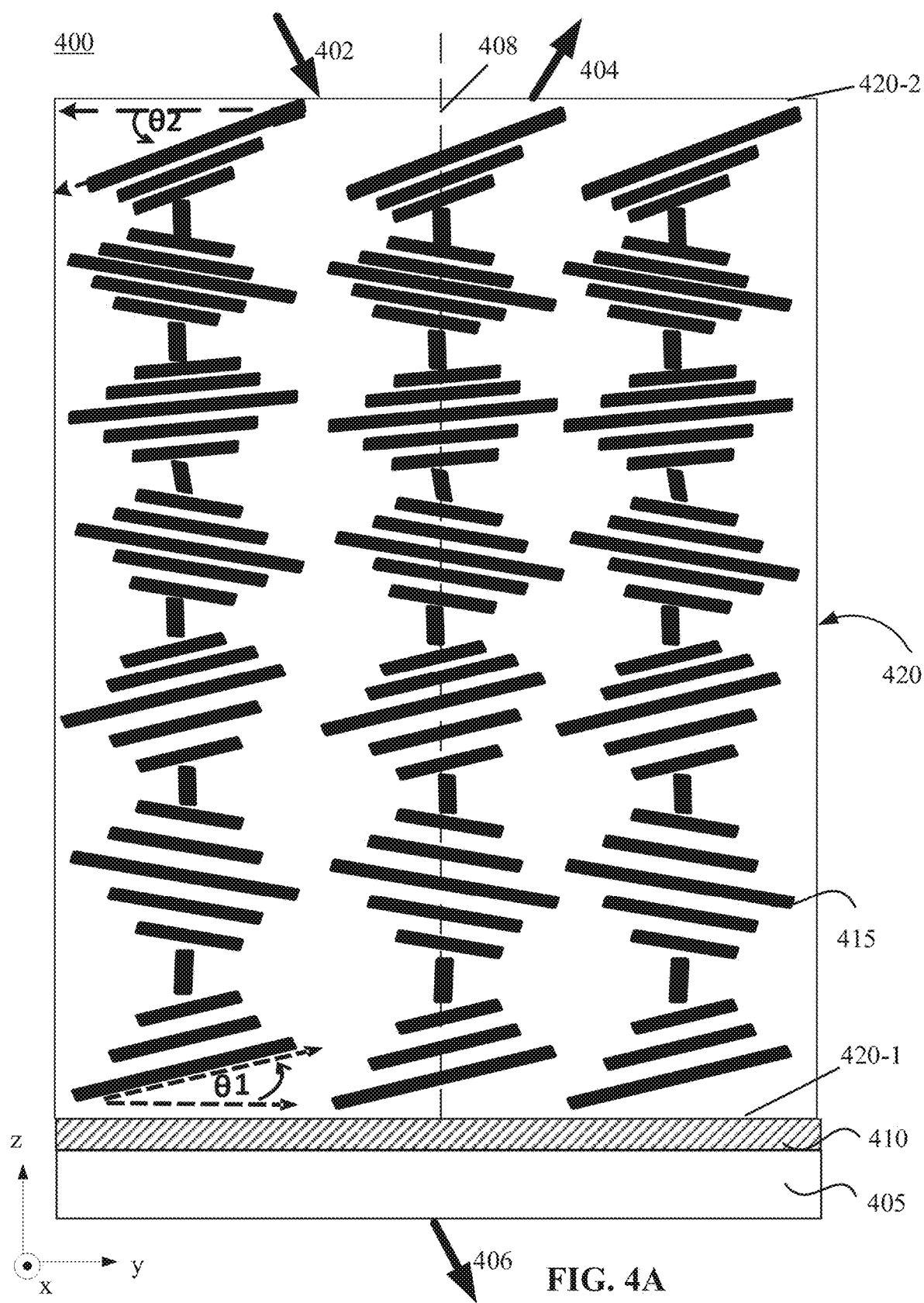
FIG. 4A illustrates a cross-sectional view of a CLC optical element, according to another embodiment of the present disclosure.

FIG. 4A illustrates a y-z sectional view of a CLC optical element 400, according to another embodiment of the present disclosure. In some embodiments, the CLC optical element 400 may function as a broadband CLC reflective polarizer 400 with suppressed light leakage and improved extinction ratio for both on-axis and off-axis incident lights. The CLC optical element 400 shown in FIG. 4A may include elements that are the same as or similar to those included in the CLC optical element 200 shown in FIGS. 2A and 2B. As shown in FIG. 4A, the CLC optical element 400 may include a substrate 405, an alignment structure 410 disposed at (e.g., on) the substrate 405, and an optical film 420 (e.g., a CLC layer 420) disposed at (e.g., on) the alignment structure 410. The CLC layer 420 may be an embodiment of the CLC layer 220 shown in FIGS. 2A and 2B. In some embodiments, the CLC layer 420 may function as a polarizing film. The substrate 405 may be an embodiment of the substrate 205. The alignment structure 410 may be an embodiment of the alignment structure 210 shown in FIGS. 2A and 2B. Detailed descriptions of the same or similar elements may refer to the above descriptions rendered in connection with FIGS. 2A and 2B. Although the embodiment of the CLC layer 220 shown in FIGS. 2A and 2B (where pretilt angles are positive) is used as an example of the CLC layer 420 for illustrative purposes, the CLC layer 420 may adopt the embodiment of the CLC layer 240 shown in FIG. 2C (where pretilt angles are negative), or the embodiment of the CLC layer 260 shown in FIG. 2D (where pretilt angles have different signs).

In some embodiments, the CLC optical element 400 may include two substrates and two alignment structures, similar to the embodiment shown in FIG. 2E. In some embodiments, the CLC optical element 400 may further include two electrode layers, similar to the embodiment shown in FIG. 3. In some embodiments, the CLC optical element 400 may include passive LCs. In some embodiments, the CLC optical element 400 may include active LCs. In some embodiments, the CLC optical element 400 may include both passive LCs and active LCs.

The CLC layer 420 may include CLCs arranged to have a helical twist structure of a varying (e.g., non-constant) helix pitch, e.g., a gradient helix pitch. In some embodiments, the helix pitch may gradually increase or decrease in a predetermined direction (e.g., in a helical axis direction). For illustrative purposes, in the embodiment shown in FIG. 4A, the varying helix pitch is shown as gradually increasing along the helical axis of the CLC layer 420, e.g., along the +z-axis direction as shown in FIG. 4A. The varying helix pitch configuration may result in a broad reflection band for the CLC layer 420, resulting in a broadband CLC reflective polarizer 400. In some embodiments, the CLC reflective polarizer 400 may be coupled to a broadband polychromatic light source (not shown), such as a 300-nm-bandwidth light source covering the visible wavelength range (e.g., about 380 nm to about 700 nm).

For discussion purposes, the CLC optical element 400 shown in FIG. 4A is described as an LHCLC refractive polarizer having a 300-nm-bandwidth reflection band covering the visible wavelength range. A broadband unpolarized light 402 may be incident onto a shorter pitch side (e.g., an upper side shown in FIG. 4A) of the CLC optical element 400. For discussion purposes, the broadband unpolarized light 402 may include components of LHCP blue, green, and red lights, and components of RHCP blue, green, and red lights. The blue, green, and red lights may have a central wavelength of about 450 nm, about 530 nm, and about 650 nm, respectively. When propagating through the CLC layer 420, the components of LHCP blue, green, and red lights may be substantially reflected by the CLC layer 420 as an LHCP blue light, an LHCP green light, and an LHCP red light, respectively, which may be subsequently combined to be visually observed as a broadband LHCP light 404. The components of RHCP blue, green, and red lights may be substantially transmitted by the CLC layer 420 as an RHCP blue light, an RHCP green light, and an RHCP red light, respectively, which may be subsequently combined to be visually observed as a broadband RHCP light 406.

In some embodiments, the CLC layer 420 may have a heliconical structure, in which LC molecules 415 may rotate around a helical axis 408, and the LC directors of the LC molecules 415 may have oblique angles with respect to the helical axis (the oblique angles being complementary to the pretilt angles of the LC molecules 415). The LC molecules 415 may be aligned in predetermined intermediate pretilt angles. In some embodiments, the LC molecules 415 disposed adjacent a first surface 420-1 (e.g., at the first surface 420-1 or at a first region substantially close to the first surface 420-1) of the CLC layer 420 may be arranged in a first pretilt angle $\theta 1$, and the LC molecules 415 disposed adjacent a second surface 420-2 (e.g., at the second surface 420-2 or at a second region substantially close to the second surface 420-2) of the CLC layer 420 may be arranged in a second pretilt angle $\theta 2$. The LC molecules 415 within the bulk of the CLC layer 420 (e.g., a region or space between the first surface 420-1 and the second surface 420-2) may gradually change from the first pretilt angle $\theta 1$ to the second pretilt angle $\theta 2$, when the first pretilt angle $\theta 1$ is different from the second pretilt angle $\theta 2$. When the first pretilt angle $\theta 1$ is the same as the second pretilt angle $\theta 2$, the LC molecules 415 within the bulk of the CLC layer 420 may be substantially aligned in the same pretilt angle, e.g., the angle $\theta 1$.

In some embodiments, the first pretilt angle $\theta 1$ and the second pretilt angle $\theta 2$ may be acute angles with the same sign. For example, both of the first pretilt angle $\theta 1$ and the second pretilt angle $\theta 2$ may be positive angles or negative angles. For illustrative purposes, as shown in FIG. 4A, both of the first pretilt angle $\theta 1$ and the second pretilt angle $\theta 2$ of the LC molecules 415 may be positive angles. When the first pretilt angle $\theta 1$ and the second pretilt angle $\theta 2$ are acute angles with the same sign, in some embodiments, the first pretilt angle $\theta 1$ and the second pretilt angle $\theta 2$ may have the same value, or different values. In some embodiments, the first pretilt angle $\theta 1$ and the second pretilt angle $\theta 2$ may be acute angles with different signs (e.g., one being positive and one being negative). In some embodiments, when the first pretilt angle $\theta 1$ and the second pretilt angle $\theta 2$ may be acute angles with different signs, the first pretilt angle $\theta 1$ and the second pretilt angle $\theta 2$ may have the same absolute value or may have different absolute values.

Referring to FIG. 4A, to suppress the light leakage and increase the extinction ratio of the CLC reflector polarizer 400, the first pretilt angle $\theta 1$ and the second pretilt angle $\theta 2$ may be acute angles having the same sign. In some embodiments, at least one of the first pretilt angle $\theta 1$ or the second pretilt angle $\theta 2$ may be configured to be in a range of greater than 10° and less than 80°, or in a range of greater than −80° and less than −10°, or in a range of greater than or equal to about 25° and less than or equal to about 50°, or in a range of greater than or equal to about −50° and less than or equal to about −25°. For example, in some embodiments, both of the first pretilt angle $\theta 1$ and the second pretilt angle $\theta 2$ may be configured to be in the range of greater than or equal to about 25° and less than or equal to about 50°, or in the range of greater than or equal to about −50° and less than or equal to about −25°.

In some embodiments, at least one of the first pretilt angle $\theta 1$ or the second pretilt angle $\theta 2$ may be configured to be in a range of greater than or equal to about 25° and less than or equal to about 40°, or in a range of greater than or equal to about −40° and less than or equal to about −25°. For example, in some embodiments, both of the first pretilt angle $\theta 1$ and the second pretilt angle $\theta 2$ may be configured to be in a range of greater than or equal to about 25° and less than or equal to about 40°, or in a range of greater than or equal to about −40° and less than or equal to about −25°.

In some embodiments, at least one of the first pretilt angle $\theta 1$ and or second pretilt angle $\theta 2$ may be configured to be in a range of greater than or equal to about 30° and less than or equal to about 40°, or in a range of greater than or equal to about −40° and less than or equal to about −30°. For example, in some embodiments, both of the first pretilt angle $\theta 1$ and the second pretilt angle $\theta 2$ may be configured to be in the range of greater than or equal to about 30° and less than or equal to about 40°, or in the range of greater than or equal to about −40° and less than or equal to about −30°.

In some embodiments, at least one of the first pretilt angle $\theta 1$ or the second pretilt angle $\theta 2$ may be configured to be in a range of greater than or equal to about 40° and less than or equal to about 50°, or in a range of greater than or equal to about −50° and less than or equal to about −40°. For example, in some embodiments, both of the first pretilt angle $\theta 1$ and the second pretilt angle $\theta 2$ may be configured to be in a range of greater than or equal to about 40° and less than or equal to about 50°, or in a range of greater than or equal to about −50° and less than or equal to about −40°.

In some embodiments, the first pretilt angle $\theta 1$ may be about 30° (e.g., 28°, 29°, 30°, 31°, 32°), and the second pretilt angle $\theta 2$ may be about 40° (e.g., 38°, 39°, 40°, 41°, 42°). In some embodiments, the first pretilt angle $\theta 1$ may be about 30°, and the second pretilt angle $\theta 2$ may be about 30°. In some embodiments, the first pretilt angle $\theta 1$ may be about 40°, and the second pretilt angle $\theta 2$ may be about 30°. In some embodiments, the first pretilt angle $\theta 1$ may be about 40°, and the second pretilt angle $\theta 2$ may be about 40°. In some embodiments, the first pretilt angle $\theta 1$ may be about −30°, and the second pretilt angle $\theta 2$ may be about −40°. In some embodiments, the first pretilt angle $\theta 1$ may be about −30°, and the second pretilt angle $\theta 2$ may be about −30°. In some embodiments, the first pretilt angle $\theta 1$ may be about −40°, and the second pretilt angle $\theta 2$ may be about −30°. The first pretilt angle $\theta 1$ and the second pretilt angle $\theta 2$ may be any other value disclosed herein or in any range disclosed herein.

In some embodiments, the first pretilt angle $\theta 1$ and the second pretilt angle $\theta 2$ of the LC molecules 415 in the CLC layer 420 may have different signs. Detailed examples for the first pretilt angle $\theta 1$ and the second pretilt angle $\theta 2$ having different signs can refer to the above descriptions rendered in connection with FIG. 2D.

For discussion purposes, FIG. 4A shows the broadband unpolarized light 402 as an off-axis incident light. In some embodiments, the broadband unpolarized light 402 may be an on-axis incident light that is substantially normally incident onto the CLC layer 420. In addition to having a broad reflection band, the CLC optical element 400 including the LC molecules 415 aligned in the predetermined intermediate pretilt angles may also have suppressed light leakage and improved extinction ratios for both on-axis and off-axis incident lights.

Figure 4B:
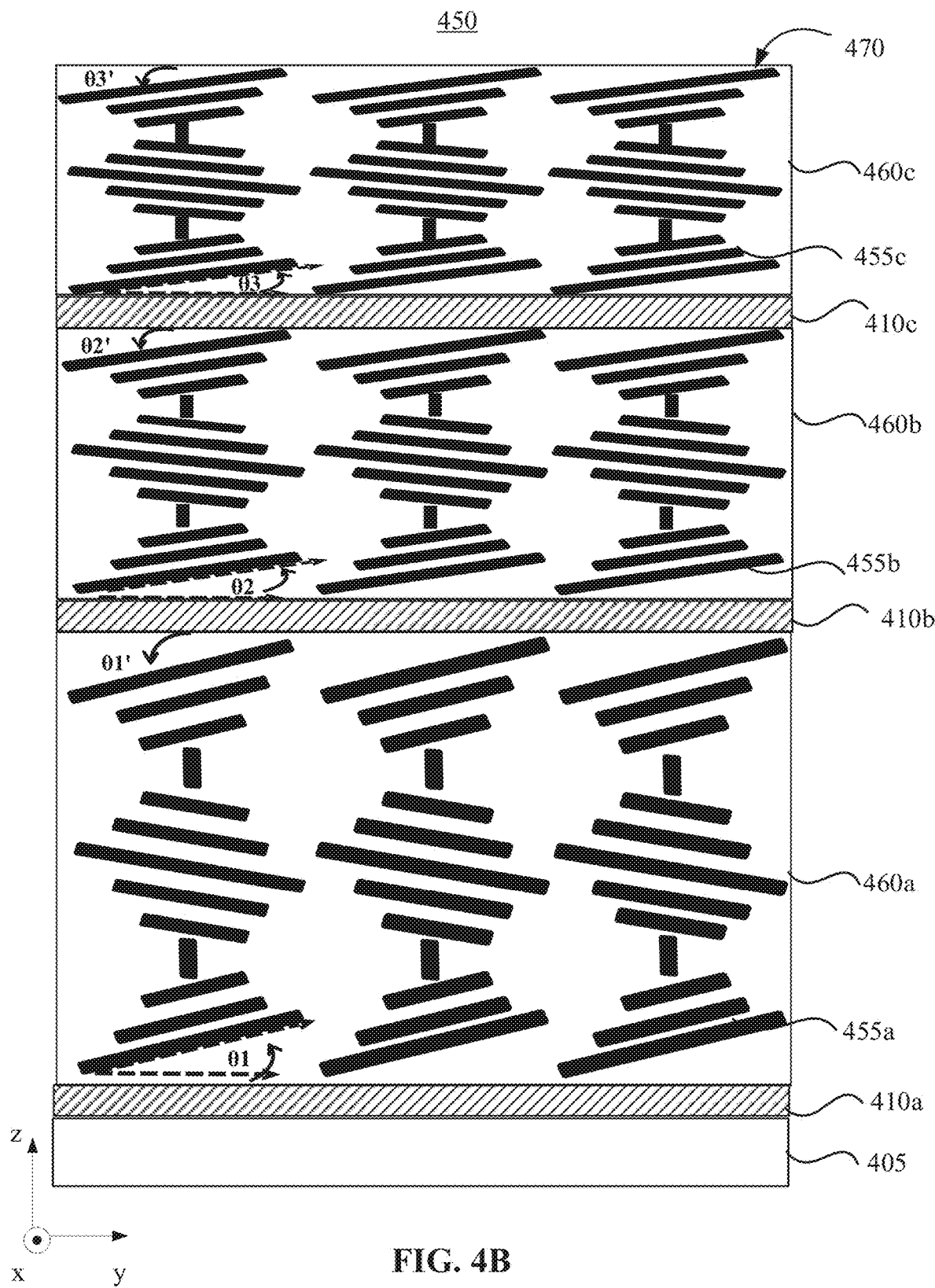
FIG. 4B illustrates a cross-sectional view of a CLC optical element, according to another embodiment of the present disclosure.

FIG. 4B illustrates a y-z sectional view of a CLC optical element 450, according to another embodiment of the present disclosure. The CLC optical element 450 shown in FIG. 4B may include elements that are the same as or similar to those included in the CLC optical element 400 shown in FIG. 4A. Detailed descriptions of the similar elements may refer to the above descriptions rendered in connection with FIG. 4A. As shown in FIG. 4B, the CLC optical element 450 may include a CLC-layer stack 470 (or optical film 470), which includes a plurality of CLC layers 460a, 460b, and 460c stacked together. The CLC optical element 450 may include a substrate 405, and a plurality of alignment structures 410a, 410b, and 410c. Although the top surface of the CLC optical element 450 is shown to be exposed to air without an alignment structure, in some embodiments, an additional alignment structure may be disposed at the top surface of the CLC optical element 450.

Each CLC layer may include LC molecules aligned in predetermined intermediate pretilt angles. For example, the first CLC layer 460a may include LC molecules aligned in a first pretilt angle θ1 and a second pretilt angle θ1'. The second CLC layer 460b may include LC molecules aligned in a first pretilt angle θ2 and a second pretilt angle θ2'. The third CLC layer 460c may include LC molecules aligned in a first pretilt angle θ3 and a second pretilt angle θ3'. In each CLC layer, although the same sign configuration is shown for illustrative purposes, the first and second pretilt angles may be configured to have any of the various combinations of values and signs as described above in connection with FIG. 2A-FIG. 4A. For example, the pair of θ1 and θ1' (or the pair of θ2 and θ2', or the pair of θ3 and θ3') may have the same value and the same sign, the same value and different signs, different values and same sign, or different values and different signs. In some embodiments, the pairs of θ1 and θ1', θ2 and θ2', and θ3 and θ3' may have the same sign (e.g., all being positive or all being negative) with varying values. For example, the values of these pretilt angles may gradually increase or decrease from layer to layer. Each of the pretilt angles may be within any of the disclosed range of angles or may be any of the disclosed values.

In some embodiments, each CLC layer shown in FIG. 4B may be disposed at (e.g., on) an alignment structure, which may be configured to at least partially align the LC molecules in the CLC layer in the predetermined intermediate pretilt angles. Each CLC layer may include CLCs arranged to have a helical twist structure with a constant or a varying (e.g., gradient) helix pitch. That is, each CLC layer may be a single-pitch CLC layer or a gradient-pitch CLC layer. When each CLC layer is a single-pitch CLC layer having a constant helix pitch, the constant helix pitches may vary from layer to layer (e.g., at least two helix pitches of the plurality of single-pitch CLC layers may be different). In some embodiments, at least two (e.g., all) of the constant helix pitches of the single-pitch CLC layers may be the same. When each CLC layer is a gradient-pitch CLC layer having a varying (e.g., gradient) helix pitch, in some embodiments, at least two (e.g., all) of the varying helix pitches in at least two (e.g., all) of the varying-pitch CLC layers may be different. When each CLC layer includes a varying (e.g., gradient) helix pitch, in some embodiments, at least two (e.g., all) of the varying helix pitches in at least two (e.g., all) of the varying-pitch CLC layers may be the same. When single-pitch CLC layers are included, the single-pitch CLC layers may have narrow reflection bandwidths each configured for lights of a specific narrow wavelength range. In some embodiments, the single-pitch CLC layers may be optically coupled to corresponding narrowband (e.g., 30-nm bandwidth) light sources emitting lights in different colors (e.g., different wavelengths). In some embodiments, the reflection bands of the single-pitch CLC layers may not overlap with each other. In some embodiments, the reflection bands of the single-pitch CLC layers may overlap (e.g., slightly overlap) with each other, such that an overall reflection band of the CLC optical element 450 may be continuous in a broad wavelength range. In some embodiments, the varying-pitch CLC layers may each have a reflection bandwidth configured for lights of a specific wavelength range. In some embodiments, the reflection bands of the varying-pitch CLC layers may or may not overlap with one another.

For illustrative purposes, FIG. 4B shows that the CLC optical element 450 includes three alignment structures 410a, 410, and 410c, and three CLC layers 460a, 460, and 460c having a heliconical superstructure. The number of alignment structures and/or CLC layers are not limited to three in the stacked CLC optical element 450. Any suitable number of CLC layers and any suitable number of alignment structures may be included in the CLC optical element 450. As shown in FIG. 4B, the CLC layers 460a, 460b, and 460c may be disposed at the alignment structures 410a, 410, and 410c, respectively. The alignment structures 410a, 410, and 410c may be configured to at least partially align LC molecules in the respective CLC layers 460a, 460b, and 460c in predetermined intermediate pretilt angles.

In some embodiments, at least one of the three CLC layer 460a, 460b, and 460c (e.g., one, two, or three) may include a helical twist structure having a constant helix pitch (e.g., the helix pitches of the helical twist structures of different CLC layers may be the same). For example, in some embodiments, each of the three CLC layer 460a, 460b, and 460c may include a helical twist structure having a constant helix pitch (e.g., the helix pitches of the helical twist structure of the CLC layers may be the same). In some embodiments, the helix pitches of the helical twist structures of the CLC layers 460a, 460b, and 460c may be different, e.g., gradually increasing or decreasing from one side of the CLC optical element 450 to another side (e.g., from CLC layer 460a to the CLC layer 460d). In some embodiments, each of the CLC layers 460a, 460b, and 460c may have a narrow reflection bandwidth. The narrow reflection bandwidths may or may not overlap with one another. In some embodiments, one or more of the CLC layers 460a, 460b, and 460c may be coupled to one or more corresponding narrowband (e.g., 40-nm bandwidth) light sources configured to emit lights in different colors (e.g., different wavelength ranges). For example, in some embodiments, the CLC layers 460a, 460b, and 460c may have a reflection band in the wavelength ranges of red, green, and blue lights, respectively. In some embodiments, the CLC layers 460a, 460b, and 460c may be coupled to narrowband red, green, and blue light sources having a central wavelength of about 650 nm, 530 nm, and 450 nm, respectively.

The stacked configuration of the three CLC layers 460a, 460b, and 460c as shown in FIG. 4B is for illustration only. Other suitable configurations may be used. In some embodiments, when the LC molecules in the CLC layers 460a, 460b, and 460c are aligned in substantially the same pretilt angles (or the same combination of first and second pretilt angles), e.g., pretilt angles θ1 (presuming that θ1' is substantially the same as θ1 for simplicity of discussion), θ2

(presuming that θ2' is substantially the same as θ2 for simplicity of discussion), and θ3 (presuming that θ3' is substantially the same as θ3 for simplicity of discussion) are substantially the same, the CLC optical element 450 may function as a broadband CLC reflective polarizer with suppressed light leakage and improved extinction ratio for both on-axis and off-axis incident lights. In some embodiments, when the pretilt angles θ1, θ2, and θ3 of the LC molecules in the CLC layers 460a, 460b, and 460c vary from layer to layer, the CLC optical element 450 may function as an optical diffuser. For example, the pretilt angles θ1, θ2, and θ3 of the LC molecules in the CLC layers 460a, 460b, and 460c may gradually increase or decrease from layer to layer. In some embodiments, the pretilt angles θ1, θ2, and θ3 of the LC molecules in the CLC layers 460a, 460b, and 460c may vary randomly. In some embodiments, the optical diffuser may be configured to provide a directional scattering, rather than a random scattering, to an incident light. For example, the optical diffuser may be configured to primarily or substantially backward scatter a circularly polarized incident light having the same handedness as that of the helical twist structures of the CLC layers 460a, 460b, and 460c. In some embodiments, the optical diffuser may be configured to primarily or substantially forward scatter a circularly polarized incident light having a handedness opposite to that of the helical twist structures of the CLC layers 460a, 460b, and 460c. With the pretilt angles within the disclosed range of angles, the optical diffuser may improve uniformity of lights illuminating an object. The optical diffuser may also improve visibility of an image created by an optical system based on lights having a wider range of angles.

Figure 5A:
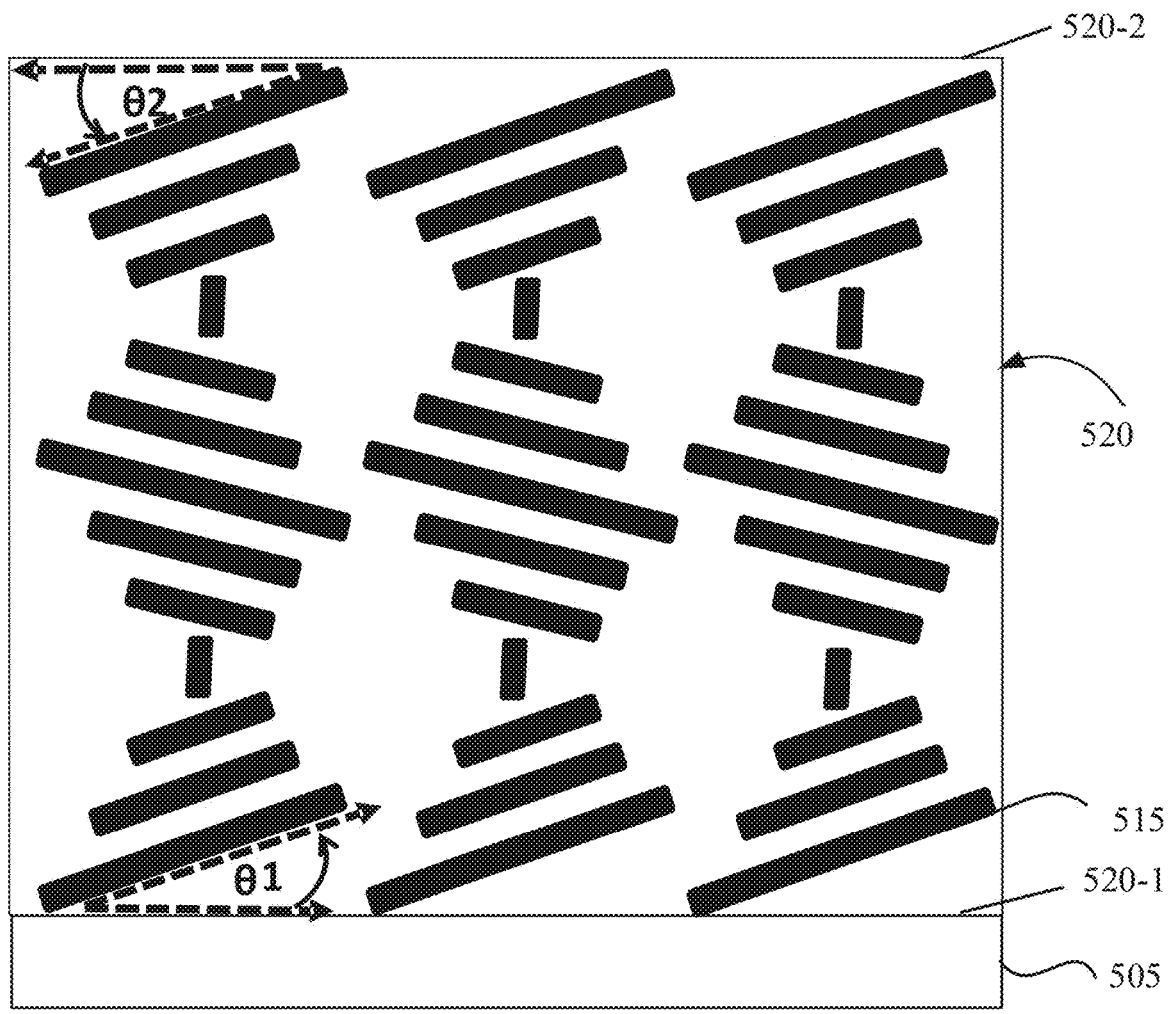
FIG. 5A illustrates a cross-sectional view of a CLC optical element, according to another embodiment of the present disclosure.

Embodiments illustrated in FIGS. 2A-4B show that the alignment structure may be disposed at the substrate, and that the alignment structure and the substrate may be individual elements of the disclosed optical element. In some embodiments, the alignment structure may be an integral part of the substrate. For example, the alignment structure may be etched on, or at least partially in, a surface of the substrate. In some embodiments, the alignment structure may be integrally formed inside the substrate. FIG. 5A illustrates a cross-sectional view of a CLC optical element 500, according to another embodiment of the present disclosure. In some embodiments, the CLC optical element 500 may function as a CLC reflective polarizer. The CLC optical element 500 shown in FIG. 5A may include elements that are the same as or similar to those included in the CLC optical element 200 shown in FIGS. 2A and 2B. For example, the CLC optical element 500 may include a substrate 505 and an optical film 520 (e.g., an CLC layer 520). In some embodiments, the CLC layer 520 may function as a polarizing film. The CLC layer 520 may be an embodiment of the CLC layer 220 shown in FIGS. 2A and 2B. Although for illustrative purposes, the CLC layer 520 is shown to be similar to the CLC layer 220 shown in FIGS. 2A and 2B, in other embodiments, the CLC layer 520 may be similar to any other CLC layer disclosed herein, such as the CLC layer 240 shown in FIG. 2C, the CLC layer 260 shown in FIG. 2D, the CLC layer 280 shown in FIG. 2E, the CLC layer 320 shown in FIG. 3, the CLC layer 420 shown in FIG. 4A, or the CLC-layer stack 470 shown in FIG. 4B. Detailed descriptions of the same or similar elements may refer to the above descriptions rendered in connection with FIG. 2A-FIG. 4B.

The substrate 505 may include, as an integral part, an alignment structure configured to align LC molecules 515 included in the CLC layer 520 in predetermined intermediate pretilt angles. In some embodiments, the substrate 505 may be fabricated based on a nanostructure alignment material including a random distribution of planar (or horizontal) and vertical alignment polyimide ("PI") domains. In some embodiments, the substrate 505 may be fabricated based on a photoalignment material configured to align LCs in the predetermined intermediate pretilt angle without a mechanical rubbing. For example, the substrate 505 may be fabricated based on a photoalignment material configured to provide a broad range of pretilt angles (e.g., about 1° to 89°) depending on the irradiation dose (e.g., UV irradiation dose) applied to the photoalignment material. In some embodiments, the substrate 505 may be fabricated based on a photoalignment material including nanostructured domains of planar and vertical alignment PIs. In some embodiments, the substrate 505 may be fabricated based on an alignment material including a polyimide mixed with a liquid crystalline prepolymer. In some embodiments, the substrate 505 may include a hybrid alignment polymer network. In some embodiments, the hybrid alignment polymer may be a hybrid interpenetrating polymer network including an organic material, an inorganic material, or both. For example, the hybrid interpenetrating polymer network may include a combination of poly(vinyl cinnamate) ("PVCi") used for a planar alignment of LCs and poly(dimethyl siloxane) ("PDMS") used for a vertical alignment of LCs. Through controlling the concentration of the PDMS in the combination, the hybrid alignment polymer network may align LCs in the predetermined intermediate pretilt angle.

Figure 5B:
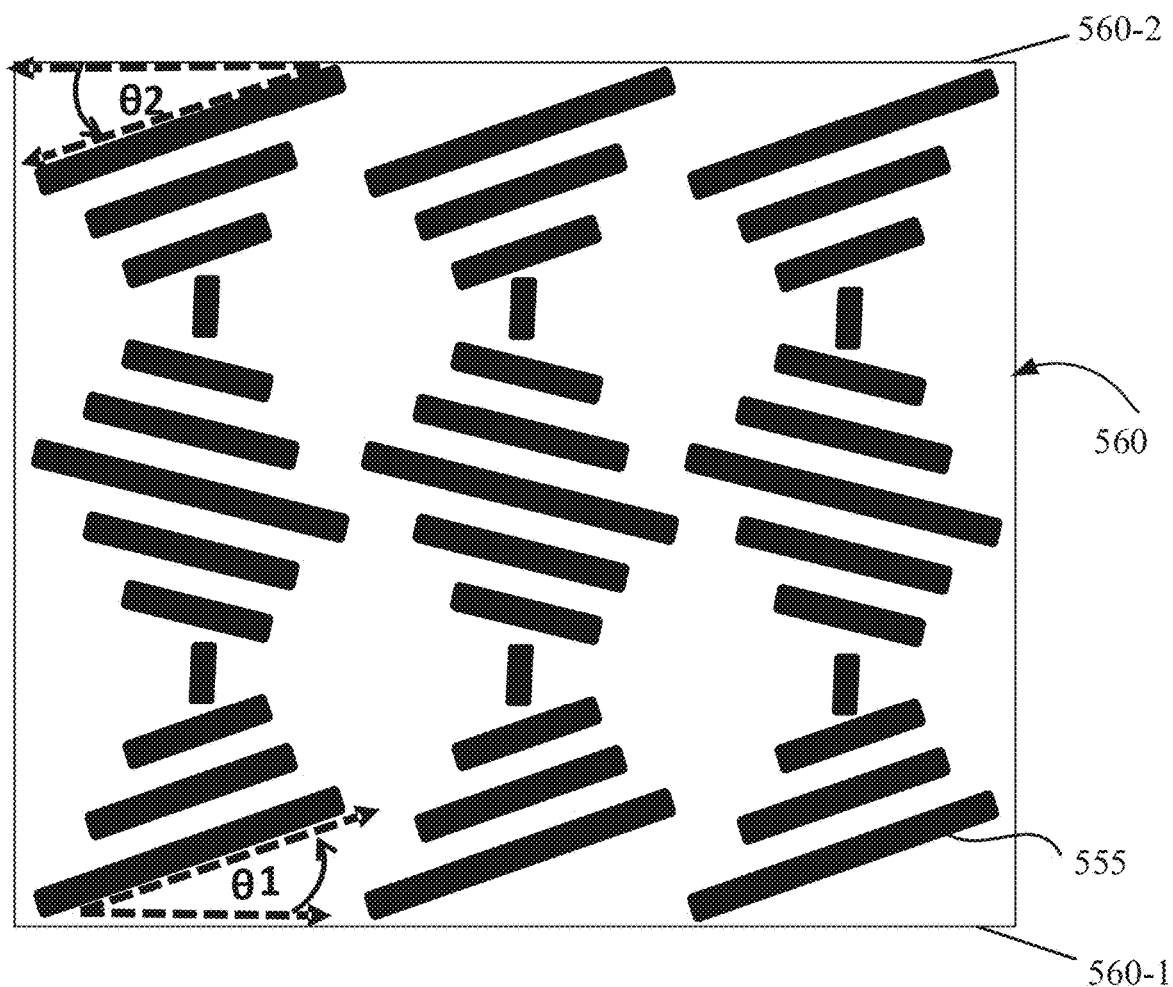
FIG. 5B illustrates a cross-sectional view of a CLC optical element, according to another embodiment of the present disclosure.

FIG. 5B illustrates a cross-sectional view of a CLC optical element 550, according to another embodiment of the present disclosure. The CLC optical element 550 shown in FIG. 5B may include elements that are the same as or similar to those included in the CLC optical element 200 shown in FIGS. 2A and 2B. For example, the CLC optical element 550 may include an optical film 560 (e.g., a CLC layer 560). The CLC layer 560 may be an embodiment of the CLC layer 220 shown in FIGS. 2A and 2B. In some embodiments, the CLC layer 560 may function as a polarizing film. In some embodiments, the CLC optical element 550 may function as a CLC reflective polarizer. Although for illustrative purposes, the CLC layer 560 is shown to be similar to the CLC layer 220 shown in FIGS. 2A and 2B, in other embodiments, the CLC layer 560 may be similar to any other CLC layer disclosed herein, such as the CLC layer 240 shown in FIG. 2C, the CLC layer 260 shown in FIG. 2D, the CLC layer 280 shown in FIG. 2E, the CLC layer 320 shown in FIG. 3, the CLC layer 420 shown in FIG. 4A, or the CLC-layer stack 470 shown in FIG. 4B. Detailed descriptions of the same or similar elements may refer to the above descriptions rendered in connection with FIG. 2A-FIG. 4B.

In the CLC optical element 550 shown in FIG. 5B, the CLC layer 560 may include LC molecules 555 aligned in predetermined intermediate pretilt angles. In this embodiment, alignment structure and/or substrate may be omitted. In other words, a first surface 560-1 and a second surface 560-2 of the CLC layer 560 may be exposed to air. In some embodiments, the pretilt angles of the LC molecules 555 may be directly controlled by an external field, e.g., an external electric field, an external magnetic field, an external light, or any combination thereof. For example, the LC molecules 555 in the CLC layer 560 may include photosensitive units or photosensitive functional groups. A photoalignment of photosensitive units in the LC molecules 555 may occur in a volume of the CLC layer 560 when the photosensitive units are subject to an irradiation. In some embodiments, the photosensitive units of the LC molecules 555 may be aligned in various pretilt angles (e.g., greater than 10° and less than 80°, or greater than −80° and less than −10° depending on the applied irradiation dose (e.g., UV irradiation dose). Accordingly, the LC molecules 555 may be aligned in various pretilt angles depending on the applied irradiation dose (e.g., UV irradiation dose). In some embodiments, the pretilt angles of the photosensitive units of the LC molecules 555 may increase as the applied irradiation dose increases. Thus, through controlling the irradiation dose applied to the LC molecules 555, the LC molecules 555 may be aligned in the predetermined intermediate pretilt angles. In some embodiments, through controlling the electric and/or magnetic field applied to the LC molecules 555, the LC molecules 555 may be aligned in the predetermined intermediate pretilt angles, then stabilized by a polymer network formed in the CLC layer 560.

The CLC optical elements and the features of the CLC optical elements as described in various embodiments may be combined. For example, the CLC layer 420 including CLCs arranged to have a gradient helix pitch shown in FIG. 4A may be coupled to two electrode layers to be switchable by an external electric field. That is, some features included in the embodiment shown in FIG. 3 may be combined with features shown in FIG. 4A. In some embodiments, each of the plurality of CLC layers included in the CLC-layer stack 470 shown in FIG. 4B may be an embodiment of the CLC layer 220 shown in FIGS. 2A and 2B, the CLC layer 240 shown in FIG. 2C, the CLC layer 260 shown in FIG. 2D, the CLC layer 280 shown in FIG. 2E, the CLC layer 320 shown in FIG. 3, the CLC layer 420 shown in FIG. 4A, the CLC layer 520 shown in FIG. 5A, or the CLC layer 560 shown in FIG. 5B. In some embodiments, the CLC optical element 450 shown in FIG. 4B may include electrode layers similar to those shown in FIG. 3, applied to two ends of one or more CLC layers 460a-460c to switch the orientations of the LC molecules 455a-455c. In some embodiments, one or more alignment structures and/or the substrate may be omitted in the CLC optical element 450 shown in FIG. 4B.

In some embodiments, one or more CLC layers including single-pitch CLCs, such as the CLC layer 220 shown in FIGS. 2A and 2B, the CLC layer 240 shown in FIG. 2C, the CLC layer 260 shown in FIG. 2D, the CLC layer 280 shown in FIG. 2E, the CLC layer 320 shown in FIG. 3, the CLC layer 520 shown in FIG. 5A, or the CLC layer 560 shown in FIG. 5B may be combined with one or more CLC layers including gradient pitch CLCs, such as the CLC layer 420 shown in FIG. 4A. For example, an optical element may include one or more CLC layers 420 having a varying helix pitch and one or more CLC layer having a constant helix pitch. In some embodiments, one or more compensation films, such as positive C-plates, may be combined with the disclosed CLC layer (or CLC reflective polarizer), such as the CLC layer 220 shown in FIGS. 2A and 2B, the CLC layer 240 shown in FIG. 2C, the CLC layer 260 shown in FIG. 2D, the CLC layer 280 shown in FIG. 2E, the CLC layer 320 shown in FIG. 3, the CLC layer 420 shown in FIG. 4A, the CLC-layer stack 470 shown in FIG. 4B, the CLC layer 520 shown in FIG. 5A, or the CLC layer 560 shown in FIG. 5B, to further suppress the light leakage for off-axis incident angles.

The features shown in FIG. 5A and FIG. 5B may be applied to other embodiments shown in FIG. 2A-FIG. 4B. For example, the substrate 505 shown in FIG. 5A that includes an alignment structure as an integral part may be included in the embodiments shown in FIG. 2A-FIG. 2D to replace the substrate 205 and the alignment structure 210. In some embodiments, the substrate 505 may be included in the embodiments shown in FIG. 2E and FIG. 3 to replace the substrate 205a and alignment structure 210a, and/or the substrate 205b and alignment structure 210b. In some embodiments, the substrate 505 may be included in the embodiment shown in FIG. 4A to replace the substrate 405 and the alignment structure 410. In some embodiments, the substrate 505 may be included in the embodiment shown in FIG. 4B to replace the substrate 405 and the alignment structure 410a. In some embodiments, the CLC layer 560 that includes LC molecules 555 aligned in predetermined intermediate pretilt angles may be included in the embodiment shown in FIGS. 2A and 2B to replace the CLC layer 220 and the alignment layer 210. In some embodiments, the CLC layer 560 that includes LC molecules 555 aligned in predetermined intermediate pretilt angles may be included in the embodiment shown in FIG. 2C to replace the CLC layer 240 and the alignment structure 210. In some embodiments, the CLC layer 560 that includes LC molecules 555 aligned in predetermined intermediate pretilt angles may be included in the embodiment shown in FIG. 2D to replace the CLC layer 260 and the alignment structure 210. In some embodiments, the CLC layer 560 that includes LC molecules 555 aligned in predetermined intermediate pretilt angles may be included in the embodiment shown in FIG. 2E to replace the CLC layer 280 and the alignment structures 210a and 210b. In some embodiments, the CLC layer 560 that includes LC molecules 555 aligned in predetermined intermediate pretilt angles may be included in the embodiment shown in FIG. 3 to replace the CLC layer 320 and the alignment structures 310a and 310b. In some embodiments, the CLC layer 560 that includes LC molecules 555 aligned in predetermined intermediate pretilt angles may be included in the embodiment shown in FIG. 4A to replace the CLC layer 420 and the alignment structure 410. In some embodiments, the CLC layer 560 that includes LC molecules 555 aligned in predetermined intermediate pretilt angles may be included in the embodiment shown in FIG. 4B to replace one or more of the combination of CLC layer 460a and alignment structure 410a, the combination of CLC layer 460b and the alignment structure 410b, or the combination of the CLC layer 460c and the alignment structure 410c.

Figure 6:
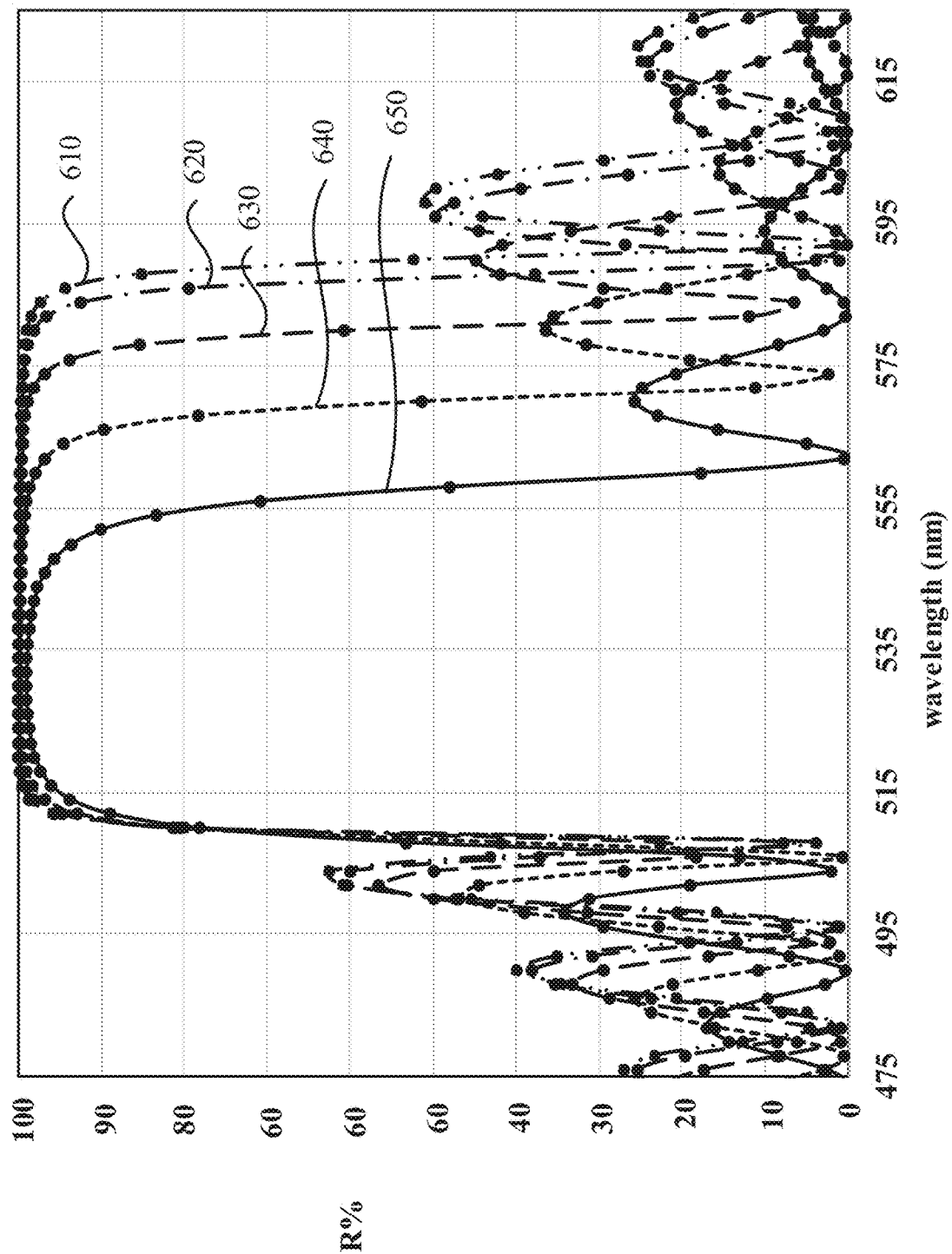
FIG. 6 illustrates simulation results showing a reflection band of a CLC optical element varying with pretilt angles of LC molecules, according to an embodiment of the present disclosure.

FIG. 6 illustrates simulation results showing a reflection band of a CLC optical element varying with pretilt angles of LC molecules, according to an embodiment of the present disclosure. As shown in FIG. 6, the horizontal axis is the incidence wavelength (unit: nm), and the vertical axis is the light reflectance (R %). LC molecules in the CLC layer may have substantially the same floor and ceiling pretilt angels. The light reflectance is calculated for a circularly polarized incident light having a same handedness as that of the helical twist structure in the CLC layer. The circularly polarized incident light is normally incident onto the CLC optical element. The wavelength range of the circularly polarized incident light is from 475 nm to 635 nm. In some embodiments, the CLC optical element may function as a CLC reflective polarizer.

In FIG. 6, curve 610 shows the light reflectance (R %) of the CLC optical element when the pretilt angles of the LC molecules are 0°. As shown in curve 610, the full width at half maximum intensity ("FWHM") of the selective reflection band of the CLC optical element is about 82 nm. Curve 620 shows the light reflectance (R %) of the CLC optical element when the pretilt angles of LC molecules are 10°. As shown in curve 620, the FWHM of the selective reflection band of the CLC optical element is about 78 nm. Curve 630 shows the light reflectance (R %) of the CLC optical element when the pretilt angles of LC molecules are 20°. As shown in curve 630, the FWHM of the selective reflection band of the CLC optical element is about 72 nm. Curve 640 shows the light reflectance (R %) of the CLC optical element when the pretilt angles of LC molecules are 30°. As shown in curve 640, the FWHM of the selective reflection band of the CLC optical element is about 61 nm. Curve 650 shows the light reflectance (R %) of the CLC optical element when the pretilt angles of LC molecules are 40°. As shown in curve 650, the FWHM of the selective reflection band of the CLC optical element is about 50 nm.

As shown in curves 610 to 650, when the pretilt angles of the LC molecules gradually increase (e.g., from 0° to 40°), the FWHM of the selective reflection band of the CLC optical element may gradually decrease. That is, when the pretilt angles of LC molecules gradually increase, the reflection bandwidth of the CLC optical element may decrease, due to a decrease in the effective birefringence of the LCs experienced by the circularly polarized incident light. Thus, through increasing the pretilt angles of the LC molecules in the CLC layer (e.g., to 20°, 30°, or 40°), the CLC optical element with a narrower reflection band and improved extinction ratios for on-axis and off-axis incident lights may be achieved, as compared to CLC optical elements with small pretilt angles (e.g., 0 to 10° or 0 to −10° pretilt angles of LC molecules aligned by a typical photoalignment or polyimide layer). Narrower band reflective polarizers may be useful and desirable in narrowband applications.

In addition, as shown in curves 610 to 650, when the pretilt angles of the LC molecules gradually increase (e.g., from 0° to 40°), the reflection band (or the center of the reflection band) of the CLC optical element is blue-shifted, e.g., shifted toward a shorter wavelength. For example, according to the simulation results, for an incident light having an incidence wavelength of about 560 nm, when the pretilt angles of the LC molecules are 0°, 10°, or 20°, the light reflectance is substantially the same (about 99%). When the pretilt angles of the LC molecules is 30°, the light reflectance decreases to about 97%. When the pretilt angles of the LC molecules is 40°, the light reflectance decreases to about 18%. When the pretilt angles of the LC molecules further increase from 40°, the light reflectance may be further decreased to be lower than 18%. That is, as the pretilt angles of the LC molecules in the CLC layer gradually increases, the reflectance of the CLC layer may gradually decrease. For example, when the pretilt angles of the LC molecules in the CLC layer are in a range of greater than or equal to about 70° and less than 80°, or greater than −80° and less than or equal to about −70°, the reflectance of the CLC layer may be substantially low. In addition, the reflectance of the CLC layer may also depend on a thickness of the CLC layer, for example, the reflectance of the CLC layer may increase as the thickness increases.

In some embodiments, a plurality of CLC layers may be stacked. In some embodiments, the CLC layers may include LC molecules with predetermined intermediate pretilt angles. In some embodiments, the CLC layers may have different reflection bands (or different helix pitches). The stacked CLC layers, such as the CLC-layer stack 470 shown in FIG. 4B, may achieve a broad reflection band, e.g., covering the visible wavelength range. In some embodiments, the reflection bands of the CLC layers may not overlap with each other. In some embodiments, the reflection bands of the CLC layers may overlap (e.g., slightly overlap) with each other, such that an overall reflection band of a CLC optical element may be continuous and broad. For example, a first CLC layer including LC molecules aligned in 40° pretilt angles (shown in curve 650) and having a reflection band ranging from about 510 nm to 560 nm may be stacked with a second CLC layer including LC molecules aligned in 40° pretilt angles and having a reflection band ranging from about 550 nm to 600 nm, such that the CLC optical element including the first and second CLC layers may have a broader reflection band and suppressed light leakage for both on-axis and off-axis incident lights.

Azimuthal angle of the LC molecules disposed adjacent a surface (e.g., at a first surface or in a region substantially close to the first surface, and/or at an opposing, second surface or in a region substantially close to the second surface) of the CLC layer may not affect the angular performance of the CLC optical element for an on-axis incident light and an off-axis incident light with a relatively small incident angle. The azimuthal angle of the LC molecules may slightly affect the angular performance of the CLC optical element for an off-axis incident light as the incident angle gradually increases.

Figure 7A:
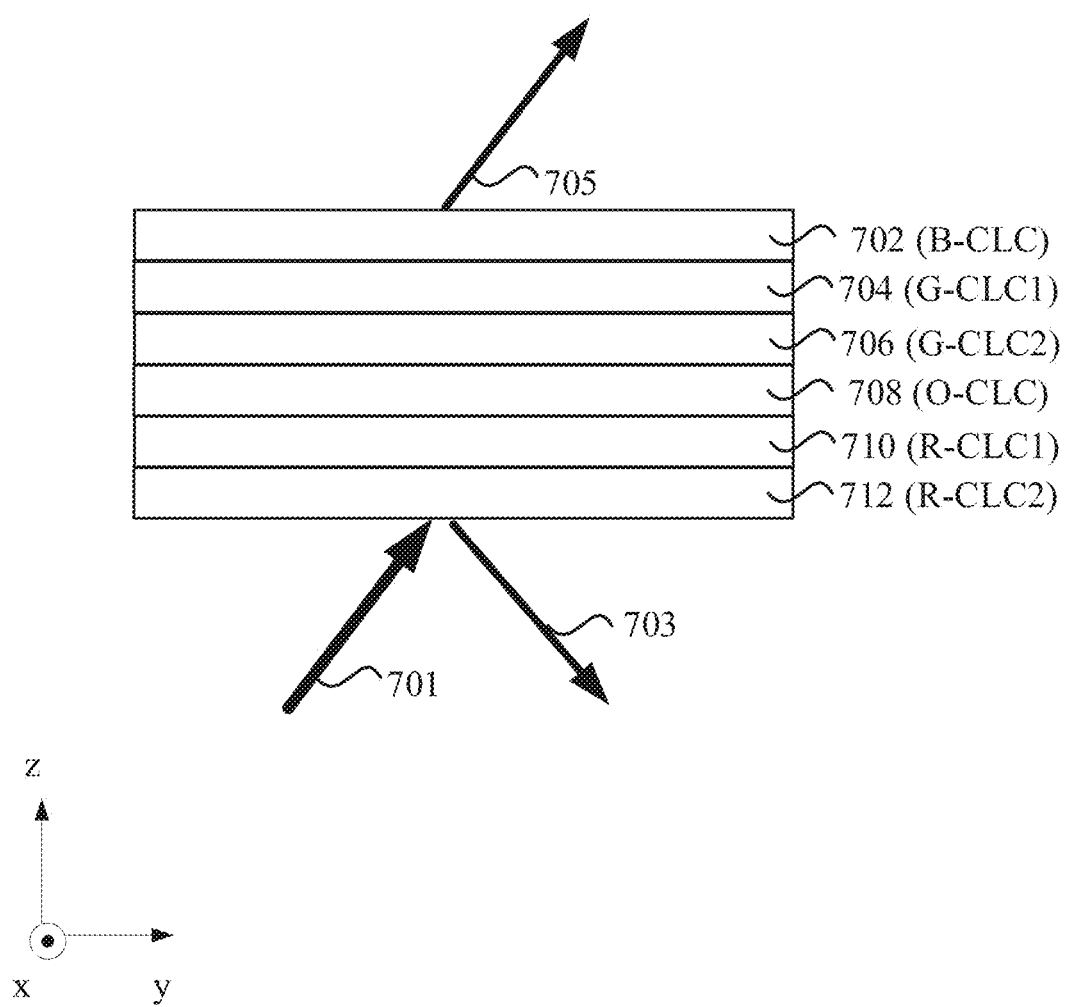
FIG. 7A illustrates a cross-sectional view of a broadband CLC optical element, according to an embodiment of the present disclosure.
Figure 7B:
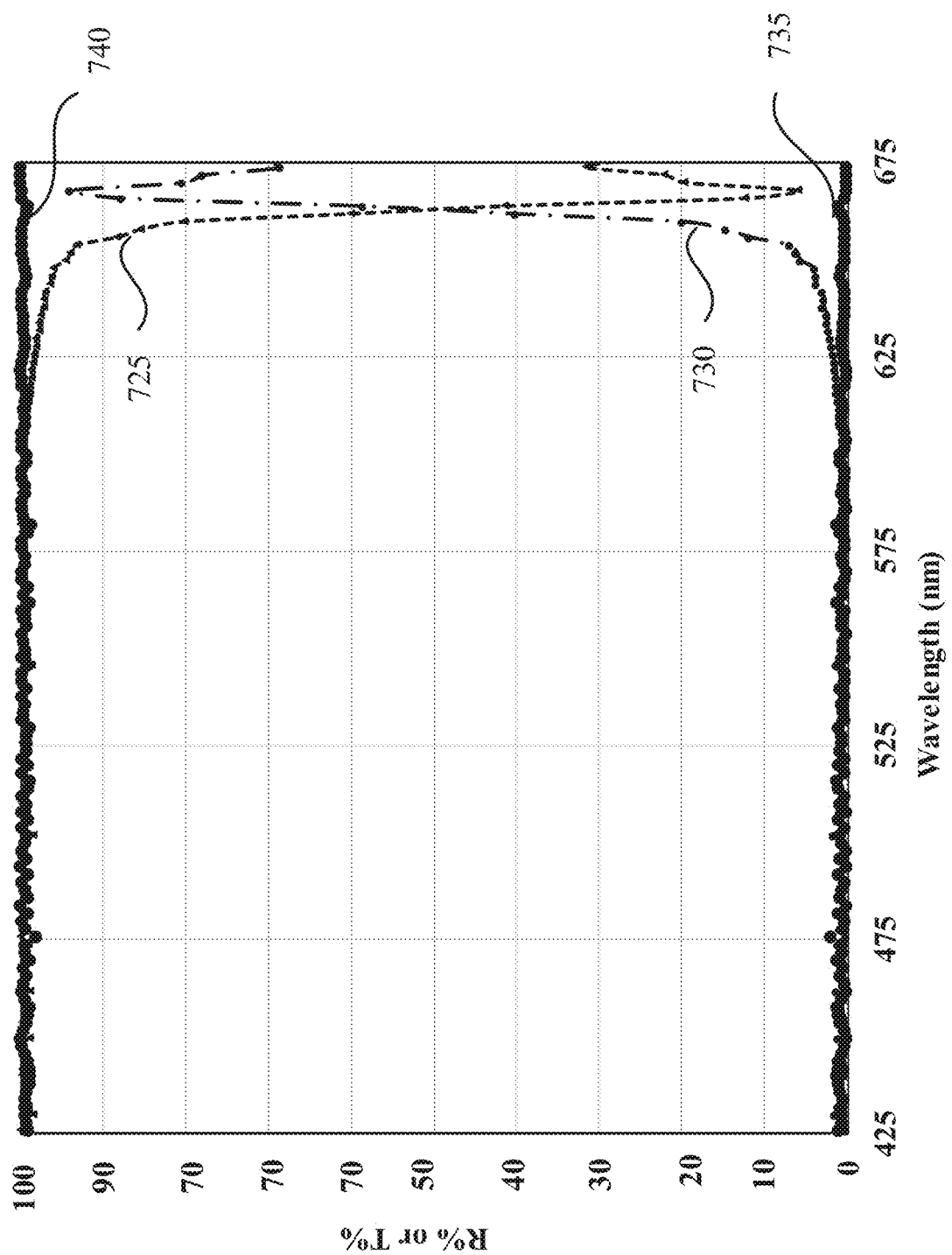
FIG. 7B illustrates simulation results showing light transmittance and reflectance of the CLC optical element shown in FIG. 7A for on-axis and off-axis incident lights, according to an embodiment of the present disclosure.

FIG. 7A illustrates a cross-sectional view of a CLC optical element 700, according to an embodiment of the present disclosure, and FIG. 7B illustrates simulation results showing light transmittance and light reflectance of the CLC optical element 700 shown in FIG. 7A for on-axis and off-axis incident lights. As shown in FIG. 7A, the CLC optical element 700 may include a plurality of CLC layers arranged in a predetermined order. For example, the CLC optical element 700 may include a first CLC layer 702, a second CLC layer 704, a third CLC layer 706, a fourth CLC layer 708, a fifth CLC layer 710, and a sixth CLC layer 712. The number of CLC layers is not limited to six, and can be any suitable number, such as two, three, four, five, seven, etc. In some embodiments, the CLC optical element 700 may function as a reflective polarizer.

The CLC layers may include at least one of a single-pitch CLC layer, or a gradient-pitch CLC layer. For example, in some embodiments, all of the CLC layers may be single-pitch CLC layers. The helix pitch of the single-pitch CLC layers may be the same or may be different. In some embodiments, all of the CLC layers may be gradient-pitch CLC layers. The gradient profiles of the varying pitches in different CLC layers may be the same or different. In some embodiments, the CLC layers may include a mixture of at least one single-pitch CLC layer and at least one gradient-pitch CLC layer.

Each of the CLC layers 702, 704, 706, 708, 710, and 712 may be a suitable embodiment of any CLC layer described above (e.g., any CLC layer shown in FIG. 2A-FIG. 5B). In some embodiments, the CLC layer included in each of the CLC layers 702, 704, 706, 708, 710, and 712 may be of the same embodiment shown in one of the FIG. 2A-FIG. 5B. In some embodiments, the CLC layer included in each of the CLC layers 702, 704, 706, 708, 710, and 712 may be of different embodiments (e.g., different ones shown in FIG. 2A-FIG. 5B).

In each of the CLC layers 702, 704, 706, 708, 710, and 712, the LC molecules may be arranged in any suitable predetermined intermediate pretilt angles described above. For example, in some embodiments, the pretilt angles of the LC molecules in each of the CLC layers 702, 704, 706, 708, 710, and 712 may be the same (e.g., same floor pretilt angles and same ceiling pretilt angles, where the floor pretilt angles may be different from or the same as the ceiling pretilt angles). In some embodiments, the pretilt angles of the LC molecules in different CLC layers may be different. In some embodiments, the pretilt angles may be within a range of greater than 10° and less than 80°, a range of greater than −80° and less than −10°, a range of greater than or equal to about 25° and less than or equal to about 50°, a range of greater than or equal to about −50° and less than or equal to about −25°. In some embodiments, the pretilt angles may be within a range of greater than or equal to about 30° and less than or equal to about 40°, or greater than or equal to about −40° and less than or equal to about −30°. In some embodiments, the pretilt angles may be 30° for all floor pretilt angles and all ceiling pretilt angles or −30° for all floor pretilt angles and all ceiling pretilt angles. In some embodiments, the pretilt angles may be 40° for all floor pretilt angles and all ceiling pretilt angles or −40° for all floor pretilt angles and all ceiling pretilt angles. The pretilt angles of each CLC layer may be any suitable values disclosed herein or may be in any suitable ranges of values disclosed herein.

In some embodiments, to achieve a reflection band covering substantially the entire visible wavelength range, each of CLC layers included in the CLC optical element 700 may be configured for a specific narrow wavelength range. For example, in the embodiment shown in FIG. 7A, the first CLC layer 702 may have a reflection band in the wavelength range of blue lights (hence the first CLC layer 702 may be referred to as a "B-CLC" layer 702). The second CLC layer 704 may have a reflection band in the wavelength range of green lights (hence the second CLC layer 704 may be referred to as a "G-CLC1" layer 704). The third CLC layer 706 may have a reflection band in the wavelength range of green lights (hence the third CLC layer 706 may be referred to as a "G-CLC2" layer 706). In some embodiments, the third CLC layer 706 may have a longer or shorter helix pitch than that of the second CLC layer 704, and the reflection bands for the G-CLC1 layer 704 and the G-CLC2 layer 706 may be different. The fourth CLC layer 708 may have a reflection band in the wavelength range of orange lights (hence the fourth CLC layer 708 may be referred to as an "O-CLC" layer 708). The fifth CLC layer 710 may have a reflection band in the wavelength range of red lights (hence the fifth CLC layer 710 may be referred to as an "R-CLC1" layer 710). The sixth CLC layer 712 may have a reflection band in the wavelength range of red lights (hence the sixth CLC layer 712 may be referred to as an "R-CLC2" layer 712). In some embodiments, the sixth CLC layer 712 may have a longer or shorter helix pitch than that of the fifth CLC layer 710, and the reflection bands for the R-CLC1 layer 710 and the R-CLC2 layer 712 may be different. In some embodiments, the six CLC layers may have helical twist structures of the same handedness. In some embodiments, at least two of the six CLC layers may have helical twist structures of the different handednesses.

For discussion purposes, the six CLC layers may all have heliconical structures of the same handedness. In some embodiments, at least two of the six CLC layers may have heliconical structures of the same handedness. A circularly polarized light 701 having a same handedness as that of the helical twist structures of the six CLC layers may be incident onto the CLC optical element 700. For example, the CLC optical element 700 may function an LHCLC reflective polarizer, and the circularly polarized light 701 may be an LHCP light. The LHCP light 701 may be primarily or substantially reflected by the CLC optical element 700 as an LHCP light 703, with a small portion transmitted as an LHCP light 705. The light transmittance (T %) of the CLC optical element 700 may be a ratio between the light intensity of the transmitted LHCP light 705 and the light intensity of the incident LHCP light 701. The light reflectance (R %) of the CLC optical element 700 may be a ratio between the light intensity of the reflected LHCP light 703 and the light intensity of the incident LHCP light 701. A higher light transmittance (T %) may indicate a higher light leakage of the CLC optical element 700 for the incident LHCP light 701. A higher light reflectance (R %) may indicate a lower light leakage of the CLC optical element 700 for the incident LHCP light 701.

FIG. 7B illustrates simulation results showing light transmittance (T %) and reflectance (R %) of the CLC optical element 700 for lights having 0° and 30° incidence angles. The CLC layers included in the CLC optical element 700 are single-pitch layers having helical twist structures of the same handedness. LC molecules in the CLC layers are aligned in 30° pretilt angles. As shown in FIG. 7B, the horizontal axis is the incidence wavelength (unit: nm), and the vertical axis is the light transmittance (T %) or reflectance (R %) of the CLC optical element 700. The light transmittance (T %) or reflectance (R %) of the CLC optical element 700 is evaluated for an incidence wavelength range from 425 nm to 675 nm. Referring to FIG. 7A and FIG. 7B, curve 735 shows the light transmittance (T %) of the CLC optical element 700 when the incident LHCP light 701 has an incidence angle of 0°, and curve 740 shows the light reflectance (R %) of the CLC optical element 700 when the incident LHCP light 701 has an incidence angle of 0°. As shown in curve 735, the light transmittance (T %) of the CLC optical element 700 is substantially close to 0, and as shown in curve 740, the light reflectance (R %) of the CLC optical element 700 is substantially close to 100%. That is, when the incident LHCP light 701 has an incidence angle of 0°, the light leakage of the CLC optical element 700 is negligible for the incident LHCP light 701 having an incidence angle of 0°.

Curve 730 shows the light transmittance (T %) of the CLC optical element 700 when the incident LHCP light 701 has an incidence angle of 30°, and curve 725 shows the light reflectance (R %) of the CLC optical element 700 when the incident LHCP light 701 has an incidence angle of 30°. As shown in curve 730 and curve 725, in an incidence wavelength range from 425 nm to about 625 nm, the light transmittance (T %) of the CLC optical element 700 is substantially close to 0%. That is, in the incidence wavelength range from 425 nm to about 625 nm, the light leakage of the CLC optical element 700 is negligible for the incident LHCP light 701 having an incidence angle of 30°. As the incidence wavelength increases from 625 nm to about 650 nm, the light transmittance (T %) of the CLC optical element 700 gradually increases to about 10%, and the light reflectance (R %) of the CLC optical element 700 gradually decreases to about 90%. That is, in the incidence wavelength range from 625 nm to about 650 nm, the light leakage of the CLC optical element 700 is still substantially small, which is below or equal to about 10% for the incident LHCP light 701 having an incidence angle of 30°. As the incidence wavelength further increases from 650 nm to about 675 nm, the light transmittance (T %) relatively sharply increases to about 95% (at 670 nm) then sharply decreases to about 70%, and the light reflectance (R %) relatively sharply decreases to about 5% (at 670 nm) then sharply increases to about 30%. In the incidence wavelength range from 650 nm to about 675 nm, the light leakage of the CLC optical element 700 is substantially high and is no longer negligible for the incident LHCP light 701 having an incidence angle of 30°.

Figure 7C:
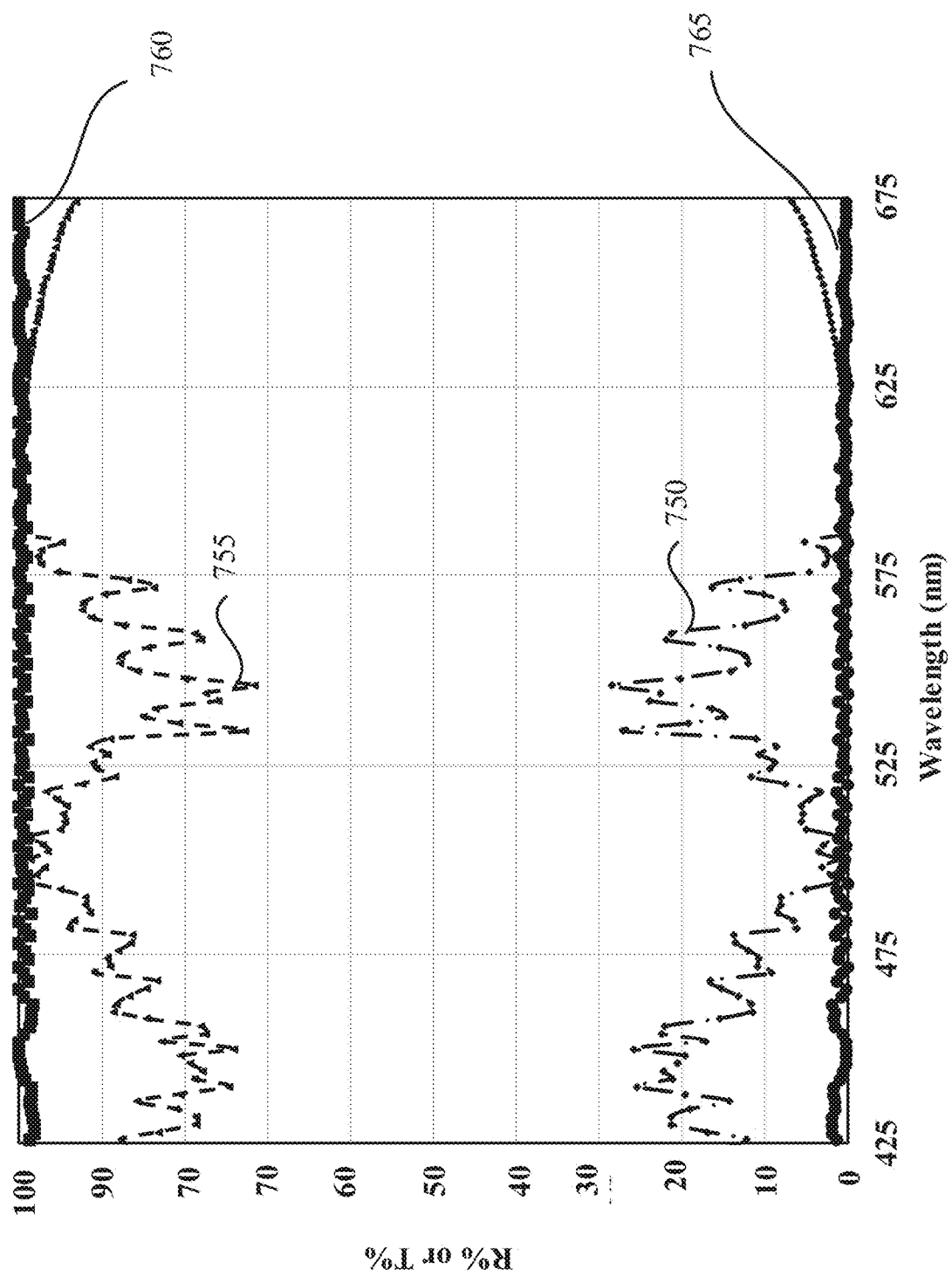
FIG. 7C illustrates simulation results showing light transmittance and reflectance of a conventional CLC reflective polarizer for on-axis and off-axis incident lights.

For comparison, FIG. 7C illustrates simulation results showing light transmittance and reflectance of a conventional CLC reflective polarizer for lights having 0° and 30° incidence angles. The LC molecules in the conventional CLC reflective polarizer have 0° pretilt angles. The conventional CLC reflective polarizer has a structure that is similar to that of the CLC optical element 700 shown in FIG. 7A, except that the LC molecules in the conventional CLC reflective polarizer have 0° pretilt angles. Similar to the incident LHCP light 701 shown in FIG. 7A, an LHCP light incident onto the conventional CLC reflective polarizer is primarily or substantially reflected as an LHCP light (referred to as a reflected LHCP light) with a small portion transmitted as an LHCP light (referred to as a transmitted LHCP light). The light transmittance (T %) of the conventional CLC reflective polarizer may be a ratio between the light intensity of the transmitted LHCP light and the light intensity of the incident LHCP light. The light reflectance (R %) of the conventional CLC reflective polarizer may be a ratio between the light intensity of the reflected LHCP light and the light intensity of the incident LHCP light.

As shown in FIG. 7C, the horizontal axis is the incidence wavelength (unit: nm), and the vertical axis is the light transmittance (T %) or reflectance (R %) of the conventional CLC reflective polarizer. The light transmittance (T %) or reflectance (R %) of the conventional CLC reflective polarizer is evaluated for an incidence wavelength range from 425 nm to 675 nm. Curve 760 shows the light reflectance (R %) of the conventional CLC reflective polarizer when the incident LHCP light has an incidence angle of 0°, and curve 765 shows the light transmittance (T %) of the conventional CLC reflective polarizer when the incident LHCP light has an incidence angle of 0°. When the incident LHCP light has an incidence angle of 0°, as shown in curve 765, the light transmittance (T %) of the conventional CLC reflective polarizer is substantially 0, and as shown in curve 760, the light reflectance (R %) of the conventional CLC reflective polarizer is substantially 100%. That is, when the incident LHCP light has an incidence angle of 0°, the light leakage of the conventional CLC reflective polarizer is negligible.

Curve 750 shows the light transmittance (T %) of the conventional CLC reflective polarizer when the incident LHCP light has an incidence angle of 30°, and curve 755 shows the light reflectance (R %) of the conventional CLC reflective polarizer when the incident LHCP light has an incidence angle of 30°. When the incident LHCP light has an incidence angle of 30°, as shown in curve 750 and curve 755, in an incidence wavelength range from 425 nm to about 585 nm, the light transmittance (T %) and the light reflectance (R %) of the conventional CLC reflective polarizer fluctuate with the incidence wavelength. For example, the light transmittance (T %) (curve 750) varies between about 0 and 30%, and the light reflectance (R %) (curve 755) varies between about 100% and 70%. That is, in the incidence wavelength range from 425 nm to about 585 nm, the light leakage of the conventional CLC reflective polarizer varies between about 0 and 30% for the incident LHCP light having an incidence angle of 30°. As the incidence wavelength further increases, in the incidence wavelength range from 585 nm to about 635 nm, as shown in curve 750 and curve 755, the light transmittance (T %) is substantially zero and the light reflectance (R %) is substantially 100%. That is, in the incidence wavelength range from 585 nm to about 635 nm, the light leakage of the conventional CLC reflective polarizer is close to 0 for the incident LHCP light having an incidence angle of 30°. As the incidence wavelength further increases to 675 nm, the light transmittance (T %) gradually increases to about 7%, and the light reflectance (R %) gradually decreases to about 92%. That is, in the incidence wavelength range from 635 nm to about 675 nm, the light leakage of the conventional CLC reflective polarizer is below 7% for the incident LHCP light having an incidence angle of 30°.

Referring to FIG. 7B and FIG. 7C, the light leakage of the disclosed CLC optical element 700 of the present disclosure is substantially low, e.g., below 10%, in a relatively broad and continuous incident wavelength range, e.g., from about 425 nm to 625 nm (200-nm-bandwidth). As a comparison, the light leakage of the conventional CLC reflective polarizer is substantially low, e.g., below 10%, in several separated, non-continuous, relatively narrow incident wavelength ranges, e.g., from about 485 nm to 535 nm (50-nm-bandwidth) and from 575 nm to 675 nm (100-nm-bandwidth). That is, for an off-axis circularly polarized incident light (e.g., having a 30° incidence angle), the CLC optical element 700 in which the LC molecules are aligned in intermediate pretilt angles (e.g., 30°) may have a substantially low light leakage, e.g., below 10%, in a broader wavelength range than the conventional CLC reflective polarizer in which the LC molecules are aligned in small pretilt angles (e.g., 0°). In other words, the CLC optical element 700 in which the LC molecules are aligned in intermediate pretilt angles (e.g., 30°) may have a substantially high extinction ratio in a broader wavelength range than the conventional CLC reflective polarizer in which the LC molecules are aligned in small pretilt angles (e.g., 0°).

Figure 8:
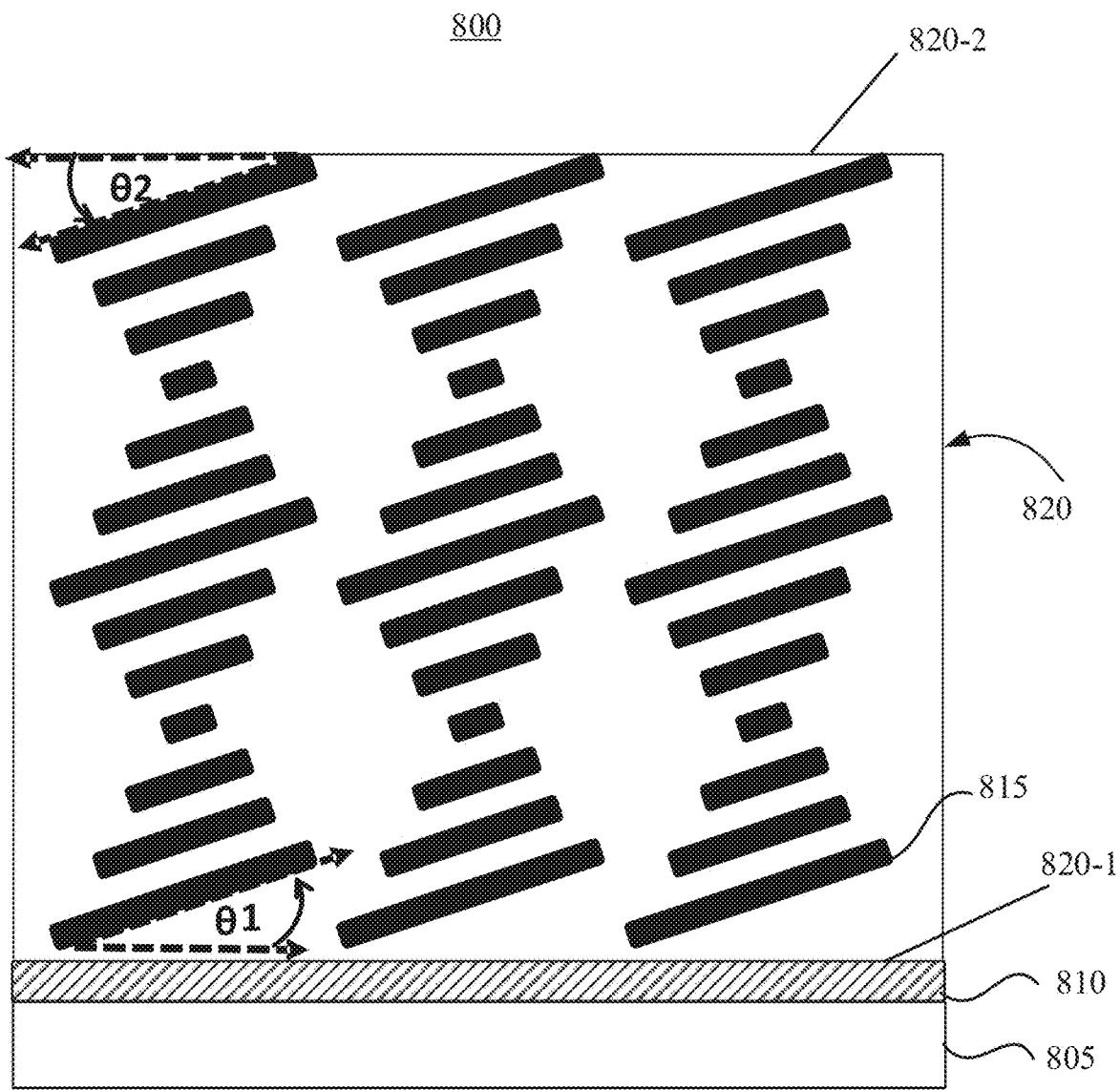
FIG. 8 illustrates a cross-sectional view of a CLC optical element, according to another embodiment of the present disclosure.

FIG. 8 illustrates a cross-sectional view of a CLC optical element 800, according to another embodiment of the present disclosure. The CLC optical element 800 may include elements that are similar to or the same as those included in the CLC optical element 200 shown in FIGS. 2A and 2B. Descriptions of the same or similar elements can refer to the above corresponding descriptions rendered in connection with FIGS. 2A and 2B. As shown in FIG. 8, the CLC optical element 800 may include the substrate 805, an alignment structure 810, and a CLC layer 820 that includes LC molecules 815. The LC molecules 815 in the CLC layer 820 may be aligned in predetermined intermediate pretilt angles. For example, the LC molecules 815 disposed adjacent the first surface 820-1 (e.g., at the first surface 820-1 or at a first region substantially close to the first surface 820-1) of the CLC layer 820 may be arranged (e.g., aligned) in a first pretilt angle θ1, and LC molecules 815 disposed adjacent the second surface 820-2 (e.g., at the surface 820-2 or at a second region substantially close to the second surface 820-2) of the optical film 820 may be arranged (e.g., aligned) in a second pretilt angle θ2. In some embodiments, the first pretilt angle and the second pretilt angle may be defined in a same direction (e.g., a counter-clockwise direction) relative to the respective surfaces 820-1 and 820-2 of the CLC layer 820, as shown in FIG. 8. The LC directors of the LC molecules may have oblique angles with respect to the helical axis. The pretilt angles of the LC molecules 815 within the bulk (e.g., volume) of the CLC layer 820 (e.g., in a space between the first surface 820-1 and the second surface 820-2) may gradually change from the first pretilt angle θ1 to the second pretilt angle θ2 or from the second pretilt angle θ2 to the first pretilt angle θ1 when the pretilt angles are different. When the first pretilt angle θ1 and the second pretilt angle θ2 are the same (same sign and value), the pretilt angles of the LC molecules 815 within the bulk of the optical film 820 may be substantially the same as the first pretilt angle θ1 or the second pretilt angle θ2.

CLC optical elements, e.g., reflective polarizers, optical diffusers, in accordance with an embodiment of the present disclosure may have various applications in a number of fields, which are all within the scope of the present disclosure. For example, CLC optical elements in accordance with an embodiment of the present disclosure may be used as polarization management components, brightness enhancement components, optical path-folding components, etc., in various systems, e.g., a near-eye display ("NED"), a head-up display ("HUD"), a head-mounted display ("HMD"), smart phones, laptops, or televisions, etc. Some exemplary applications in augmented reality ("AR"), virtual reality ("VR"), mixed reality ("MR")" fields or some combinations thereof will be explained below. Near-eye displays ("NEDs") have been widely used in a large variety of applications, such as aviation, engineering, science, medicine, computer gaming, video, sports, training, and simulations. One application of NEDs is to realize VR, AR, MR or some combination thereof. Desirable characteristics of NEDs include compactness, light weight, high resolution, large field of view ("FOV"), and small form factor. An NED may include a display element configured to generate an image light and a lens system configured to direct the image light toward eyes of a user. The lens system may include a plurality of optical elements, such as lenses, waveplates, reflectors, etc., for focusing the image light to the eyes of the user. To achieve a compact size and light weight and to maintain satisfactory optical characteristics, an NED may adopt a pancake lens assembly in the lens system to fold the optical path, thereby reducing a back focal distance in the NED.

Figure 9A:
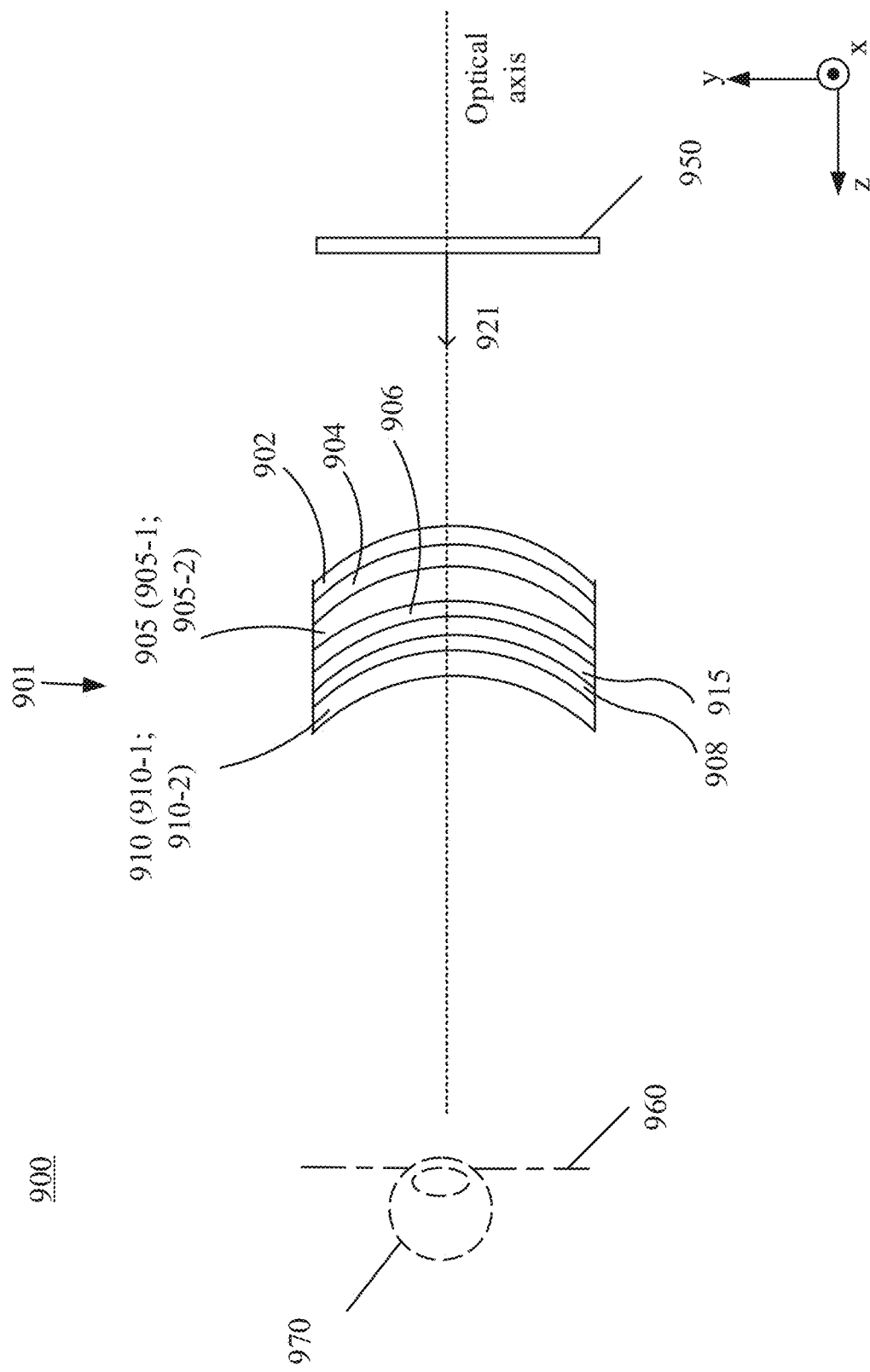
FIG. 9A illustrates a schematic diagram of a pancake lens assembly, according to an embodiment of the present disclosure.

FIG. 9A illustrates a schematic diagram of an optical system 900 according to an embodiment of the present disclosure. The optical system 900 may include a pancake lens assembly 901 according to an embodiment of the present disclosure. The pancake lens assembly 901 may be implemented in an NED to fold the optical path, thereby reducing the back focal distance in the NED. As shown in FIG. 9A, the pancake lens assembly 901 may focus a light 921 emitted from an electronic display 950 (which may be other suitable light source) to an eye-box located at an exit pupil 960. Hereinafter, the light 921 emitted by the electronic display 950 for forming images is also referred to as an "image light." The exit pupil 960 may be at a location where an eye 970 is positioned in an eye-box region when a user wears the NED. In some embodiments, the electronic display 950 may be a monochromatic display that includes a narrowband monochromatic light source (e.g., a 30-nm-bandwidth light source). In some embodiments, the electronic display 950 may be a polychromatic display (e.g., a red-green-blue ("RGB") display) that includes a broadband polychromatic light source (e.g., 300-nm-bandwidth light source covering the visible wavelength range). In some embodiments, the electronic display 950 may be a polychromatic display (e.g., an RGB display) including a stack of a plurality of monochromatic displays, which may include corresponding narrowband monochromatic light sources respectively.

In some embodiments, the pancake lens assembly 901 may include a first optical element 905 and a second optical element 910 optically coupled with one another. In some embodiments, the pancake lens assembly 901 may be configured as a monolithic pancake lens assembly without any air gaps between optical elements included in the pancake lens assembly. In some embodiments, one or more surfaces of the first optical element 905 and the second optical element 910 may be shaped (e.g., curved) to compensate for field curvature. In some embodiments, one or more surfaces of the first optical element 905 and/or the second optical element 910 may be shaped to be spherically concave (e.g., a portion of a sphere), spherically convex, a rotationally symmetric asphere, a freeform shape, or some other shape that can mitigate field curvature. In some embodiments, the shape of one or more surfaces of the first optical element 905 and/or the second optical element 910 may be designed to additionally compensate for other forms of optical aberration. In some embodiments, one or more of the optical elements within the pancake lens assembly 901 may have one or more coatings, such as an anti-reflective coating, to reduce ghost images and enhance contrast. In some embodiments, the first optical element 905 and the second optical element 910 may be coupled together by an adhesive 915. Each of the first optical element 905 and the second optical element 910 may include one or more optical lenses.

The first optical element 905 may include a first surface 905-1 facing the electronic display 950 and an opposing second surface 905-2 facing the eye 970. The first optical element 905 may be configured to receive an image light at the first surface 905-1 from the electronic display 950 and output an image light with an altered property at the second surface 905-2. The pancake lens assembly 901 may also include a linear polarizer 902, a waveplate 904, and a mirror 906 arranged in an optical series, each of which may be an individual layer, film, or coating disposed at (e.g., bonded to or formed at) the first optical element 905. The linear polarizer 902, the waveplate 904, and the mirror 906 may be disposed at (e.g., bonded to or formed at) the first surface 905-1 or the second surface 905-2 of the first optical element 905. For discussion purposes, FIG. 9A shows that the linear polarizer 902 and the waveplate 904 are disposed at (e.g., bonded to or formed at) the first surface 905-1, and the mirror 906 is disposed at (e.g., bonded to or formed at) the second surface 905-2. Other arrangements are also contemplated.

In some embodiments, the waveplate 904 may be a quarter-wave plate ("QWP"). A polarization axis of the waveplate 904 may be oriented relative to the polarization direction of the linearly polarized light to convert the linearly polarized light to a circularly polarized light or vice versa for a visible spectrum and/or an IR spectrum. In some embodiments, for an achromatic design, the waveplate 904 may include a multilayer birefringent material (e.g., polymer, liquid crystals, or a combination thereof) to produce quarter-wave birefringence across a wide spectral range. For example, an angle between the polarization axis (e.g., the fast axis) of the waveplate 904 and the transmission axis of the linear polarizer 902 may be configured to be in a range of about 35-50 degrees. In some embodiments, for a monochrome design, an angle between the polarization axis (e.g., the fast axis) of the waveplate 904 and the transmission axis of the linear polarizer 902 may be configured to be about 45 degrees. In some embodiments, the mirror 906 may be a partial reflector that is partially reflective to reflect a portion of a received light. In some embodiments, the mirror 906 may be configured to transmit about 50% and reflect about 50% of a received light, and may be referred to as a "50/50 mirror." In some embodiments, the handedness of the reflected light may be reversed, and the handedness of the transmitted light may remain unchanged.

The second optical element 910 may have a first surface 910-1 facing the first optical element 905 and an opposing second surface 910-2 facing the eye 970. The pancake lens assembly 901 may also include a reflective polarizer 908, which may be an individual layer, film, or coating disposed at (e.g., bonded to or formed at) the second optical element 910. The reflective polarizer 908 may be disposed at (e.g., bonded to or formed at) the first surface 910-1 or the second surface 910-2 of the second optical element 910 and may receive a light output from the mirror 906. For discussion purposes, FIG. 9A shows that the reflective polarizer 908 is disposed at (e.g., bonded to or formed at) the first surface 910-1 of the second optical element 910. That is, the reflective polarizer 908 may be disposed between the first optical element 905 and the second optical element 910. For example, the reflective polarizer 908 may be disposed between the second surface 910-2 of the second optical element and the adhesive layer 915. In some embodiments, the reflective polarizer 908 may be disposed at the first surface 910-1 of the second optical element 910.

The reflective polarizer 908 may include a reflective polarizing film (e.g., a CLC polarizing film) configured to primarily or substantially reflect a received light of a first polarization and primarily or substantially transmit a received light of a second polarization. The reflective polarizer 908 may be any embodiment of the reflective polarizer described above, such as the CLC reflective polarizer 200, the CLC reflective polarizer 230, the CLC reflective polarizer 250, the CLC reflective polarizer 270, the CLC reflective polarizer 300, the CLC reflective polarizer 400, the CLC reflective polarizer 450, the CLC reflective polarizer 500, the CLC reflective polarizer 550, or an embodiment including a combination of one or more features from the CLC reflective polarizer 200, 230, 250, 270, 300, 400, 450, 500, and 550. For example, the reflective polarizer 908 may include a CLC layer or a CLC-layer stack in accordance with an embodiment of the present disclosure, such as the CLC layer 220 shown in FIGS. 2A and 2B, the CLC layer 240 shown in FIG. 2C, the CLC layer 260 shown in FIG. 2D, the CLC layer 280 shown in FIG. 2E, the CLC layer 320 shown in FIG. 3, the CLC layer 420 shown in FIG. 4A, the CLC-layer stack 470 shown in FIG. 4B, the CLC layer 520 shown in FIG. 5A, or the CLC layer 560 shown in FIG. 5B, the CLC layer 820 shown in FIG. 8, or any combination thereof. Accordingly, the reflective polarizer 908 may have suppressed light leakage and improved extinction ratio for both the on-axis and off-axis incident lights. Thus, the optical performance of the pancake lens assembly 901 may be significantly improved.

Referring to FIG. 9A, in some embodiments, the image light 921 emitted from the electronic display 950 may be an unpolarized light. The linear polarizer 902 and the waveplate 904 may be replaced by a circular polarizer, which may be configured to the convert the unpolarized light to a circularly polarized light, and direct the circularly polarized light toward the mirror 906. In some embodiments, the image light 921 emitted from the electronic display 950 may be a linearly polarized light, and the linear polarizer 902 may be omitted. A polarization axis of the waveplate 904 may be oriented relative to the polarization direction of the linearly polarized light to convert the linearly polarized light to a circularly polarized light or vice versa for a visible spectrum and/or an IR spectrum.

The pancake lens assembly 901 shown in FIG. 9A is merely for illustrative purposes. In some embodiments, one or more of the first surface 905-1 and the second surface 905-2 of the first optical element 905 and the first surface 910-1 and the second surface 910-2 of the second optical element 910 may be curved surface(s) or flat surface(s). In some embodiments, the pancake lens assembly 901 may have one optical element or more than two optical elements. In some embodiments, the pancake lens assembly 901 may further include other optical elements in addition to the first and second optical elements, such as one or more linear polarizers, one or more waveplate, one or more circular polarizers, etc.

Figure 9B:
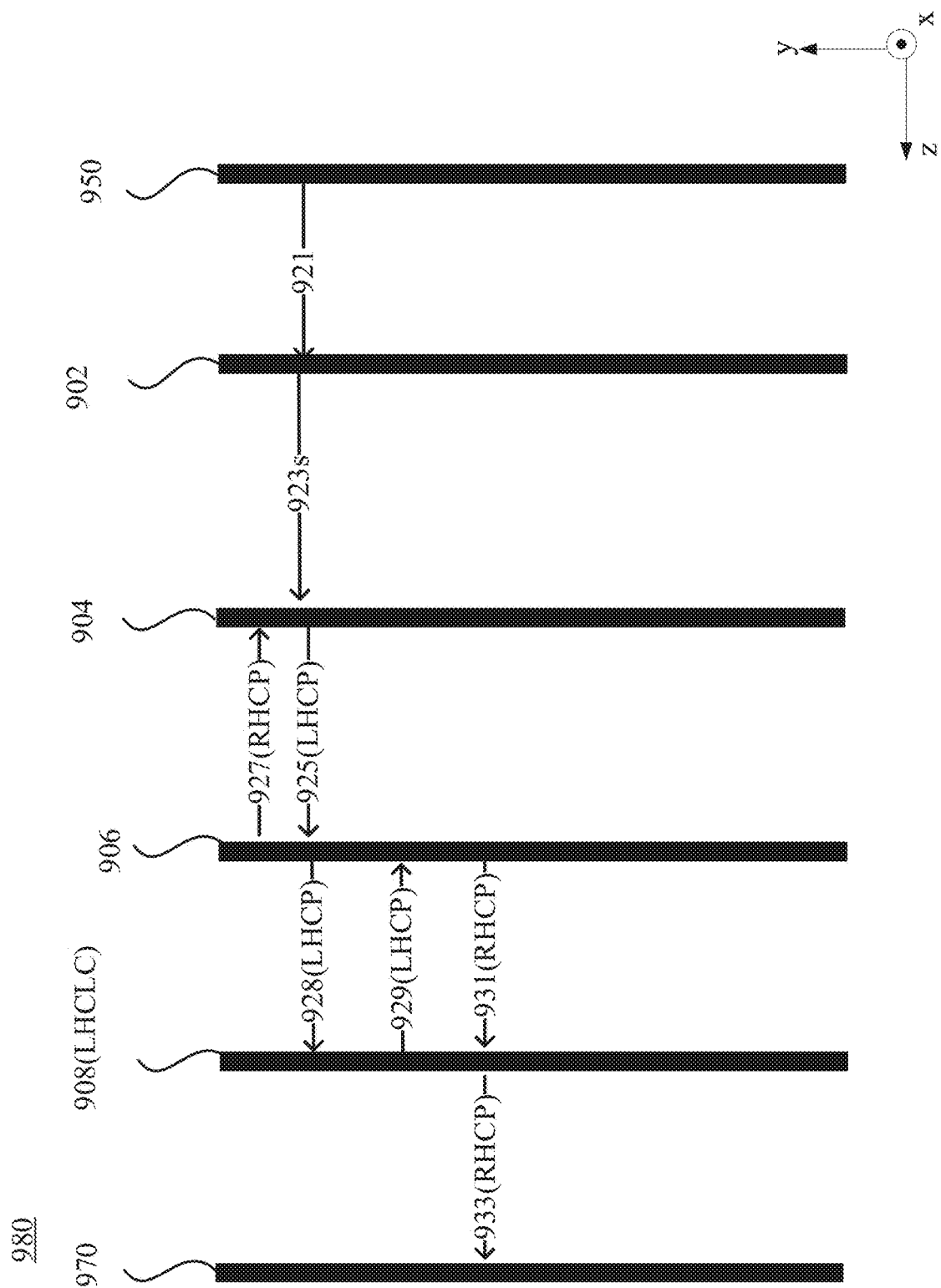
FIG. 9B illustrates a schematic diagram of a cross-sectional view of an optical path of the pancake lens assembly shown in FIG. 9A, according to an embodiment of the present disclosure.

FIG. 9B illustrates a schematic cross-sectional view of an optical path 980 of a light propagating in the pancake lens assembly 901 shown in FIG. 9A, according to an embodiment of the present disclosure. In the light propagation path 980, the change of polarization of the light is shown. Thus, the first optical element 905 and the second optical element 910, which are presumed to be lenses that do not affect the polarization of the light, are omitted for the simplicity of illustration. In FIG. 9B, the character "s" denotes that the corresponding light is s-polarized, RHCP and LHCP denote right-handed circularly polarized light and left-handed circularly polarized light, respectively. For discussion purposes, as shown in FIG. 9B, the linear polarizer 902 may be configured to transmit an s-polarized light and block a p-polarized light, and the reflective polarizer 908 may be a left-handed CLC ("LHCLC") reflective polarizer. For illustrative purposes, the electronic display 950, the linear polarizer 902, the waveplate 904, the mirror 906, and the reflective polarizer 908 are illustrated as flat surfaces in FIG. 9B. In some embodiments, one or more of the electronic display 950, the linear polarizer 902, the waveplate 904, the mirror 906, and the reflective polarizer 908 may include a curved surface.

As shown in FIG. 9B, the electronic display 950 may generate the unpolarized image light 921 covering a predetermined spectrum, such as a portion of the visible spectral range or the substantially entire visible spectral range. The unpolarized image light 921 may be transmitted by the linear polarizer 902 as an s-polarized image light 923s, which may be transmitted by the waveplate 904 as an LHCP light 925. A first portion of the LHCP light 925 may be reflected by the mirror 906 as an RHCP light 927 toward the waveplate 904, and a second portion of the LHCP light 925 may be transmitted as an LHCP light 928 toward the CLC reflective polarizer 908. The LHCP light 928 incident onto the CLC reflective polarizer 908 may have the same handedness (e.g., the left handedness) as that of the helical twist structure of the CLC reflective polarizer 908. The LHCP light 928 may be reflected by the CLC reflective polarizer 908 as an LHCP light 929 toward the mirror 906. The LHCP light 929 may be reflected by the mirror 906 as an RHCP light 931, which may be transmitted through the CLC reflective polarizer 908 as an RHCP light 933. The RHCP light 933 may be focused onto the eye 970.

Figure 10A:
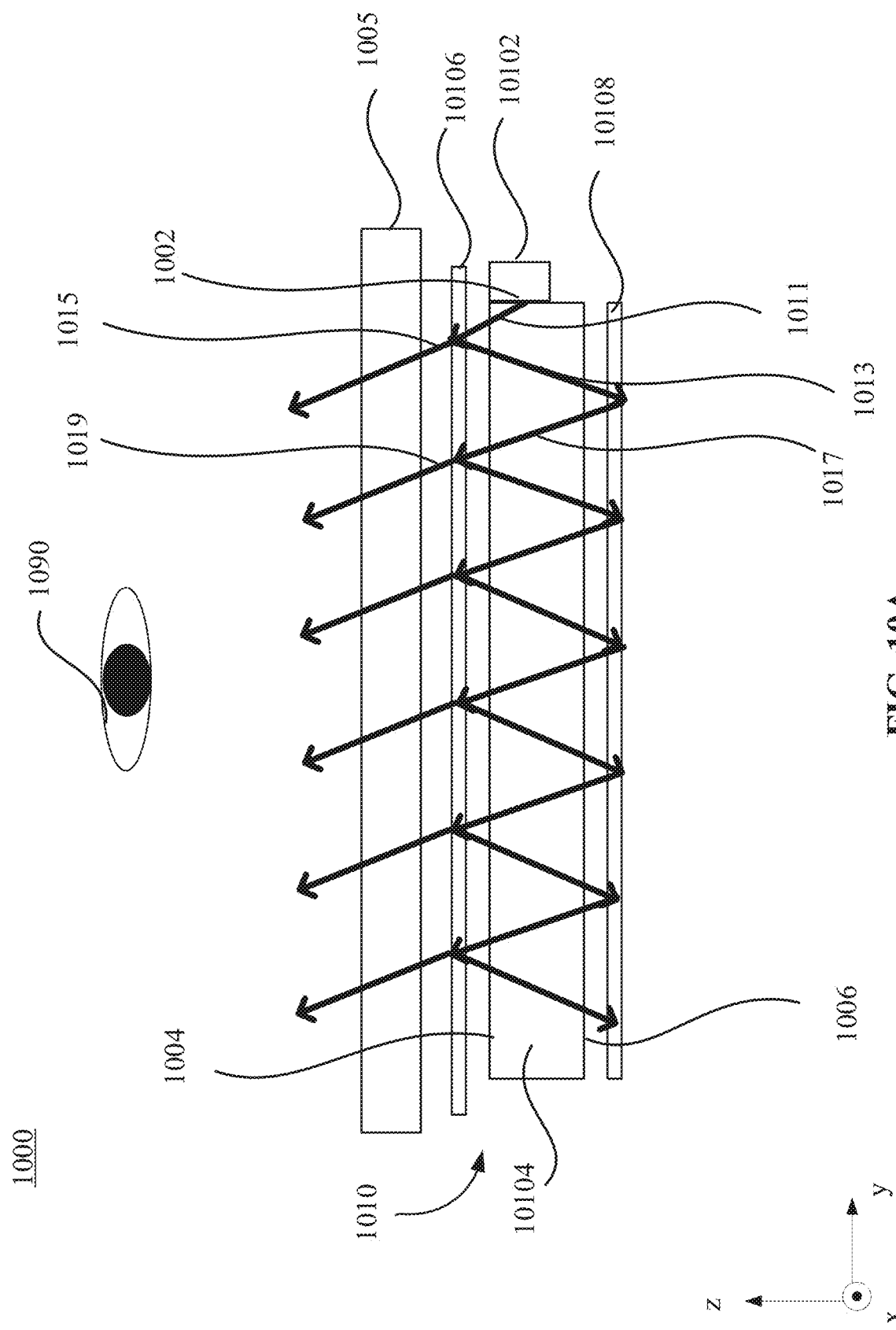
FIG. 10A illustrates a schematic diagram of an electronic display, according to an embodiment of the present disclosure.

In some embodiments, CLC reflective polarizers in accordance with an embodiment of the present disclosure may be used as brightness enhancement components in, for example, displays. FIG. 10A illustrates a schematic cross section of an electronic display 1000, according to an embodiment of the present disclosure. As shown in FIG. 10A, the electronic display 1000 may include a display panel 1005 and a backlight module 1010. In some embodiments, the display panel 1005 may be a non-emissive display panel, i.e., a display panel that is illuminated by an external light source, such as a liquid crystal display ("LCD") panel, a liquid-crystal-on-silicon ("LCoS") display panel, a digital light processing ("DLP") display panel, or any combination thereof. Examples of an external light source may include a laser, a light-emitting diode ("LED"), an organic light-emitting diode ("OLED"), or any combination thereof. The external source may be a narrowband light source or a broadband light source. The backlight module 1010 may be configured to illuminate the display panel 1005. In some embodiments, the display panel 1005 may be an emissive display panel, such as a quantum dot ("QD") display panel where quantum dots absorb a backlight emitted from the backlight module 1010 to emit a visible light.

The backlight module 1010 may include a backlight source assembly 10102, a light guide plate 10104, a reflective polarizer 10106 including a polarizing film (e.g., a CLC polarizing film), and a reflective sheet 10108. The backlight module 1010 may include other elements, such as a diffuser sheet and/or a prism sheet arranged between the reflective polarizer 10106 and the display panel 1005. The backlight source assembly 10102 may output a backlight to a light incident surface 1002 of the light guide plate 10104. The backlight source assembly 10102 may be disposed adjacent the light incident surface 1002. The backlight source assembly 10102 may include one or more light-emitting diodes ("LEDs"), an electroluminescent panel ("ELP"), one or more cold cathode fluorescent lamps ("CCFLs"), one or more hot cathode fluorescent lamps ("HCFLs"), or one or more external electrode fluorescent lamps ("EEFLs"), etc. In some embodiments, the LED backlight source may include a plurality of white LEDs or a plurality of RGB (red, green, blue) LEDs, etc.

In some embodiments, the light guide plate 10104 may be fabricated from a transparent acryl resin or the like. The backlight entered from the light incident surface 1002 may propagate inside the light guide plate 10104, e.g., via total internal reflection, and may be output at a light outputting surface 1004 of the light guide plate 10104 toward the reflective polarizer 10106, which is disposed at or adjacent of the light outputting surface 1004 of the light guide plate 10104. The reflective sheet 10108 may be disposed at or adjacent a bottom surface 1006 of the light guide plate 10104, such that the reflective polarizer 10106 and reflective sheet 10108 may be disposed opposite to each other at two sides of the light guide plate 10104. The reflective polarizer 10106 may be any embodiment of the reflective polarizer described above, such as the CLC reflective polarizer 200, the CLC reflective polarizer 230, the CLC reflective polarizer 250, the CLC reflective polarizer 270, the CLC reflective polarizer 300, the CLC reflective polarizer 400, the CLC reflective polarizer 450, the CLC reflective polarizer 500, the CLC reflective polarizer 550, or an embodiment including a combination of one or more features from two or more of the CLC reflective polarizers 200, 230, 250, 270, 300, 400, 450, 500, and 550. For example, the reflective polarizer 908 may include a CLC layer or a CLC-layer stack in accordance with an embodiment of the present disclosure, such as the CLC layer 220 shown in FIGS. 2A and 2B, the CLC layer 240 shown in FIG. 2C, the CLC layer 260 shown in FIG. 2D, the CLC layer 280 shown in FIG. 2E, the CLC layer 320 shown in FIG. 3, the CLC layer 420 shown in FIG. 4A, the CLC-layer stack 470 shown in FIG. 4B, the CLC layer 520 shown in FIG. 5A, or the CLC layer 560 shown in FIG. 5B, the CLC layer 820 shown in FIG. 8, or any combination thereof.

In some embodiments, the reflective polarizer 10106 may be configured to substantially transmit a circularly polarized light, which has a handedness (e.g., a first handedness) opposite to that of the helical twist structure of the polarizing film (e.g., CLC polarizing film) of the reflective polarizer 10106, toward the display panel 1005 to illuminate the display panel 1005, and substantially reflect a circularly polarized light, which has a same handedness (e.g., a second handedness) as that of the helical twist structure of the polarizing film (e.g., CLC polarizing film), toward the reflective sheet 10108. The reflective sheet 10108 may have a substantially high reflectivity (e.g., above 100%), and may reverse the handedness of a circularly polarized light after the circularly polarized light is reflected by the reflective sheet 10108. For example, the reflective sheet 10108 may reflect a circularly polarized light having the second handedness as a circularly polarized light having the first handedness or vice versa. Thus, the reflective sheet 10108 may reflect a circularly polarized light having the second handedness, which is received from the reflective polarizer 10106, as a circularly polarized light having the first handedness toward the reflective polarizer 10106. The reflective polarizer 10106 may primarily or substantially transmit the circularly polarized light having the first handedness to illuminate the display panel 1005. In this configuration, a polarization recirculation may be achieved by the reflective polarizer 10106 and the reflective sheet 10108, and the light extraction efficiency of the backlight module 1010 may be improved. In other words, the amount of the backlight transmitted to illuminate the display panel 1005 may be increased. For illustrative purposes, FIG. 10A shows the reflective sheet 10108 and the reflective polarizer 10106 are spaced apart from the light guide plate 10104 by a gap, and the reflective polarizer 10106 is spaced apart from the display panel 1005 by a gap. In some embodiments, the display panel 1005, the reflective polarizer 10106, the light guide plate 10104, and/or the reflective sheet 10108 may be stacked together without a gap.

In some embodiments, a backlight emitted from the backlight source assembly 10102 may be an unpolarized backlight 1011, which may include an RHCP component and an LHCP component. For discussion purposes, the reflective polarizer 10106 may be an LHCLC reflective polarizer. For the unpolarized backlight 1011 incident onto the reflective polarizer 10106, the reflective polarizer 10106 may primarily or substantially transmit the RHCP component of the unpolarized backlight 1011 as an RHCP light 1015 toward the display panel 1005, and primarily or substantially reflect the LHCP component of the unpolarized backlight 1011 as an LHCP light 1013 toward the reflective sheet 10108. The reflective sheet 10108 may reflect the LHCP light 1013 as an RHCP light 1017 toward the reflective polarizer 10106, which may primarily or substantially transmit the RHCP light 1017 as an RHCP light 1019 toward the display panel 1005. Due to the handedness selectivity of the reflective polarizer 10106 and the handedness reversing function of the reflective sheet 10108, a polarization recirculation of the backlight may be achieved via the reflective polarizer 10106 and the reflective sheet 10108. Thus, the light efficiency of the backlight module 1010 may be improved. In addition, due to the predetermined intermediate petite angles (e.g., greater than $10°$ and less than $80°$, greater than or equal to about $25°$ and less than or equal to about $50°$, greater than $-80°$ and less than $-10°$, or greater than or equal to about $-50°$ and less than or equal to about $-25°$ of the LC molecules in the reflective polarizer 10106, the reflective polarizer 10106 may have suppressed light leakage and improved extinction ratios for both on-axis and off-axis incident backlights. Thus, the light efficiency of the backlight module 1010 may be further improved as compared to a backlight module including a conventional CLC reflective polarizer where LC molecules are aligned in relatively small pretilt angles (e.g., about $0°$ to about $10°$ or about $-10°$ to about $0°$).

In some embodiments, an unpolarized backlight may also be directly incident onto the reflective sheet 10108, and reflected as an unpolarized light toward the reflective polarizer 10106. The reflective polarizer 10106 (e.g., an LHCLC reflective polarizer) may substantially transmit an RHCP component of the unpolarized backlight as an RHCP light toward the display panel 1005, and substantially reflect an LHCP component of the unpolarized backlight as an LHCP light toward the reflective sheet 10108. The reflective sheet 10108 may reflected the LHCP light as an RHCP light toward the reflective polarizer 10106, which may be substantially transmitted by the reflective polarizer 10106 toward the display panel 1005.

The structure of the reflective polarizer 10106 may be configured according to the characteristics of the backlight source assembly 10102, and the reflection band of the reflective polarizer 10106 may be configured corresponding to the wavelength band of the backlight source assembly 10102. In some embodiments, the backlight source assembly 10102 may include a narrowband monochromatic light source (e.g., a 10-nm-bandwidth light source) and, accordingly, the reflective polarizer 10106 may be configured to include a CLC layer having a constant helix pitch, such as the CLC layer 220 shown in FIGS. 2A and 2B, the CLC layer 240 shown in FIG. 2C, the CLC layer 260 shown in FIG. 2D, the CLC layer 280 shown in FIG. 2E, the CLC layer 320 shown in FIG. 3, the CLC layer 520 shown in FIG. 5A, or the CLC layer 560 shown in FIG. 5B. In some embodiments, the backlight source assembly 10102 may include a broadband light source (e.g., a 300-nm-bandwidth light source covering the visible spectrum) and, accordingly, the reflective polarizer 10106 may be configured to include a polarizing film having a gradient helix pitch, such as the CLC layer 420 shown in FIG. 4A. In some embodiments, the backlight source assembly 10102 may include a plurality of narrowband monochromatic light sources of different colors (e.g., narrowband blue, green, red light sources) and, accordingly, the reflective polarizer 10106 may be configured to include a CLC-layer stack including a plurality of CLC layers, and at least two CLC layers may have different helix pitches, such as the CLC-layer stack 470 shown in FIG. 4B.

Figure 10B:
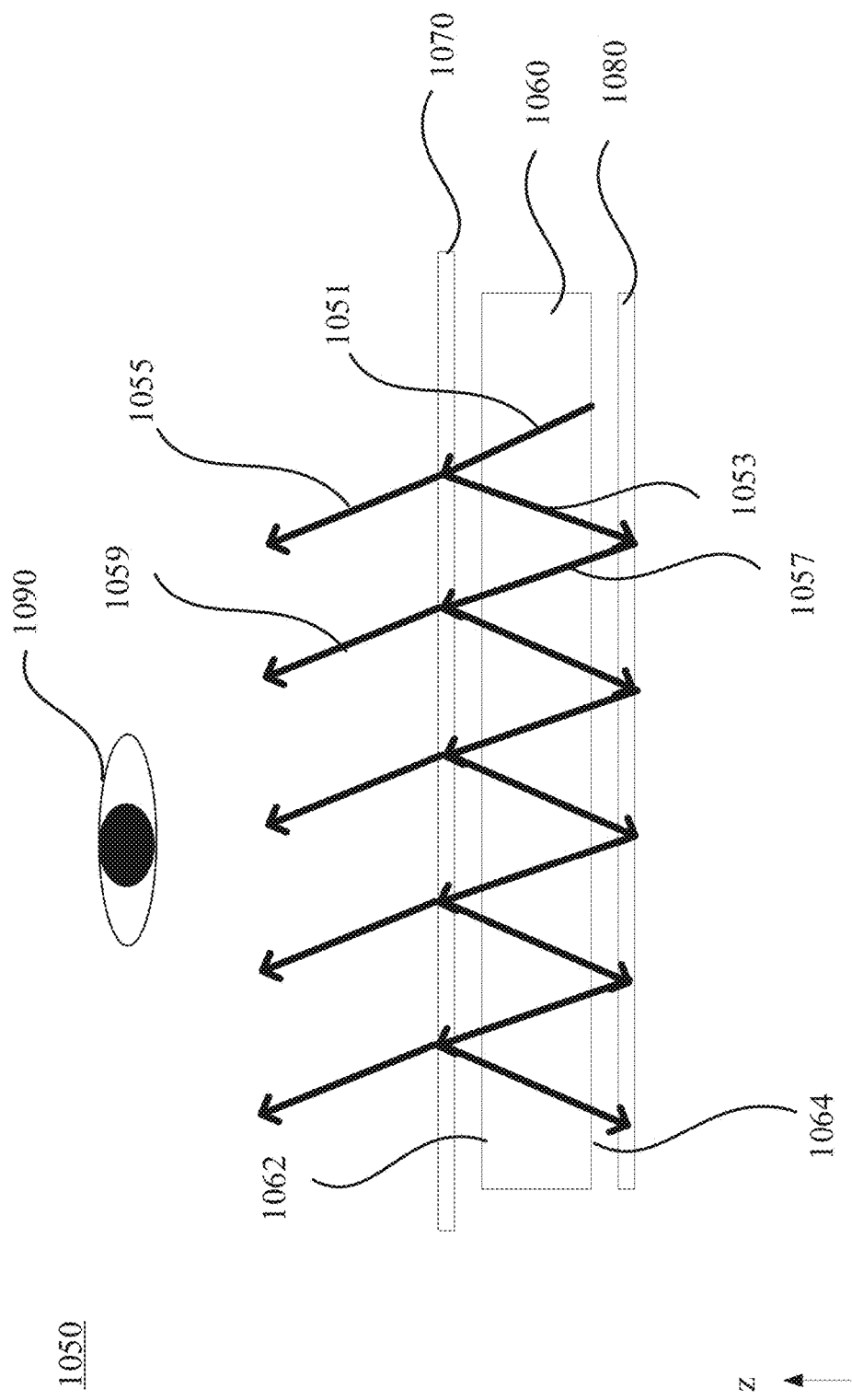
FIG. 10B illustrates a schematic diagram of an electronic display, according to another embodiment of the present disclosure.

FIG. 10B illustrates a schematic diagram of an electronic display 1050, according to another embodiment of the present disclosure. The electronic display 1050 shown in FIG. 10B may include elements that are the same as or similar to those included in the electronic display 1000 shown in FIG. 10A. Detailed descriptions of the same or similar elements may refer to the above descriptions rendered in connection with FIG. 10A. As shown in FIG. 10B, the electronic display 1050 may include a display panel 1060 disposed between a reflective polarizer 1070 and a reflective sheet 1080. The display panel 1060 may be a self-emissive panel, such as an OLED display panel, a micro-LED display panel, or any combination thereof. The display panel 1060 may have a first surface 1062 facing an eye 1090 of a user and an opposing second surface 1064. The first surface 1062 may be a light outputting surface 1062 where an image light emitted by the display panel 1060 may be output toward the eye 1090. The reflective polarizer 1070 and the reflective sheet 1080 may be disposed at or adjacent the first surface 1062 and the second surface 1064 of the display panel 1060, respectively, such that the reflective polarizer 1070 and the reflective sheet 1080 may be disposed opposite to each other.

The reflective polarizer 1070 and the reflective sheet 1080 may be embodiments of the reflective polarizer 10106 and the reflective sheet 10108 shown in FIG. 10A, respectively, and detailed descriptions of the reflective polarizer 1070 and the reflective sheet 1080 may refer to the above descriptions rendered above in connection with FIG. 10A. In some embodiments, an image light 1051 emitted from the display panel 1060 may be an unpolarized image light including an RHCP component and an LHCP component. For discussion purposes, the reflective polarizer 1070 may be an LHCLC reflective polarizer. For the unpolarized image light 1051 incident onto the reflective polarizer 1070, the reflective polarizer 1070 may substantially transmit the RHCP component of the unpolarized image light 1051 as an RHCP light 1055 toward the eye 1090, and substantially reflect the LHCP component of the unpolarized image light 1051 as an LHCP light 1053 toward the reflective sheet 1080. The reflective sheet 1080 may reflect the LHCP light 1053 as an RHCP light 1057 toward the reflective polarizer 1070, which may primarily or substantially transmit the RHCP light 1057 as an RHCP light 1059 toward the eye 1090. Due to the handedness selectivity of the reflective polarizer 1070 and the handedness reversing function of the reflective sheet 1080, a polarization recirculation of the image light emitted from the display panel 1060 may be achieved via the reflective polarizer 1070 and the reflective sheet 1080. Thus, the light efficiency of the display panel 1060 may be improved. In addition, due to the predetermined intermediate petite angles (e.g., greater than 10° and less than 80°, greater than or equal to about 25° and less than or equal to about 50°, greater than −80° and less than −10°, or greater than or equal to about −50° and less than or equal to about −25° of the LC molecules in the reflective polarizer 1070, the reflective polarizer 1070 may have suppressed light leakage and improved extinction ratios for both on-axis and off-axis incident image lights. Thus, the light efficiency of the display panel 1060 may be further improved as compared to an electronic display including a conventional CLC reflective polarizer in which LC molecules are aligned in relatively small pretilt angles (e.g., 0° to 10° or −10° to 0°).

The structure of the reflective polarizer 1070 may be configured according to the characteristics of the display panel 1060, and the reflection band of the reflective polarizer 1070 may be configured corresponding to the wavelength of the image light emitted by the display panel 1060. In some embodiments, the display panel 1060 may be a monochromatic display that emits a narrowband monochromatic image light (e.g., a 10-nm-bandwidth image light) and, accordingly, the reflective polarizer 1070 may be configured to include a CLC layer having a constant helix pitch, such as the CLC layer 220 shown in FIGS. 2A and 2B, the CLC layer 240 shown in FIG. 2C, the CLC layer 260 shown in FIG. 2D, the CLC layer 280 shown in FIG. 2E, the CLC layer 320 shown in FIG. 3, the CLC layer 520 shown in FIG. 5A, or the CLC layer 560 shown in FIG. 5B. In some embodiments, the display panel 1060 may be a polychromatic display panel that emits a broadband polychromatic image light (e.g., a 300-nm-bandwidth image light covering the visible wavelength range) and, accordingly, the reflective polarizer 10106 may be configured to include a CLC layer having a gradient helix pitch, such as the CLC layer 420 shown in FIG. 4A. In some embodiments, the display panel 1060 may be a polychromatic display panel including a stack of a plurality of monochromatic displays and, accordingly, the reflective polarizer 1070 may be configured to include a CLC-layer stack including a plurality of polarizing films (e.g., CLC polarizing films), where at least two polarizing films may have different helix pitches, such as the polarization film stack 470 shown in FIG. 4B.

In some embodiments, the display panel 1060 may include one or more substrates for supporting and protection purposes, an anode, an emissive layer and a cathode disposed on the substrate. Under a typical bias condition, electrons and holes may be injected from the respective electrodes into the emissive layer, where the recombination of the electrons and holes may result in light emission from the emissive layer. In some embodiments, both the anode and the cathode may be transparent electrodes, and the reflective sheet 1080 may be disposed adjacent one of the anode and the cathode. In some embodiments, one of the anode and cathode may be a transparent electrode and the other may be a reflective electrode, such as a metal electrode with a high reflectivity. The reflective electrode may be arranged at the second surface 1064 of the display panel 1060 and may function as the reflective sheet to realize a polarization recirculation of the image light together with the reflective polarizer 1070. Thus, the reflective sheet 1080 may be omitted.

Figure 11A:
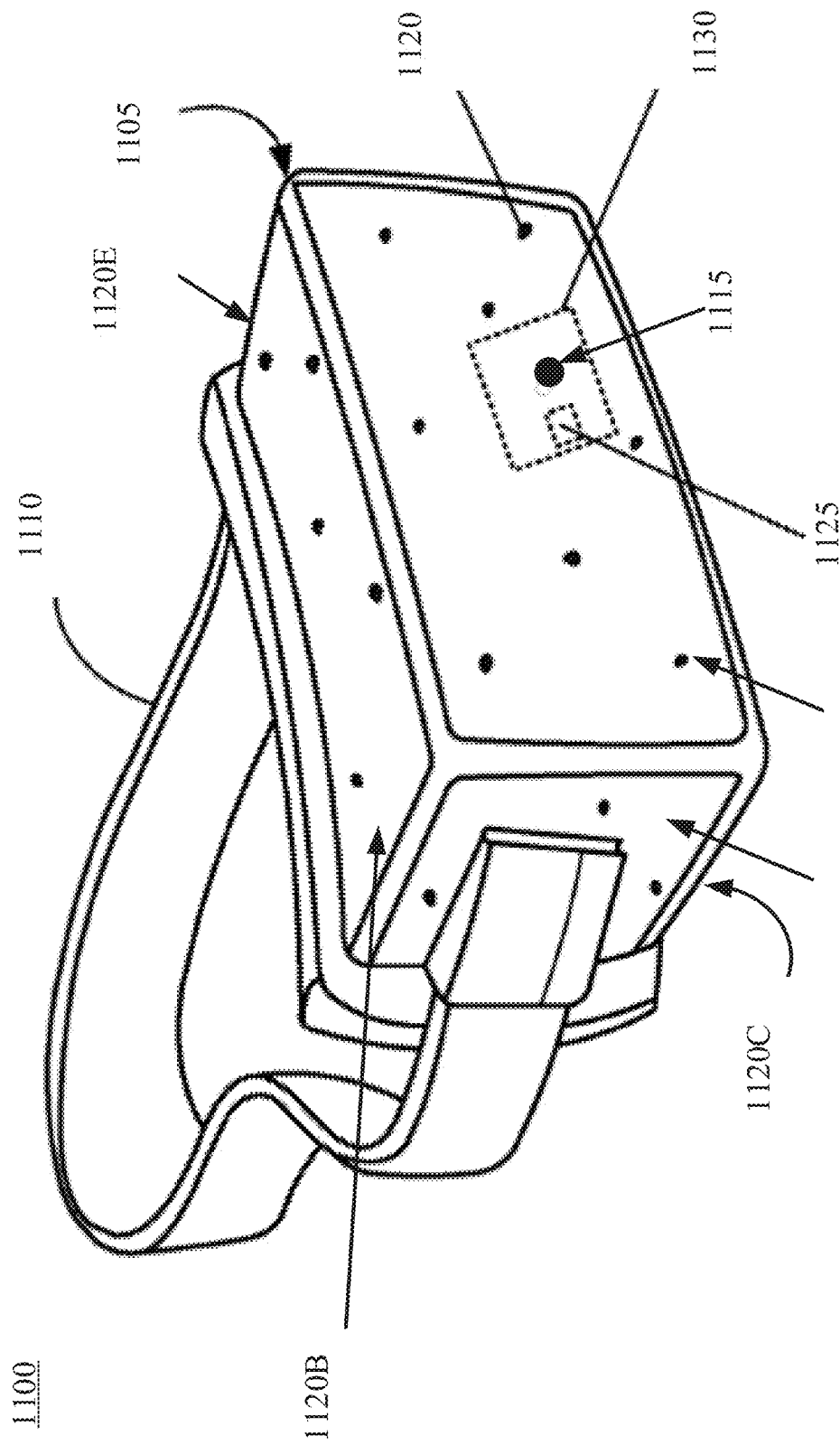
FIG. 11A illustrates a diagram of a near-eye display ("NED"), according to an embodiment of the present disclosure.

FIG. 11A illustrates a diagram of a near-eye display ("NED") 1100, according to an embodiment of the present disclosure. As shown in FIG. 11A, the NED 1100 may include a front body 1105 and a band 1110. The front body 1105 may include one or more electronic display elements of an electronic display and one or more optical elements (not shown in detail in FIG. 11A), an inertial measurement unit ("IMU") 1130, one or more position sensors 1125, and one or more locators 1120. In the embodiment shown in FIG. 11A, the one or more position sensors 1125 may be located within the IMU 1130. The locators 1120 may be located at various positions on the front body 1105 relative to a reference point 1115. In the embodiment shown in FIG. 11A, the reference point 1115 may be located at the center of the IMU 1130, or at any other suitable location. The locators 1120 may be located on at least one of a front side 1120A, a top side 1120B, a bottom side 1120C, a right side 1120D, or a left side 1120E of the front body 1105.

Figure 11B:
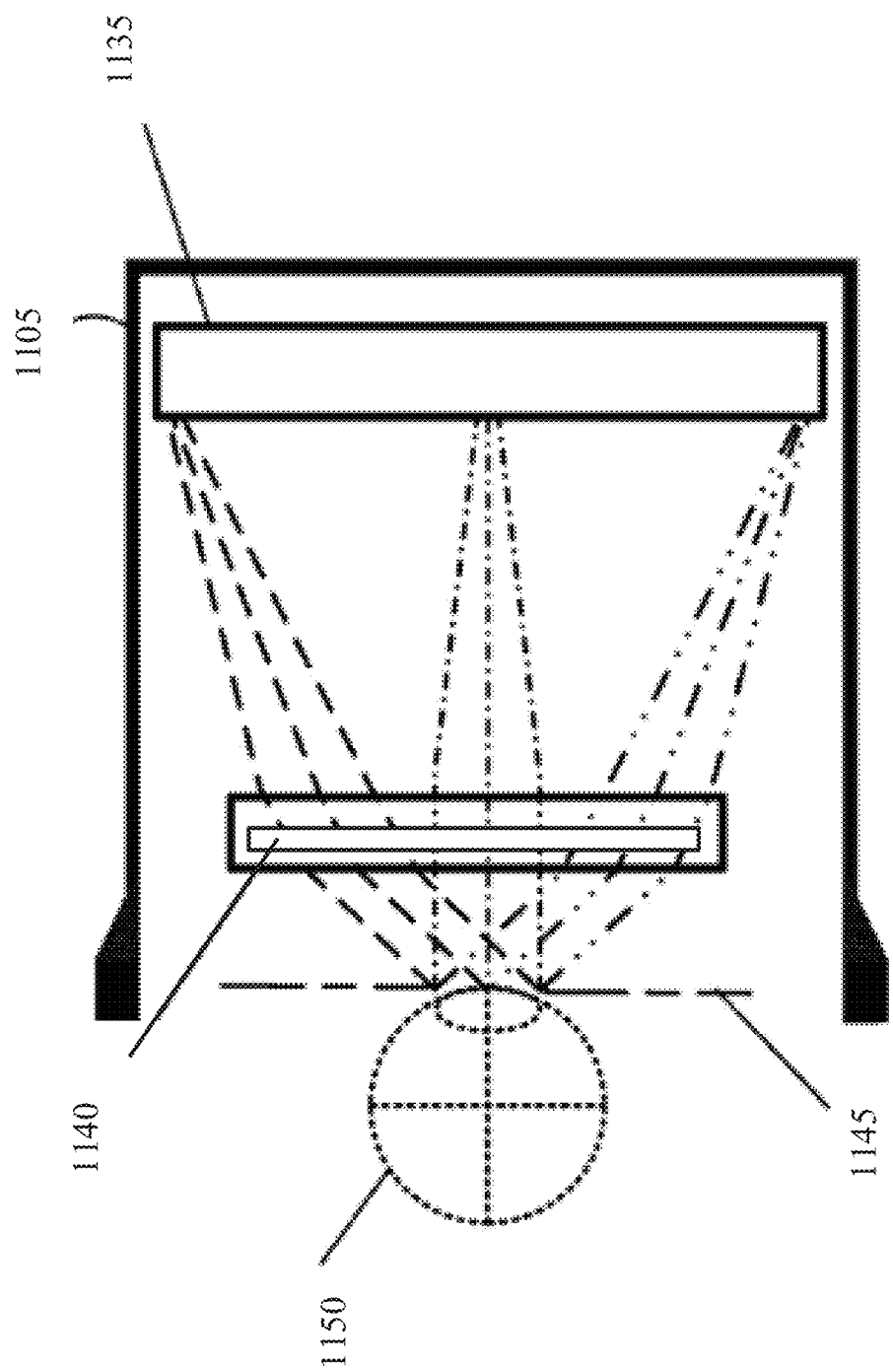
FIG. 11B illustrates a cross-sectional view of a front body of the NED shown in FIG. 11A, according to an embodiment of the present disclosure.

FIG. 11B is a cross-sectional view of a front body of the NED 1100 shown in FIG. 11A. As shown in FIG. 11B, the front body 1105 may include an electronic display 1135 and a pancake lens assembly 1140 configured to provide altered image lights to an exit pupil 1145. In some embodiments, the pancake lens assembly 1140 may be a pancake lens assembly in accordance with an embodiment of the present disclosure, such as the pancake lens assembly 901 shown in FIG. 9A. The exit pupil 1145 may be at a location of the front body 1105 where an eye 1150 of the user may be positioned in an eye-box region. For illustrative purposes, FIG. 11B shows a cross-section of the front body 1105 associated with a single eye 1150, while another electronic display, separate from the electronic display 1135, may provide image lights altered by another pancake lens assembly, separate from the pancake lens assembly 1135, to another eye of the user. In some embodiments, a single electronic display 1135 and a single pancake lens assembly 1140 may provide images lights to both eyes of the user. In some embodiments, the electronic display 1135 may be an electronic display in accordance with an embodiment of the present disclosure, such as the electronic display 1000 shown in FIG. 10A or the electronic display 1050 shown in FIG. 10B.

Any pretilt angle θ (e.g., θ1, θ2, θ3, θ1', θ2', or θ3') of any disclosed optical film (e.g., CLC layer) of any disclosed CLC layer may be in a range of 10°≤θ<80°, or in a range of −80°<θ<−10°. The pretilt angles of a same CLC layer or of different CLC layers in a CLC-layer stack may have the same sign or opposite signs. For example, in some embodiments, the pretilt angle θ may be in a range of 10°<θ≤20°, or 10°<θ≤25°, or 10°<θ≤30°, or 10°<θ≤35°, or 10°<θ≤40°, or 10°<θ≤45°, or 10°<θ≤50°, or 10°<θ≤55°, or 10°<θ≤60°, or 10°<θ≤65°, or 10°<θ≤70°, or 10°<θ≤75° or 79°. In some embodiments, the pretilt angle θ may be in a range of −20°≤θ<−10°, or −25°≤θ<−10°, or −30°≤θ<−10°, or −35°≤θ<−10°, or −40°≤θ<−10°, or −45°≤θ<−10°, or −50°≤θ<−10°, or −55°≤θ<−10°, or −60°≤θ<−10°, or −65°≤θ<−10°, or −70°≤θ<−10°, or −75° (or −79°)≤−10°.

In some embodiments, the pretilt angle θ may be in a range of 15°≤θ≤25°, or 15°≤θ≤30°, or 15°≤θ≤35°, or 15°≤θ≤40°, or 15°≤θ≤45°, or 15°≤θ≤50°, or 15°≤θ≤55°, or 15°≤θ≤60°, or 15°≤θ≤65°, or 15°≤θ≤70°, or 15°≤θ≤75°, or 15°≤θ<80°. In some embodiments, the pretilt angle θ may be in a range of −25°≤θ≤−15°, or −30°≤θ≤−15°, or −35°≤θ≤−15°, or −40°≤θ≤−15°, or −45°≤θ≤−15°, or −50°≤θ≤−15°, or −55°≤θ≤−15°, or −60°≤θ≤−15°, or −65°≤θ≤−15°, or −70°≤θ≤−15°, or −75°≤θ≤−15°, or −80°<θ≤−15°.

In some embodiments, the pretilt angle θ may be in a range of 20°≤θ≤30°, or 20°≤θ≤35°, or 20°≤θ≤40°, or 20°≤θ≤45°, or 20°≤θ≤50°, or 20°≤θ≤55°, or 20°≤θ≤60°, or 20°≤θ≤65°, or 20°≤θ≤70°, or 20°≤θ≤75°, or 20°≤θ<80°. In some embodiments, the pretilt angle θ may be in a range of −30°≤θ≤−20°, or −35°≤θ≤−20°, or −40°≤θ≤−20°, or −45°≤θ≤−20°, or −50°≤θ≤−20°, or −55°≤θ≤−20°, or −60°≤θ≤−20°, or −65°≤θ≤−20°, or −70°≤θ≤−20°, or −75°≤θ≤−20°, or −80°<θ≤−20°.

In some embodiments, the pretilt angle θ may be in a range of 25°≤θ≤35°, or 25°≤θ≤40°, or 25°≤θ≤45°, or 25°≤θ≤50°, or 25°≤θ≤55°, or 25°≤θ≤60°, or 25°≤θ≤65°, or 25°≤θ≤70°, or 25°≤θ≤75°, or 25°≤θ<80°. In some embodiments, the pretilt angle θ may be in a range of −35°≤θ≤−25°, or −40°≤θ≤−25°, or −45°≤θ≤−25°, or −50°≤θ≤−25°, or −55°≤θ≤−25°, or −60°≤θ≤−25°, or −65°≤θ≤−25°, or −70°≤θ≤−25°, or −75°≤θ≤−25°, or −80°<θ≤−25°.

In some embodiments, the pretilt angle θ may be in a range of 30°≤θ≤40°, or 30°≤θ≤45°, or 30°≤θ≤50°, or 30°≤θ≤55°, or 30°≤θ≤60°, or 30°≤θ≤65°, or 30°≤θ≤70°, or 30°≤θ≤75°, or 30°≤θ<80°. In some embodiments, the pretilt angle θ may be in a range of −40°≤θ≤−30°, or −45°≤θ≤−30°, or −50°≤θ≤−30°, or −55°≤θ≤−30°, or −60°≤θ≤−30°, or −65°≤θ≤−30°, or −70°≤θ≤−30°, or −75°≤θ≤−30°, or −80°<θ≤−30°.

In some embodiments, the pretilt angle θ may be in a range of 35°≤θ≤45°, or 35°≤θ≤50°, or 35°≤θ≤55°, or 35°≤θ≤60°, or 35°≤θ≤65°, or 35°≤θ≤70°, or 35°≤θ≤75°, or 35°≤θ<80°. In some embodiments, the pretilt angle θ may be in a range of −45°≤θ≤−35°, or −50°≤θ≤−35°, or −55°≤θ≤−35°, or −60°≤θ≤−35°, or −65°≤θ≤−35°, or −70°≤θ≤−35°, or −75°≤θ≤−35°, or −80°<θ≤−35°.

In some embodiments, the pretilt angle θ may be in a range of 40°≤θ≤50°, or 40°≤θ≤55°, 40°≤θ≤60°, or 40°≤θ≤65°, or 40°≤θ≤70°, or 40°≤θ≤75°, or 40°≤θ<80°. In some embodiments, the pretilt angle θ may be in a range of −50°≤θ≤−40°, or −55°≤θ≤−40°, −60°≤θ≤−40°, or −65°≤θ≤−40°, or −70°≤θ≤−40°, or −75°≤θ≤−40°, or −80°<θ≤—40°.

In some embodiments, the pretilt angle θ may be in a range of 45°≤θ≤55°, or 45°≤θ≤60°, or 45°≤θ≤65°, or 45°≤θ≤70°, or 45°≤θ≤75°, or 45°≤θ<80°. In some embodiments, the pretilt angle θ may be in a range of −55°≤θ≤−45°, or −60°≤θ≤−45°, or −65°≤θ≤−40°, or −70°≤θ≤−45°, or −75°≤θ≤−45°, or −80°<θ≤—45°.

In some embodiments, the pretilt angle θ may be in a range of 50°≤θ≤60°, or 50°≤θ≤65°, or 50°≤θ≤70°, or 50°≤θ≤75°, or 50°≤θ<80°. In some embodiments, the pretilt angle θ may be in a range of −60°≤θ≤−50°, or −65°≤θ≤−50°, or −70°≤θ≤−50°, or −75°≤θ≤−50°, or −80°<θ≤—50°.

In some embodiments, the pretilt angle θ may be in a range of 55°≤θ≤65°, or 55°≤θ≤70°, or 55°≤θ≤75°, or 55°≤θ<80°. In some embodiments, the pretilt angle θ may be in a range of −65°≤θ≤−55°, or −70°≤θ≤−55°, or −75°≤θ≤−55°, or −80°<θ≤—55°.

In some embodiments, the pretilt angle θ may be in a range of 60°≤θ≤70° or 60°≤θ≤75°, or 60°≤θ<80°. In some embodiments, the pretilt angle θ may be in a range of −70°≤θ≤−60°, or −75°≤θ≤−60°, or −80°<θ≤—60°.

In some embodiments, the pretilt angle θ may be in a range of 65°≤θ≤75°, or 65°≤θ<80°. In some embodiments, the pretilt angle θ may be in a range of −75°≤θ−65°, or −80°<θ≤−65°.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or any combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment. Such combinations of different features shown in different drawings are also within the scope of the present disclosure.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical element, comprising:
an optical film including a first birefringent material layer and a second birefringent material layer, each birefringent material layer including a birefringent material having a chirality,
wherein:
    optically anisotropic molecules in the first birefringent material layer disposed adjacent a surface of the first birefringent material layer are configured with a first pretilt angle in a range of greater than 10° and less than 80°, or in a range of greater than −80° and less than −10°,
    optically anisotropic molecules in the second birefringent material layer disposed adjacent a surface of the second birefringent material layer are configured with a second pretilt angle in the range of greater than 10° and less than 80°, or in the range of greater than −80° and less than −10°,
    in each birefringent material layer, the optically anisotropic molecules disposed adjacent the surface, are configured with the same orientation,
    each birefringent material layer includes a helix twist structure formed by tilted optically anisotropic molecules arranged in the thickness direction, the helix twist structure has a helical axis that is parallel with the thickness direction of the optical film, and
    the first pretilt angle is different from the second pretilt angle.

2. The optical element of claim 1, wherein
the first pretilt angle is in a range of greater than or equal to 30° and less than or equal to 40°, or in a range of greater than or equal to −40° and less than or equal to −30°, and the second pretilt angle is in the range of greater than or equal to 30° and less than or equal to 40°, or in the range of greater than or equal to −40° and less than or equal to −30°.

3. The optical element of claim 1, wherein
the first pretilt angle is in a range of greater than or equal to 25° and less than or equal to 50°, or in a range of greater than or equal to −50° and smaller than or equal to −25°, and
the second pretilt angle is in the range of greater than or equal to 25° and less than or equal to 50°, or in the range of greater than or equal to −50° and smaller than or equal to −25°.

4. The optical element of claim 1, wherein
the surface of the first birefringent material layer is a first surface of the first birefringent material layer, the first birefringent material layer has a second surface opposing to the first surface, optically anisotropic molecules disposed adjacent the second surface are configured with a third pretilt angle in the range of greater than 10° and less than 80°, or in the range of greater than −80° and less than −10°,
the surface of the second birefringent material layer is a first surface of the second birefringent material layer, the second birefringent material layer has a second surface opposing to the first surface, optically anisotropic molecules disposed adjacent the second surface are configured with a fourth pretilt angle in the range of greater than 10° and less than 80°, or in the range of greater than −80° and less than −10°, and
the first pretilt angle and the third pretilt angle in the first birefringent material layer have different absolute values, and the second pretilt angle and the fourth pretilt angle in the second birefringent material layer have different absolute values.

5. The optical element of claim 4, wherein each of the first pretilt angle, the second pretilt angle, the third pretilt angle, and the fourth pretilt angle is in a range of greater than 30° and less than or equal to 40°, or in a range of greater than or equal to −40° and less than −30°.

6. The optical element of claim 1, further comprising an alignment structure coupled to the surface of the first birefringent material layer and configured to align the optically anisotropic molecules disposed adjacent the surface of the first birefringent material layer in the first pretilt angle.

7. The optical element of claim 6, wherein the alignment structure includes at least one of a nanostructure alignment layer including a random distribution of planar and vertical alignment polyimide domains, a photoalignment layer that includes nanostructured domains of planar and vertical alignment polyimides, a photoalignment layer, an alignment layer including a polyimide mixed with a liquid crystalline prepolymer, or a hybrid alignment polymer network.

8. The optical element of claim 1, wherein:
the optically anisotropic molecules of the first birefringent material layer disposed adjacent the surface of the first birefringent material layer are exposed to air, and
the first birefringent material layer further includes surfactants or small weight molecules configured to align the optically anisotropic molecules exposed to the air in the first pretilt angle.

9. The optical element of claim 1, wherein in each birefringent material layer, the helix twist structure is a heliconical structure.

10. The optical element of claim 9, wherein the helix twist structure has a constant helix pitch.

11. The optical element of claim 9, wherein the helix twist structure has a gradient helix pitch.

12. The optical element of claim 1, wherein at least one of the first birefringent material layer or the second birefringent material layer is a liquid crystal polymer film.

13. The optical element of claim 12, wherein the birefringent material in the liquid crystal polymer film is polymerized.

14. The optical element of claim 12, wherein the birefringent material in the liquid crystal polymer film is polymer stabilized.

15. The optical element of claim 1, wherein the birefringent material includes active liquid crystals that are switchable by an external field.

16. The optical element of claim 1, wherein each birefringent material layer is a polarizing film configured to substantially reflect a polarized light having a handedness that is the same as a handedness of the helix twist structure, and substantially transmit a polarized light having a handedness that is opposite to the handedness of the helix twist structure.

17. The optical element of claim 1, wherein the optical film is configured to function as an optical diffuser for providing a directional scattering.

18. The optical element of claim 1, wherein:
the surface of the first birefringent material layer is a first surface of the first birefringent material layer, the first birefringent material layer has a second surface opposing to the first surface, optically anisotropic molecules disposed adjacent the second surface are configured with a third pretilt angle in the range of greater than 10° and less than 80°, or in a range of greater than −80° and less than −10°,
the optical element further comprises a first alignment structure coupled to the first surface of the first birefringent material layer and configured to align the optically anisotropic molecules adjacent the first surface of the first birefringent material layer in the first pretilt angle; and
a second alignment structure coupled to the second surface of the first birefringent material layer and configured to align the optically anisotropic molecules adjacent the second surface of the first birefringent material layer in the third pretilt angle.

* * * * *